United States Patent [19]
Myron et al.

[11] Patent Number: 5,640,143
[45] Date of Patent: Jun. 17, 1997

[54] OCCUPANCY SENSOR AND METHOD OF OPERATING SAME

[75] Inventors: Douglas D. Myron, Austin; Errol R. Williams, Round Rock; Charles C. Hardin, Austin; Timothy W. Woytek, Austin; Michael A. Stephens, Austin, all of Tex.

[73] Assignee: MyTech Corporation, Austin, Tex.

[21] Appl. No.: 384,580

[22] Filed: Feb. 6, 1995

[51] Int. Cl.$^6$ ..................................................... G08B 13/00
[52] U.S. Cl. .................................. 340/541; 250/DIG. 1; 340/516; 340/567; 315/307; 367/94
[58] Field of Search ................................. 340/565, 567, 340/541, 552, 554, 511, 516, 553; 250/342, 338.1, DIG. 1; 315/307–311, 149–155; 307/116–117; 367/93–94; 342/27–28

[56] References Cited

U.S. PATENT DOCUMENTS

| | | | |
|---|---|---|---|
| 3,777,139 | 12/1973 | Peel | 246/125 |
| 3,958,118 | 5/1976 | Schwarz | 250/221 |
| 3,967,283 | 6/1976 | Clark et al. | 342/28 |
| 4,051,472 | 9/1977 | Albanese et al. | 342/28 |
| 4,225,808 | 9/1980 | Saracceni | 315/307 |
| 4,337,402 | 6/1982 | Nowakowski | 307/121 |
| 4,551,654 | 11/1985 | Barnum | 340/541 X |
| 4,661,720 | 4/1987 | Cameron, Jr. et al. | 307/117 |
| 4,678,985 | 7/1987 | Moskin | 323/324 |
| 4,751,399 | 6/1988 | Koehring et al. | 307/117 |
| 4,787,722 | 11/1988 | Claytor | 359/742 |
| 4,815,046 | 3/1989 | Dorr | 367/93 X |
| 4,820,938 | 4/1989 | Mix et al. | 307/117 |
| 4,874,962 | 10/1989 | Hermans | 307/116 |
| 4,929,833 | 5/1990 | Smith | 250/338.1 |
| 5,034,579 | 7/1991 | Rowland | 200/61.45 R |
| 5,083,025 | 1/1992 | Homberg | 250/353 |
| 5,101,194 | 3/1992 | Sheffer | 340/567 |
| 5,124,546 | 6/1992 | Hu | 250/216 |
| 5,124,566 | 6/1992 | Hu | 307/116 |
| 5,128,654 | 7/1992 | Griffin et al. | 340/567 |
| 5,142,199 | 8/1992 | Elwell | 315/154 |
| 5,189,393 | 2/1993 | Hu | 340/522 |
| 5,194,848 | 3/1993 | Kerr | 340/566 |
| 5,196,826 | 3/1993 | Whiting | 340/554 |
| 5,221,919 | 6/1993 | Hermans | 340/567 |
| 5,243,327 | 9/1993 | Bentz et al. | 340/566 |
| 5,258,743 | 11/1993 | Nelson et al. | 340/568 |
| 5,258,775 | 11/1993 | Casey et al. | 347/255 |
| 5,258,899 | 11/1993 | Chen | 362/394 |
| 5,276,427 | 1/1994 | Peterson | 340/522 |
| 5,281,961 | 1/1994 | Elwell | 340/825 |
| 5,282,118 | 1/1994 | Lee | 362/276 |
| 5,283,551 | 2/1994 | Guscott | 340/567 |
| 5,293,097 | 3/1994 | Elwell | 315/154 |
| 5,307,054 | 4/1994 | Concannon, Sr. et al. | 340/686 |
| 5,317,304 | 5/1994 | Choi | 340/571 |

(List continued on next page.)

FOREIGN PATENT DOCUMENTS

| | | |
|---|---|---|
| 0066691 | 12/1982 | European Pat. Off. . |
| 4005169 | 8/1991 | Germany . |
| 10074 | 6/1992 | WIPO . |
| 05627 | 3/1993 | WIPO . |
| 20937 | 9/1994 | WIPO . |

*Primary Examiner*—Thomas Mullen
*Attorney, Agent, or Firm*—Arnold, White & Durkee

[57] ABSTRACT

An occupancy sensor that provides improved performance by the inclusion of a microprocessor that controls the sensing transducers and processes the received signal to optimize desired detection performance. The occupancy sensor includes a quadrature detection technique and automatic sensitivity adjustment that reduce false detection caused by air flow, hallway traffic and other noise sources. A fault detection method executed periodically detects fault conditions in the sensor or sensing area caused by component failure or obstructions in front of the sensor. Transmitter power is varied depending on the size of the desired coverage area. Since various ambient parameters such as line voltage, light level, and temperature may be easily and usefully monitored, the microprocessor may use these variables to make intelligent decisions in controlling electrical loads, such as building lighting and ventilation.

55 Claims, 36 Drawing Sheets

U.S. PATENT DOCUMENTS

| | | | |
|---|---|---|---|
| 5,317,620 | 5/1994 | Smith | 340/567 X |
| 5,319,283 | 6/1994 | Elwell | 315/194 |
| 5,349,330 | 9/1994 | Diong et al. | 340/567 |
| 5,357,170 | 10/1994 | Luchaco et al. | 315/154 X |
| 5,374,854 | 12/1994 | Chen | 307/117 |
| 5,386,210 | 1/1995 | Lee | 340/567 |
| 5,489,827 | 2/1996 | Xia | 315/154 X |

OCCUPANCY SENSOR AND METHOD OF OPERATING SAME

BACKGROUND OF THE INVENTION

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserve all copyright rights whatsoever.

The present invention relates to occupancy sensors.

An occupancy sensor is designed to detect the presence of a person(s) in a room, usually in order to determine whether various electrically powered loads in that room (for example, lights, ventilation, and the like) should be turned on or not. This is of particular advantage to institutions that have visitors who are not directly responsible for paying for the electricity they consume, since these people often do not exercise diligence in regularly turning off electrically powered loads, such as lights, ventilation, and the like, when they leave a room. Occupancy sensors may therefore conserve a great deal of energy. This has led many businesses to purchase them voluntarily; it has also resulted in laws in certain states mandating the use of occupancy sensors in large areas as an environmental conservation measure.

The two most prevalent types of occupancy sensors are passive infrared and active ultrasonic devices. A passive infrared ("PIR") sensor will turn on the load whenever it detects a moving or newly apparent heat source. An active ultrasonic sensor emits vibrations at frequencies of 25 kHz or higher and listens to the return echoes; if it detects a significant Doppler shift, indicating the presence of a moving body, then it turns the load on. Either detector will turn the load back off after a certain interval of no motion sensed, usually three to sixty minutes as determined by the user. The motion sensitivity of the device is usually also set by the user.

Each of these sensors is not without disadvantage. PIR sensors may not be able to sense motion behind a barrier within a room, such as a modesty wall in a restroom. In addition, PIR sensors may be susceptible to "dead spots" in certain rooms, within which they are less sensitive to heat sources.

Ultrasonic sensors do not share these handicaps, since the sonic energy they emit will fill the room. However, they may be susceptible to false triggering from several sources. For example, an ultrasonic sensor placed on the wall next to a door may send some sonic energy into the corridor outside the room, and motion within the corridor may make the sensor react as though there were motion in the room resulting in a sensing error. In addition, air motion from wind and ventilation may trip an ultrasonic sensor by mistake. This difficulty is often exacerbated by the user setting the sensitivity of the ultrasonic sensor too high which can increase susceptibility to false tripping.

SUMMARY OF THE INVENTION

The present invention avoids the above-noted discrepancies in prior approaches by providing a method and apparatus for controlling an electrical load based upon occupancy of a space. The invention generates an occupancy signal that is indicative of motion within a space. Then, the occupancy signal is digitized, for example, by an analog-to-digital converter, to produce a digitized occupancy signal having digital values indicative of a magnitude of the occupancy signal at controllable sampling intervals. Then, the occupancy signal is processed, for example, by a programmed microprocessor, to provide an indication of motion within the space. Finally, the electrical load is automatically energized and de-energized as a function of the indication of motion within the space.

The electrical load may be controlled by a relay, silicon controlled rectifier or triac, or similar controllable switching device. Another feature of the invention is the energization of the load substantially contemporaneous with the zero-crossing of an A/C source used to power the load. The load may be, for example, a lighting device or a ventilation system, such as a heating and/or air conditioning system.

The occupancy signal may be generated either actively or passively. An example of the active generation of the occupancy signal is the transmitting of ultrasonic energy into the space, and the subsequent detecting of ultrasonic energy reflected from the space. Alternatively, or in combination with active generation of the occupancy signal, the occupancy signal may be generated passively, for example, by a passive infrared detector that detects heat sources within the space.

Another feature of the invention is the detection of environmental conditions within the space, for example, ambient light and temperature.

When generating the occupancy signal through the use of ultrasonic means, a feature of the invention is the transmission of ultrasonic energy pulses into the space at controlled time intervals, subsequently detecting the ultrasonic pulses reflected from the space to produce the occupancy signal, and sampling the occupancy signal as a function of the controlled time intervals. The sampling may occur at integer multiples of the controlled time intervals, and the sampling may occur at time intervals that are synchronized with the transmission of the ultrasonic energy pulses.

Yet another feature of the invention is the sampling of the occupancy signal in quadrature synchronized with the transmitting of the ultrasonic energy pulses, thus permitting the assessment of a Doppler shift between the transmitted ultrasonic energy pulses and the quadrature samples. The assessment of this Doppler shift permits discrimination of the type of motion within the space, for example, toward or away from the sensor, which allows processing of the occupancy signal based upon a direction of detected motion.

Other features of the invention include the automatic adjustment of sensitivity in processing the occupancy signal as a function of the shape or configuration of the space being sensed, or as a function of the history of the occupancy signal. Thus, occupancy sensing may be made more or less sensitive to detection of motion within the space, depending upon the shape or configuration of the space, or depending upon the historical movement of people within the space. Yet other features of the invention includes automatically self testing the sensor to ensure proper operation, and the dithering of the occupancy signal, prior to digitization, in order to minimize the deleterious effects of noise on the occupancy signal.

These, and other features and advantages of the present invention, will become apparent to those of ordinary skill in this technology, with reference to the following figures and detailed description.

DETAILED DESCRIPTION

Figure 1:
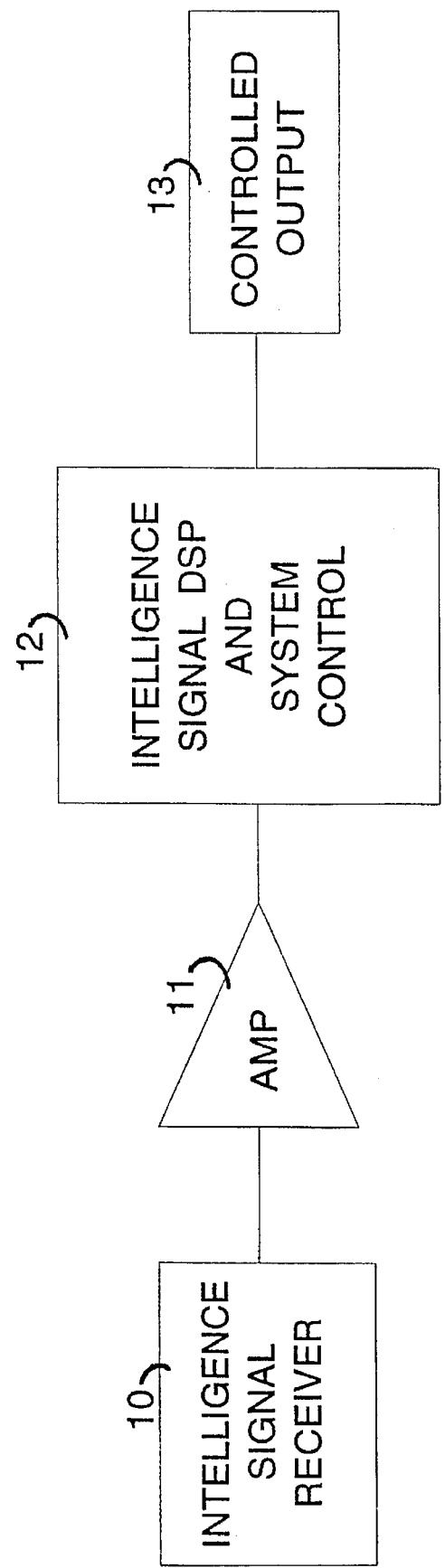
FIG. 1 is a global block diagram of the device of the present invention.

The overall sensor system of the present invention is illustrated in FIG. 1. The first stage is the intelligence signal receiver 10, the output of which undergoes amplification and some elementary analog signal processing in the amplifier 11. The modified signal is then fed to the central element of the system, the digital signal processor (DSP) and system control 12, which includes a microprocessor and its ancillary hardware. This stage then affects the environment via its controlled outputs 13, for example, signals to turn the load on and off, an output ultrasonic signal if applicable, a status indicator, etc.

Figure 2:
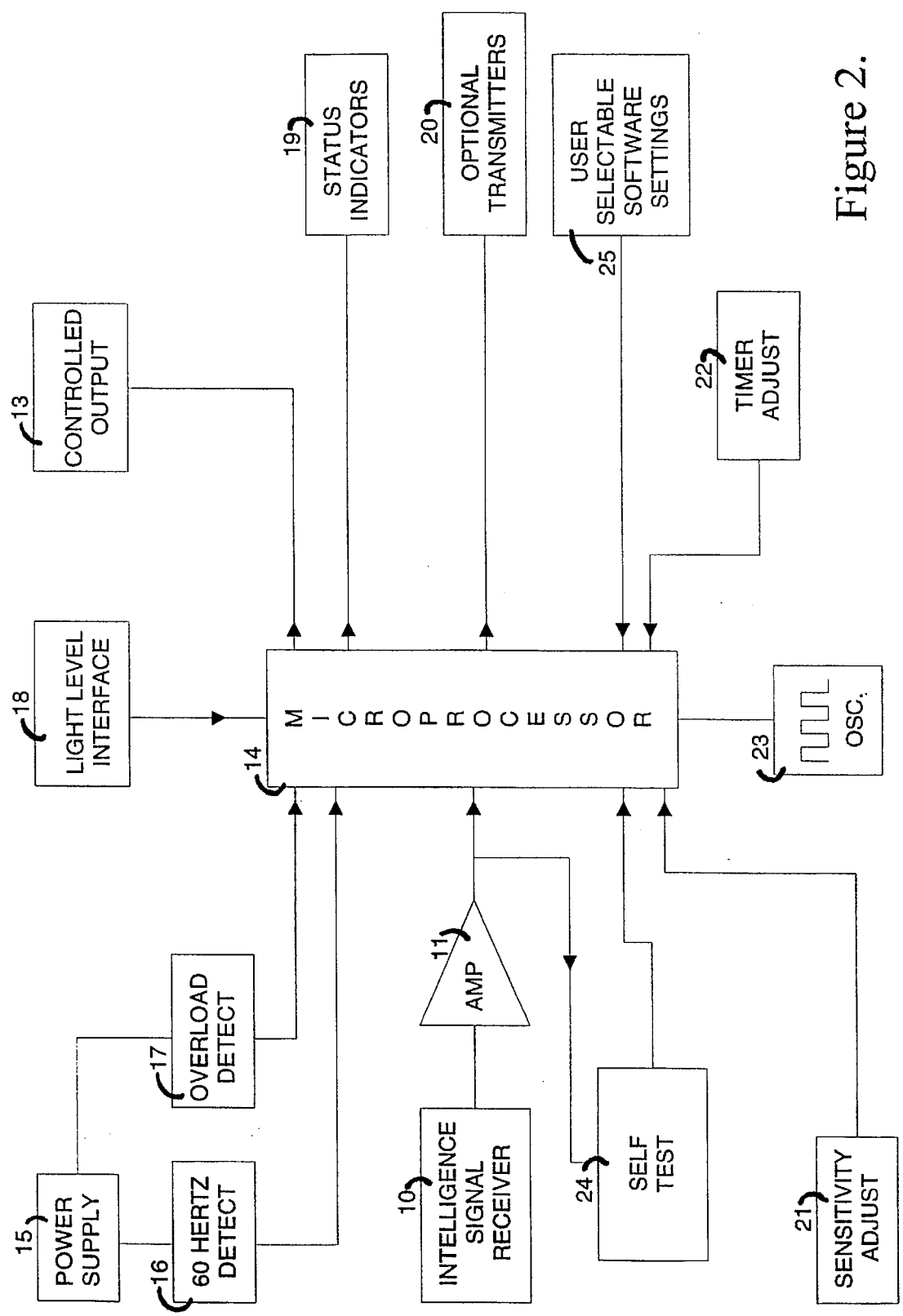
FIG. 2 is a more detailed block diagram of the device of FIG. 1.

FIG. 2 is a more detailed breakdown of the components of the generalized system shown in FIG. 1. In addition to the receiver 10 and the analog amplifier 11, there are several subsystems within the sensor. The microprocessor 14 is the heart of the system, providing both signal filtering and algorithmic control of the controlled output 13. The microprocessor selected should be fast in order to drive ultrasonic transducers; it should also have some provision for software-configurable interrupts. In addition, if microprocessor 14 has internal analog-to-digital conversion, this makes for a more compact printed circuit board layout. Some exemplary commercial products usable as microprocessor 14 for this application include the Oki MSM65524, the SGS-Thomson ST6210, the Zilog Z86A20, and the Microchip PIC16C71, PIC16C73, and PIC16C74, however, other commercially available microprocessors would also be acceptable. Further, although the illustrated microprocessor incorporates an analog-to-digital converter, it will be understood that separate components may be used for the microprocessor and analog-to-digital converter.

The self-test filter 24 gives the microprocessor 14 another look at the output of the amplifier 11 to determine if the self-test signal is present in the echoes.

There are several optional inputs to the system in addition to the receiver 10. For example, the user may set the motion sensitivity of the sensor with the sensitivity adjust 21. He may also vary the delay between the time the sensor last sees motion and the time the load goes off by manipulating the timer adjust 22. Other inputs measure various environmental factors, including the light level interface 18 and the overload detector 17. The oscillator 23 provides the microprocessor 14 with a timer reference, while the 60 Hertz detect 16 ensures that the sensor can react quickly in the event of a loss of power.

The sensor controls several outputs, including the optional transmitters 20 in the case of an ultrasonic or a dual-technology sensor, the controlled outputs 13 to turn the load on and off, and the status indicators 19 to inform the user when the sensor detects motion, a fault condition, etc.

The power supply 15, that provides the microprocessor 14 and other components with a steady DC voltage, and the user selectable software settings 25, which select optional features with which the sensor is endowed, are passive with regard to detecting motion or controlling a load.

Figure 3:
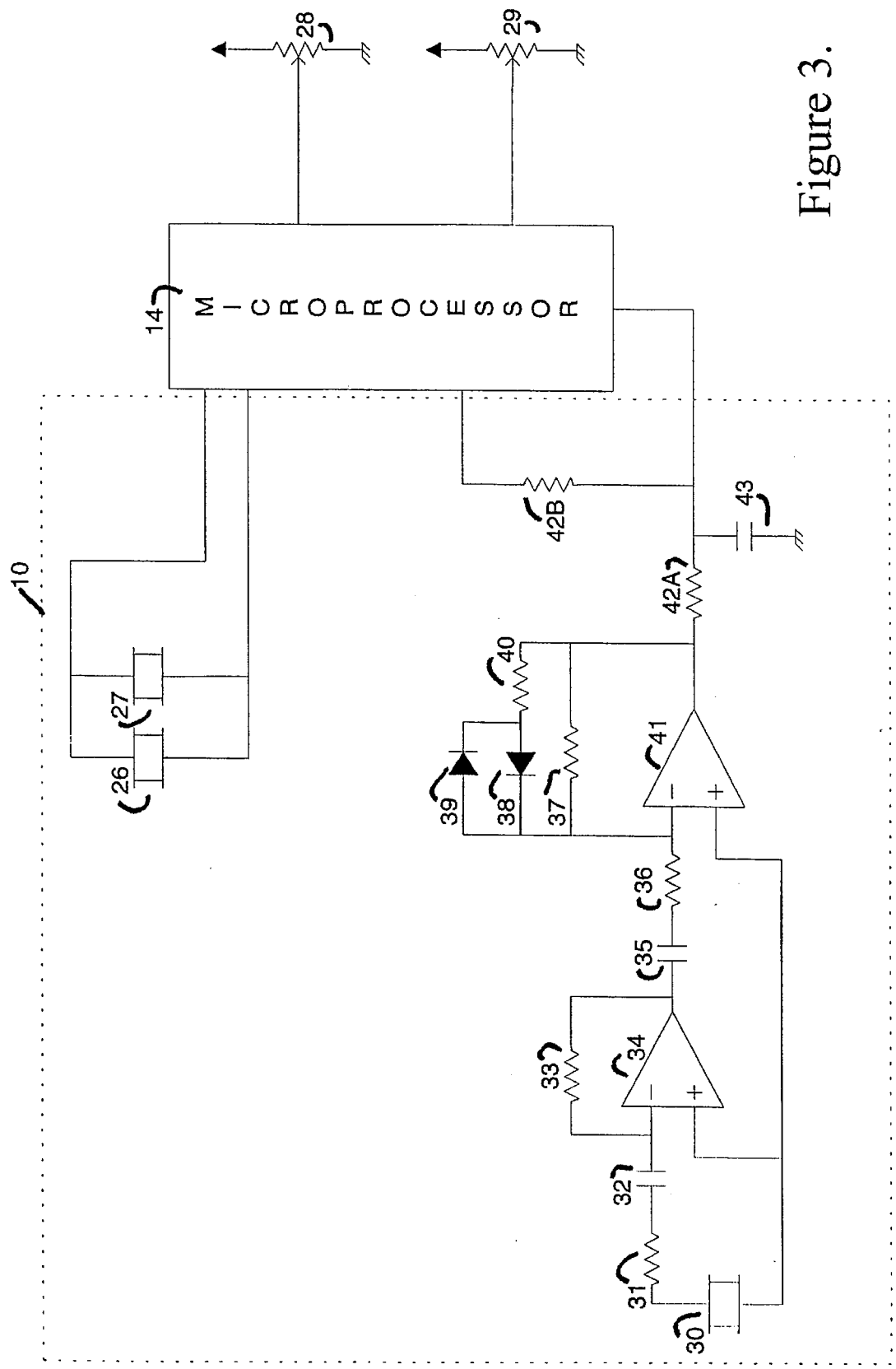
FIG. 3 is a schematic diagram of the occupancy-sensing hardware in an ultrasonic sensor usable in the device of FIGS. 1 and 2, including manual sensitivity and timer adjustments.

The hardware required for an intelligent ultrasonic occupancy sensor to detect motion is preferred in FIG. 3. The ultrasonic receiver 30 will produce a voltage that varies with the sound pressure incident upon it, and the resulting signal is applied to a preamplifier/high-pass filter including components 31, 32, 33, and 34. The output of the preamplifier/high-pass filter is then fed through a clipping amplifier/filter, which is composed of components 35, 36, 37, 38, 39, 40, and 41. This filter has a feedback impedance of the same value as the resistor 37 for signals that are not large enough to bias the diodes 38 or 39, and a feedback impedance of the resistor 37 in parallel with the resistor 40 for large signals that venture high or low enough to bias one of diodes 38 or 39. This reduces the gain for large signals and confers a certain amount of environmental noise immunity upon the sensor, as well as preventing saturation of the preamplifier.

The output of the clipping amplifier goes through a simple low-pass noise-filtering stage including resistor 42A and capacitor 43, and the result is dithered via an output from the microprocessor 14 through the resistor 42B. Dithering is the addition of a square wave to an input signal which is to undergo analog-to-digital (henceforth A/D) conversion. The dither signal's peak-to-peak magnitude is ideally half of the resolution of the A/D converter. This reduces the effect of noise on the lowest bit of the converter, which may be important if the A/D resolution is eight bits or less.

This dithered output is applied to an A/D converter channel on the microprocessor 14. This signal will henceforth be referred to as the "occupancy signal."

The microprocessor 14 also drives the transmitters 26 and 27 using interrupts built into the microcontroller hardware. Transmitters 26, 27 and receiver 30 should have a fairly high Q in order that they put out energy at only one frequency of interest; even a small frequency component a few Hertz from the frequency of transmission could appear to the sensor as a Doppler shift and hence may register as motion. For similar reasons, transducers 26, 27 should not change their frequency of operation substantially with temperature or humidity. Exemplary commercially available components for transmitters 26, 27 and receiver 30 are presented in Table I, for three different transmission frequencies (25 kHz, 32 kHz and 40 kHz). However, other commercial components and other transmission frequencies would also be acceptable.

TABLE I

| | Transmitter 26, 27 | Receiver 30 |
|---|---|---|
| 25 kHz | Nippon T25-16 | Nippon R25-16 |
| | Nippon T25-18 | Nippon R25-18 |
| | Nippon T25-24 | Nippon R25-24 |

TABLE I-continued

| | Transmitter 26, 27 | Receiver 30 |
|---|---|---|
| | S-Square 250ST/160 | S-Square 250SR/160 |
| | | Matsushita RCB25K5 |
| 32 kHz | Nippon T32-16 | Nippon R32-16 |
| | Nippon T32-18 | Nippon R32-18 |
| | S-Square 328ST/160 | S-Square 328SR/160 |
| | S-Square 328ST/180 | S-Square 328ST/180 |
| 40 kHz | Murata MA40B5S | Murata MA40B5R |
| | Murata MA40S3S | Murata MA40E7R |
| | Nippon T40-16 | Murata MA40S3R |
| | | Nippon R40-16 |

The potentiometers 28 and 29 represent a simple way for the user to control the timeout and sensitivity settings of the sensor; the voltage from each is applied to a separate A/D channel on the microprocessor 14, and the microprocessor reads each voltage and translates this into a time period or a multiplier for the occupancy signal, respectively. Another method of controlling these settings would be through a remote control device, with settings on the control for sensitivity and timeout period. The remote could communicate with the sensor either via radio waves (which would mandate a radio receiver within the sensor) or using sonic output and the sensor's existing receiver 30.

Figure 4:
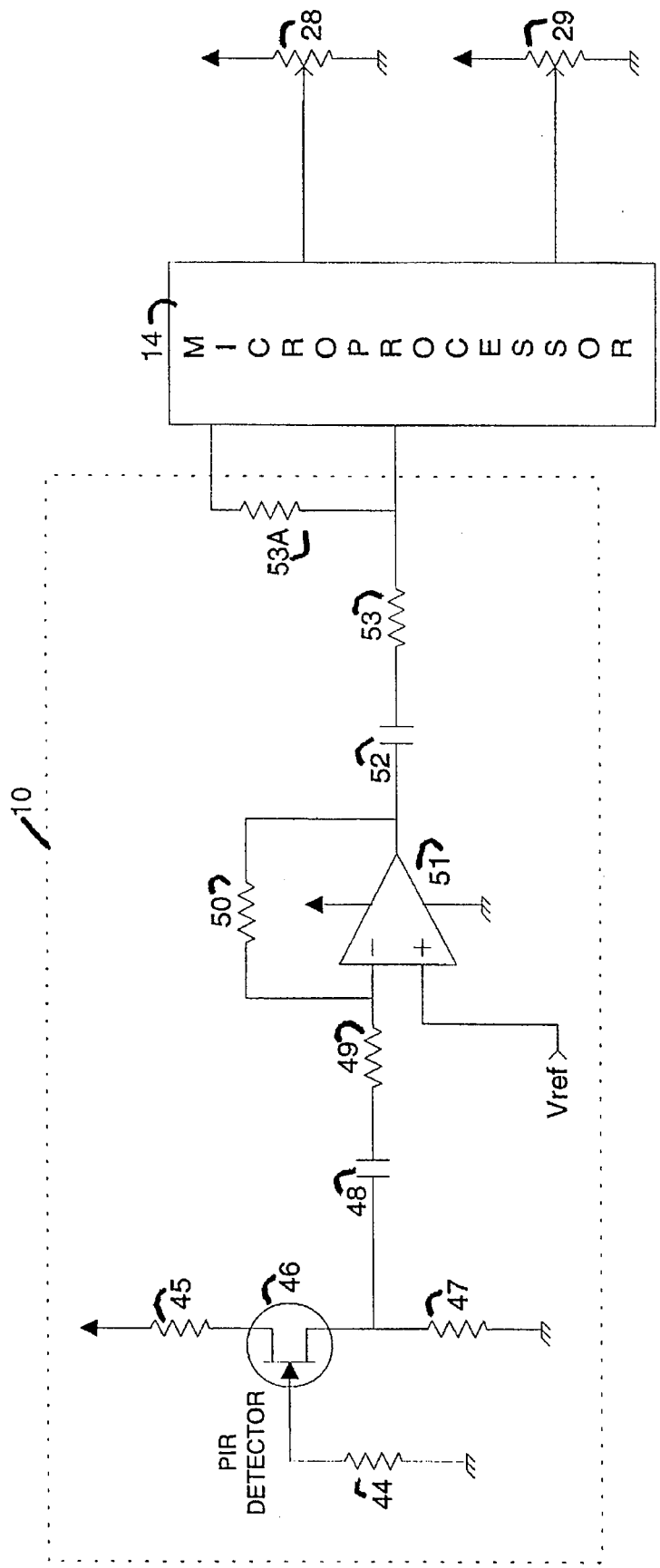
FIG. 4 is a schematic diagram of the occupancy-sensing hardware in a PIR sensor usable in the device of FIGS. 1 and 2, including manual sensitivity and timer adjustments.

FIG. 4 is the circuit which an intelligent infrared sensor uses to detect occupancy. The PIR detector 46, which is essentially an FET biased by resistors 44, 45, and 47, varies its output as a heat source moves through the space. This disturbance causes the high-pass amplifier including components 48, 49, 50, and 51 to change its output. The resulting output is filtered by the capacitor 52 and the resistor 53 to eliminate electromagnetic noise and dithered by resistor 53A, and this voltage (also known as the "occupancy signal" for a PIR detector) is applied to another A/D channel in the microprocessor 14. The potentiometers 28 and 29 once again represent timer and sensitivity adjustments similar to those of FIG. 3.

Figure 5:
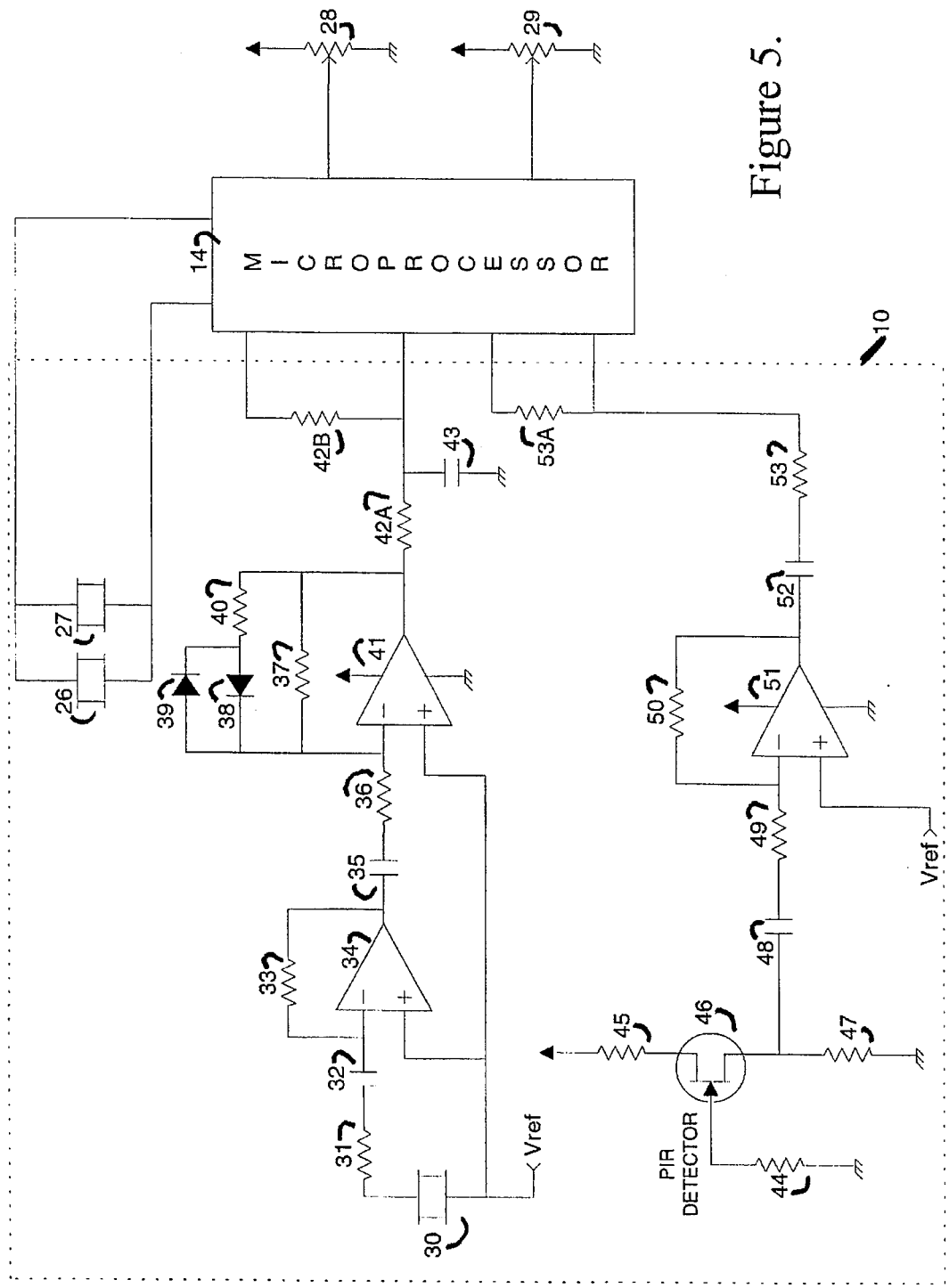
FIG. 5 is a schematic diagram of the hardware in a dual-technology (i.e., ultrasonic and PIR) sensor usable in the device of FIGS. 1 and 2, including manual sensitivity and timer adjustments.

FIG. 5 is the schematic diagram of a dual-technology intelligent sensor that combines PIR sensing with ultrasonic sensing. It is essentially a combination of FIGS. 3 and 4.

Figure 6:
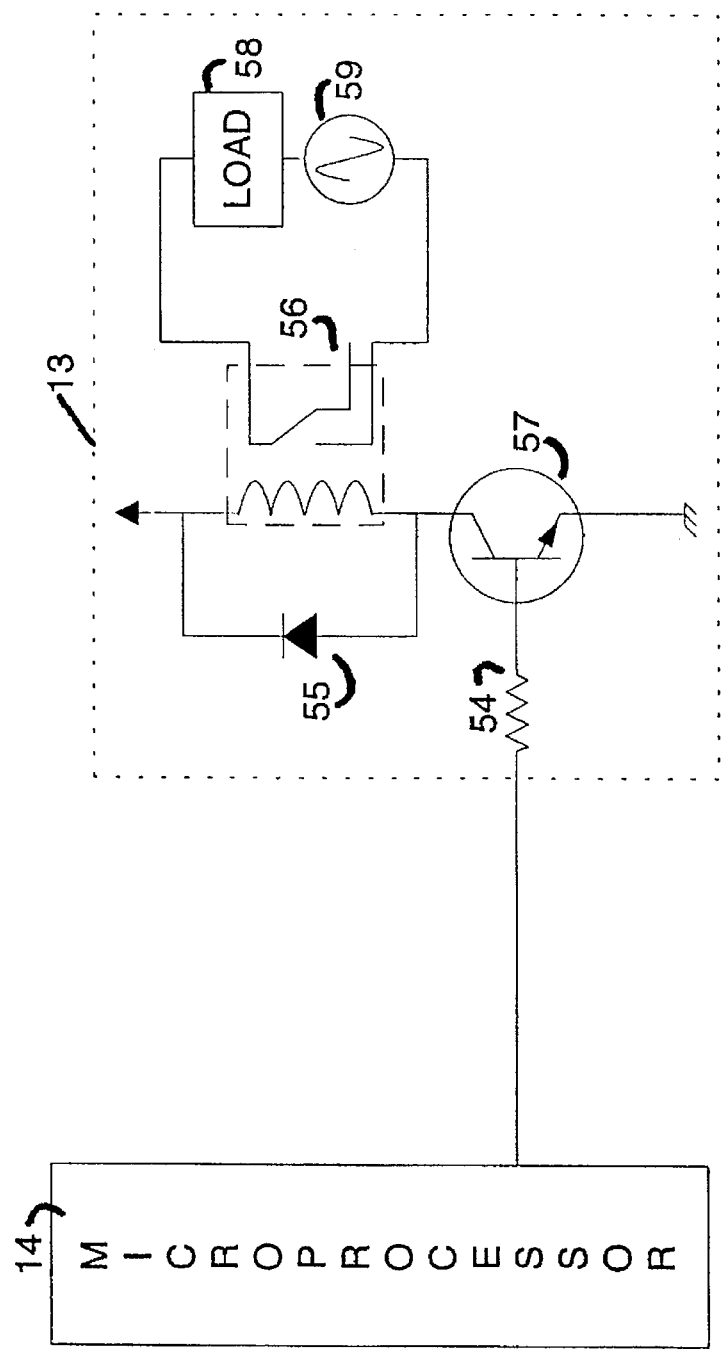
FIG. 6 is a schematic diagram of a relay driver circuit for a sensor with an internal relay for switching power on and off to the lighting load usable in the device of FIGS. 1 and 2.

FIG. 6 is a schematic diagram of the driver circuit for a latching relay to turn the load on and off. The microprocessor 14 dedicates a digital TTL output to the control circuit. When microprocessor 14 sends out a brief pulse through the resistor 54, this biases the transistor 57 so that current may flow through the relay coil 56 and allow it to latch. The load 58 may then draw current from the AC power source 59. A sensor that controls the load this way will have two of these circuits, one for setting the latching relay to turn the load on, and the other for resetting it to turn off the load. The diode 55 dissipates the energy in the inductor 56 when the relay is turned off, which prevents a voltage spike from damaging the transistor 57. Although a latching relay is contemplated in FIG. 6, it will be understood that a non-latching relay could be used that is powered continuously when load 58 is to be powered.

Figure 7:
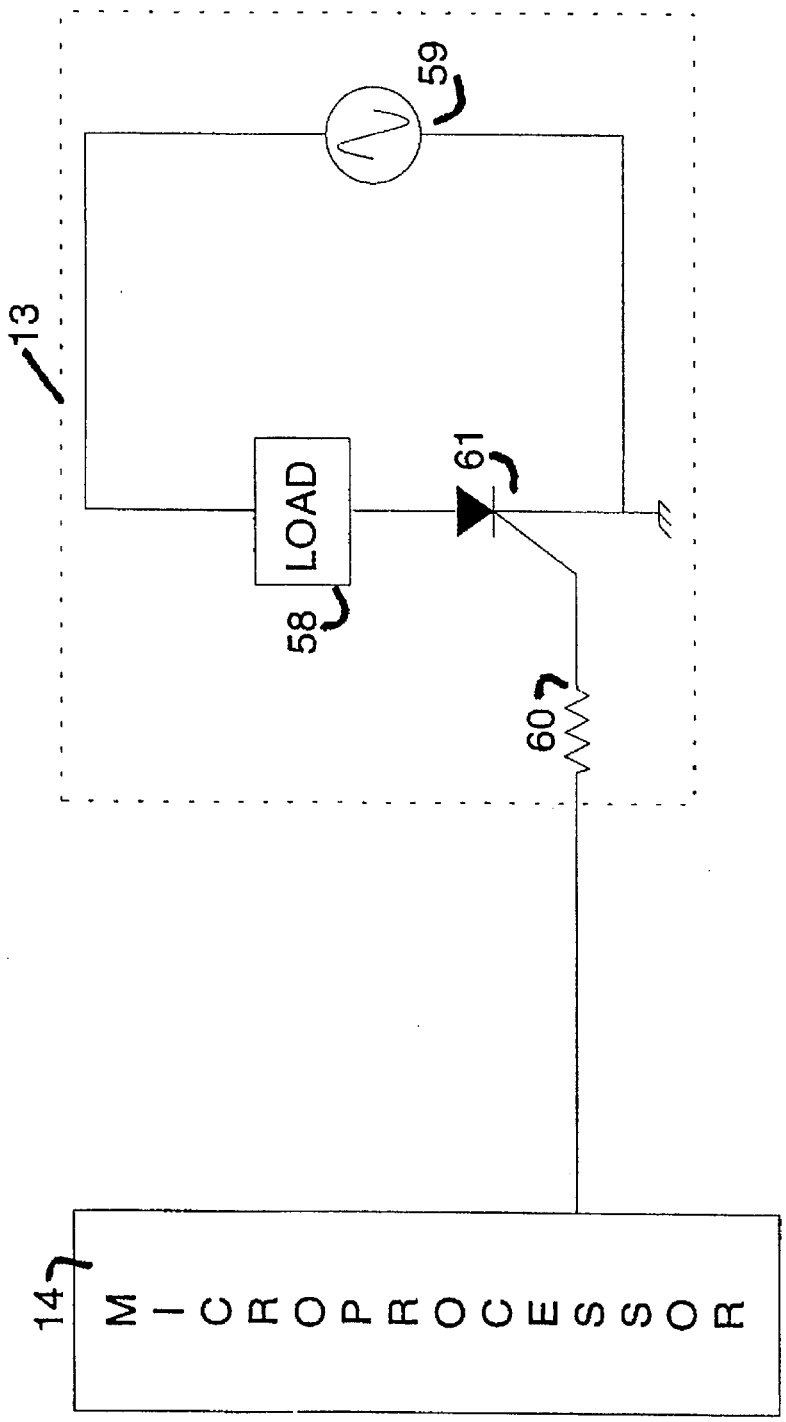
FIG. 7 is a schematic diagram of a silicon controlled rectifier (SCR) driver circuit for a sensor with an internal SCR for switching power on and off to the load usable in the device of FIGS. 1 and 2.

Another scheme for controlling a load is illustrated in FIG. 7. When the microprocessor 14 sets the appropriate TTL output to high through the resistor 60, the silicon controlled rectifier (SCR) 61 will conduct, allowing the load 58 to draw power whenever the AC voltage from the power source 59 is positive with respect to ground. When the output of microprocessor 14 is low, the SCR 61 will not conduct, and the load will not draw power. The SCR method of switching may be preferable to a relay in instances where a low-powered AC load is being controlled that can efficiently operate off of half-wave rectified AC current. An SCR may be more reliable than a relay for this application.

Figure 8:
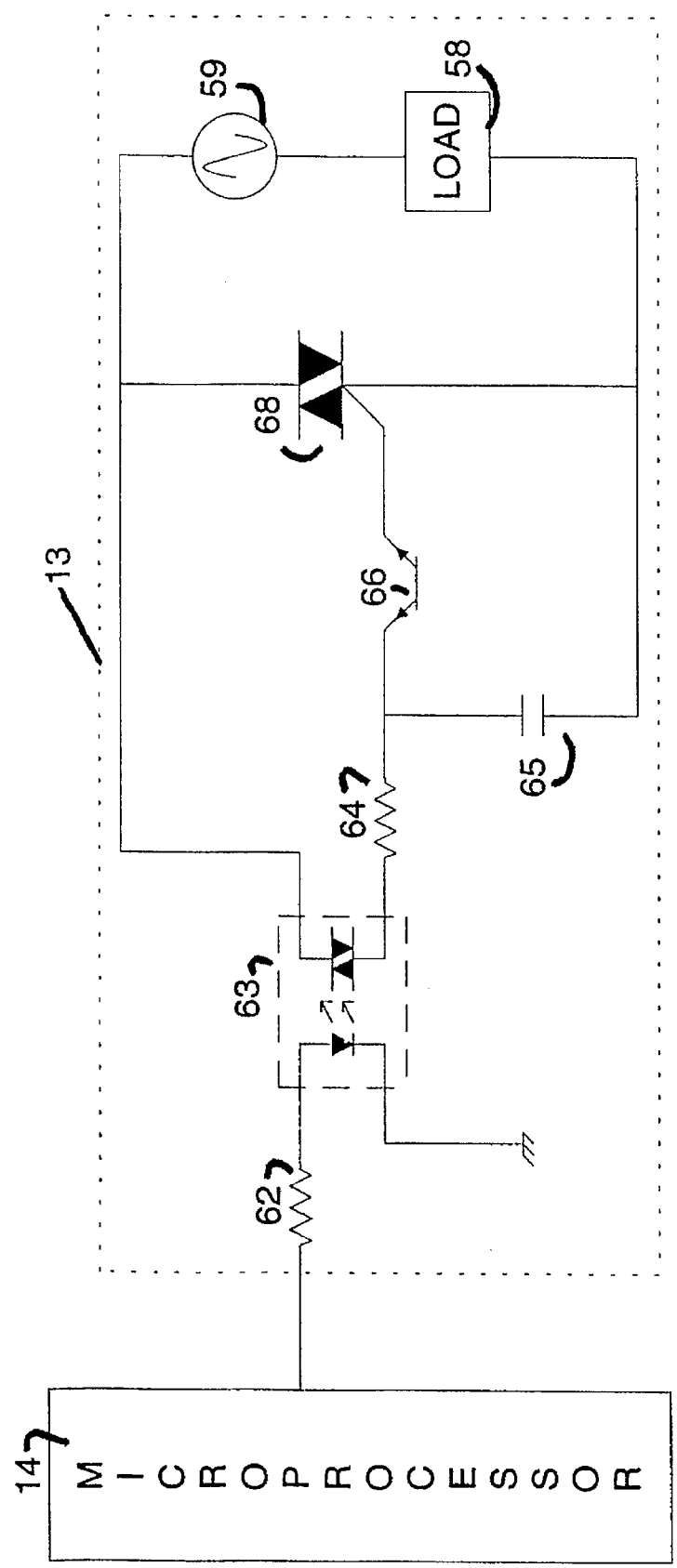
FIG. 8 is a schematic diagram of a triac driver circuit for a sensor which lacks an internal relay for switching power on and off to the lighting load usable in the device of FIGS. 1 and 2.

FIG. 8 shows a third way to drive a load, this time through a triac. When the microprocessor 14 sends out a TTL high signal through the resistor 62, the optotriac 63 conducts, charging up the capacitor 65 through the resistor 64 to the point where the diac 66 will conduct, biasing the triac 68, whereupon triac 68 will conduct current in either direction from the AC power source 59 through the load 58. A triac lasts longer in use than a relay and can conduct AC current unlike an SCR.

Figure 9:
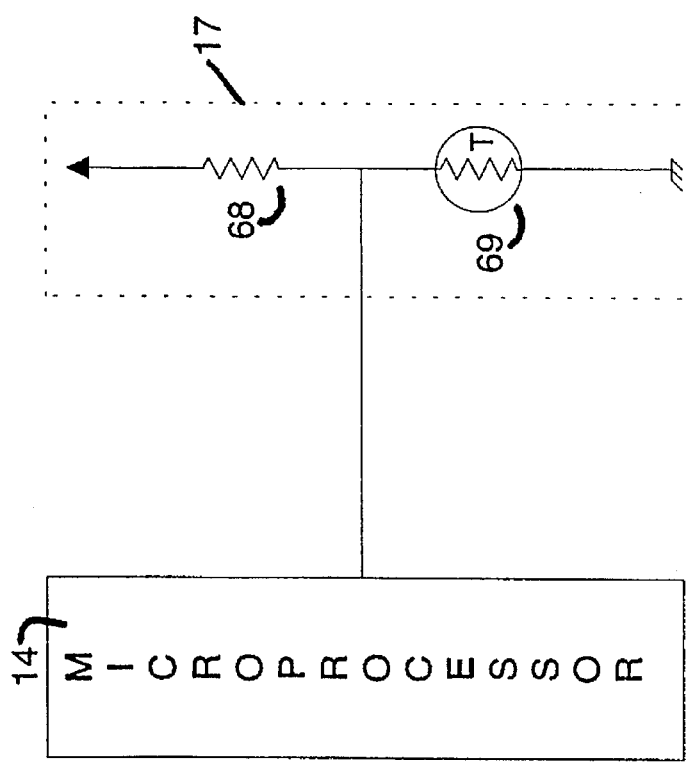
FIG. 9 is a schematic diagram of a temperature-activated overload detection circuit usable in the device of FIGS. 1 and 2.

The overload protection circuit of FIG. 9 uses a thermistor 69 to determine when the sensor is overheating due to an overload condition. The thermistor 69 and the resistor 68 form a voltage divider; as the temperature rises, the impedance of the thermistor 69 goes up while that of the resistor 68 remains fairly constant, and hence the voltage into the microcontroller 14 also rises. When the A/D input to the microprocessor 14 from thermistor 69 reaches a certain threshold voltage, the microprocessor 14 can then shut the system down, preventing the overload from damaging the sensor. The temperature reading may also be used to control electrical loads such as a building's air conditioning and heating systems.

Figure 10:
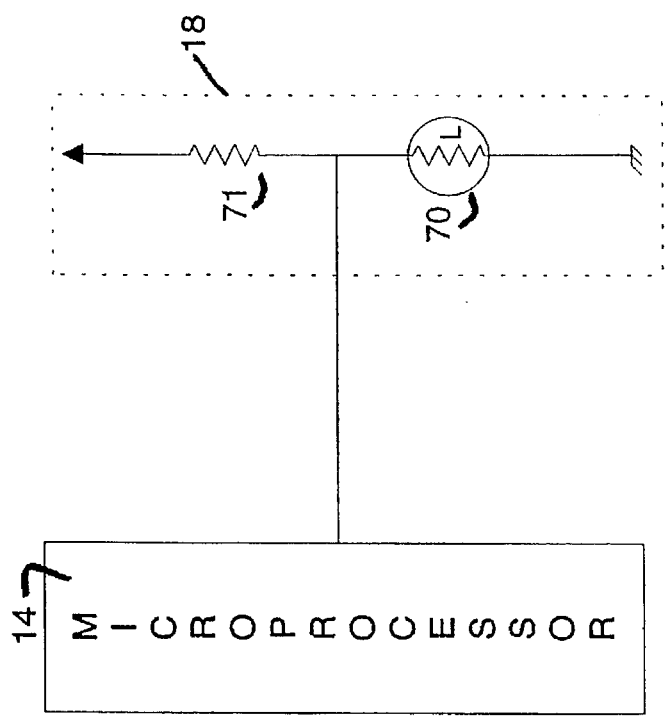
FIG. 10 is a schematic diagram of a light-level sensing circuit usable in the device of FIGS. 1 and 2.

FIG. 10 is a circuit for sensing the light level in a room. Its operation is similar to that of the overload protection circuit of FIG. 9, in that the resistor 71 and the photoresistor 70 act as a voltage divider. When the photoresistor 70 is exposed to light, its impedance decreases, driving down the input voltage to the A/D input to the microprocessor 14. When the lights are off and the sensor senses motion, the sensor can check the ambient light level through use of the circuit of FIG. 10. If it is bright enough in the room that the lights are unnecessary, the sensor can elect not to switch the lights on.

Figure 11:
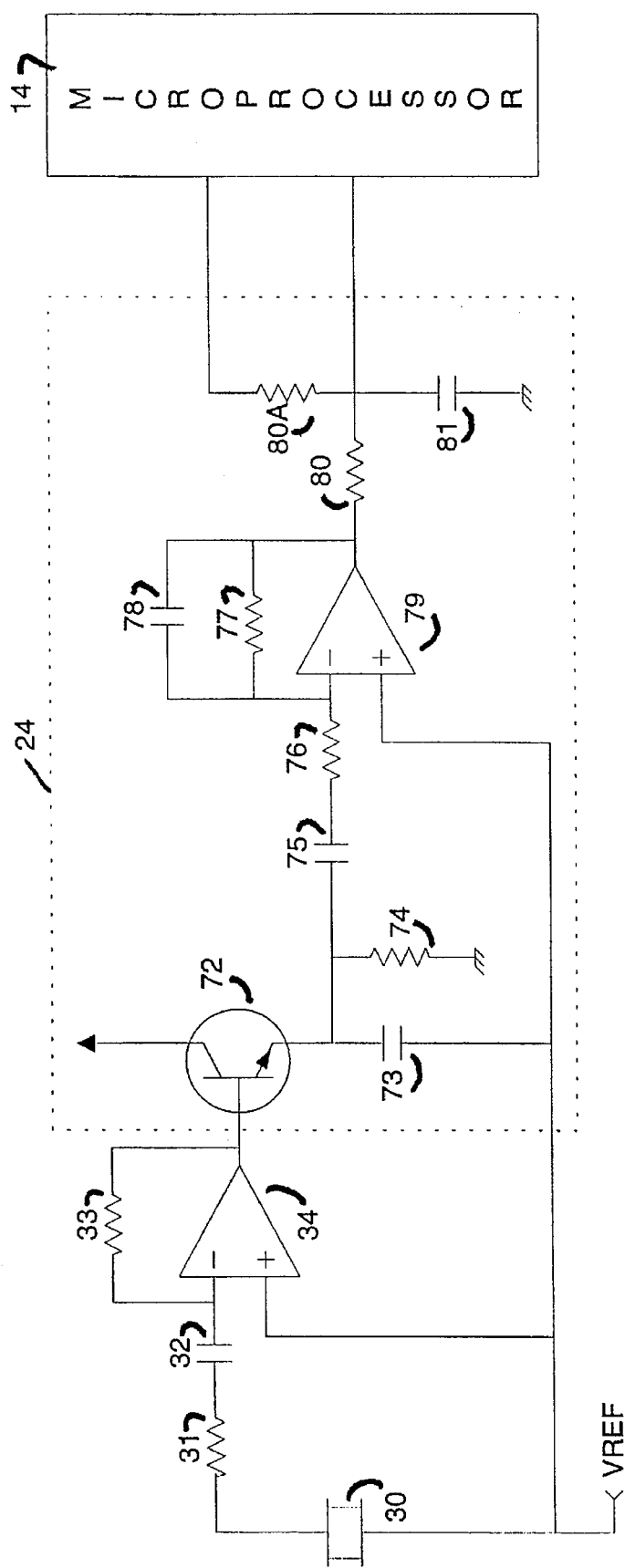
FIG. 11 is a schematic diagram of the circuitry to recognize the presence of a self-test signal echo usable in the device of FIGS. 1 and 2.

FIG. 11 shows the independent signal-processing hardware to detect the self-test signal. The receiver 30 and the first-stage high-pass amplifier including components 31, 32, 33, and 34 are the same as those in FIG. 3. The next stage is a peak detector including components 72, 73, and 74. The output of the peak detector is applied to the bandpass amplifier comprising components 75, 76, 77, 78, and 79 that functions to smooth out the jagged output of the peak detector. This result is noise-filtered by the resistor 80 and the capacitor 81 and dithered by the resistor 80A, and is then fed to one of the A/D channels on the microprocessor 14. The output of this peak detector circuit may be used for purposes other than self-test. For example, it may be used in parallel with or as an alternative to the quadrature detection strategy outlined in FIGS. 19a and 19b.

Figure 12:
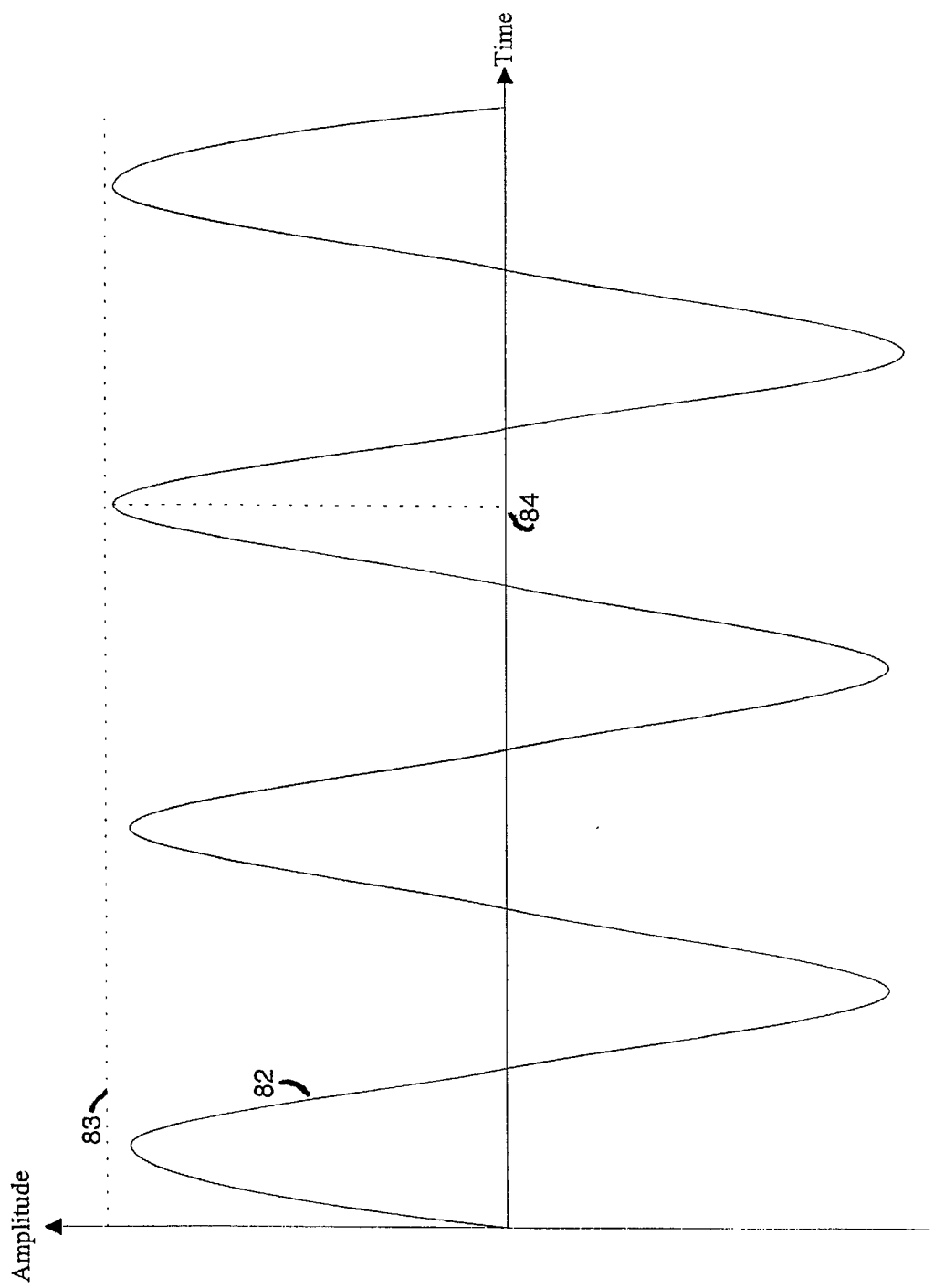
FIG. 12 is an illustration of a small variation in a large carrier echo in accordance with the present invention.

The main advantage of peak detection over simple quadrature sampling of the return echo is that a peak detector can more easily detect small changes in a large carrier. Consider the carrier 82 of FIG. 12, which is very close to the saturation threshold 83. This situation can occur in a small room with walls which reflect sound energy very efficiently. The small increase in the carrier 82 at time 84 is likely to be difficult to detect, as it is such a small fraction of the carrier amplitude; increasing the carrier amplification, on the other hand, would only cause the carrier 82 to reach the saturation threshold 83, at which point no change in its magnitude could be detected. A peak detector, however, can simply cut out the DC level of the peak amplitude of the carrier 82 and amplify the small change at time 84, making it very noticeable.

Figure 13:
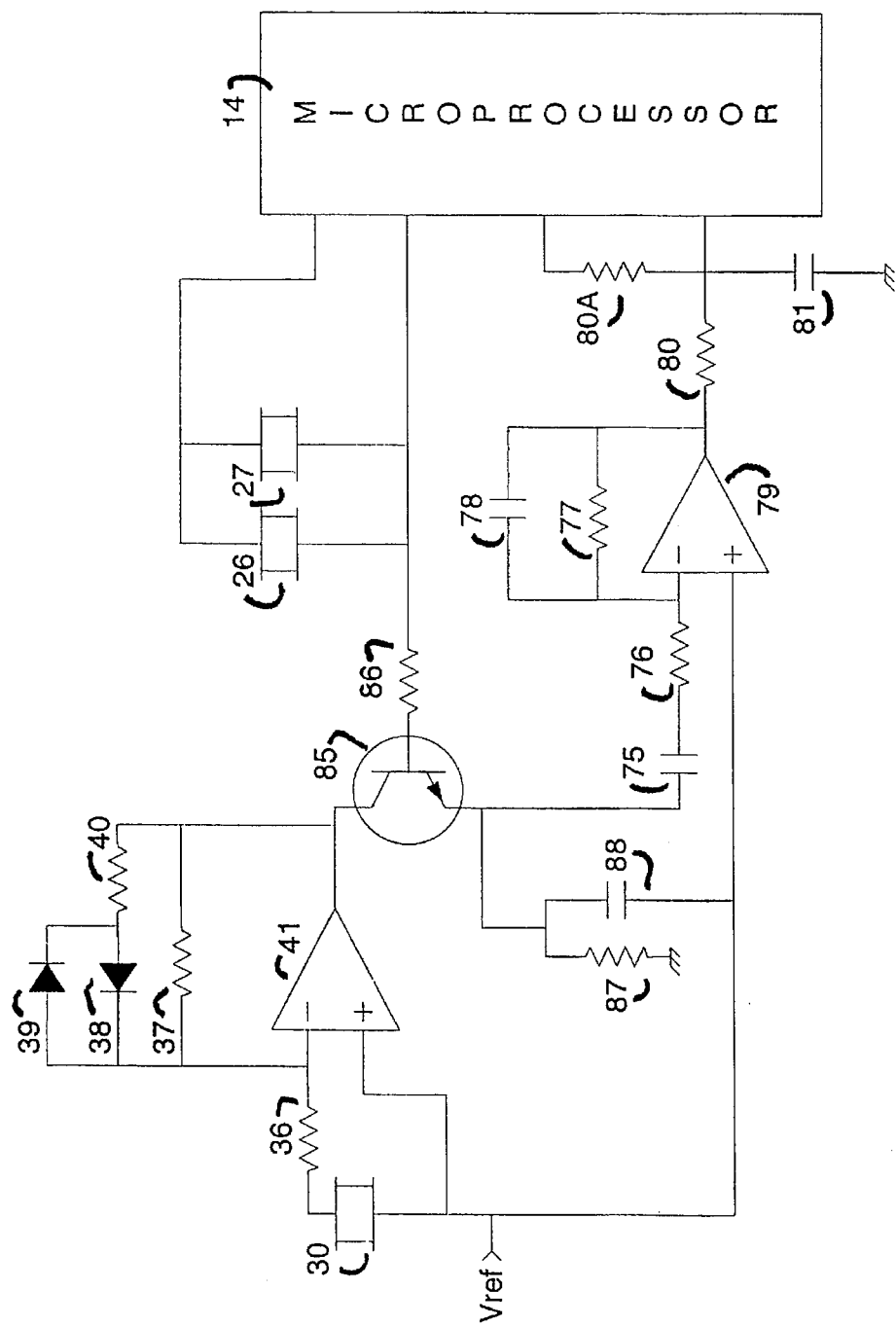
FIG. 13 is a schematic of a circuit which provides synchronous peak detection for use in the device of FIGS. 1 and 2.

A synchronous peak detection circuit is depicted in FIG. 13. The microprocessor 14 drives the transmitters 26, 27 with a waveform of much less than 50% duty cycle, which will both conserve energy output to the transmitters 26, 27 and will provide a very short switching pulse to the transistor 85 through the resistor 86. This transistor, along with the resistor 87 and capacitor 88, will provide the running peak level of the signal from the receiver 30 at the sampling times, which are synchronized to the transmitter outputs. The components 36 through 41 form the same nonlinear amplifier as depicted in FIG. 3, and the components 75 though 81 form the same bandpass amplifier as described in FIG. 11.

Figure 14A:
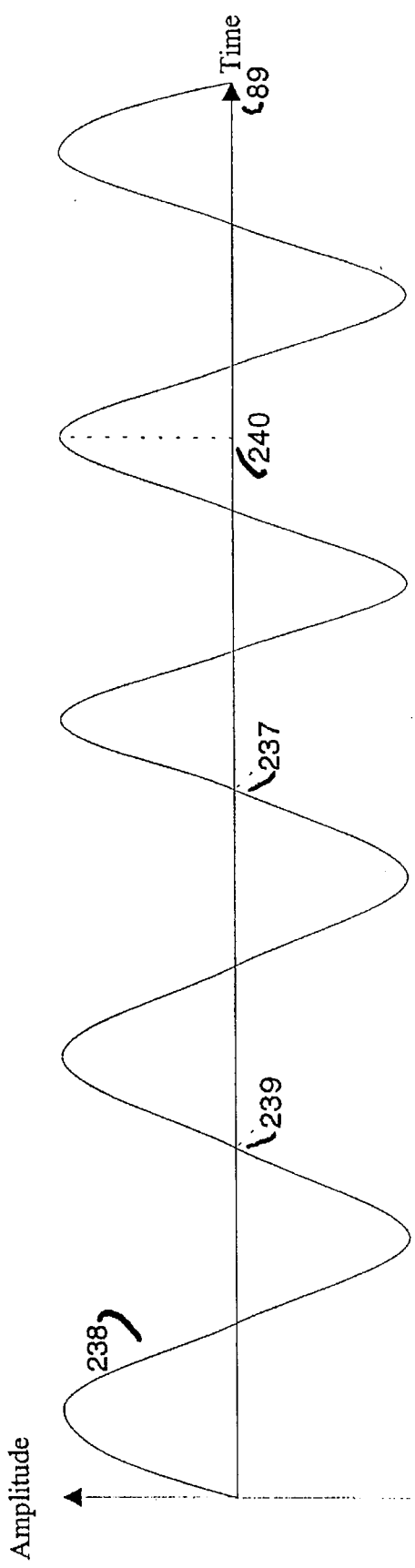
FIG. 14 is a timeline of events during synchronous peak detection in accordance with the present invention.
Figure 14B:
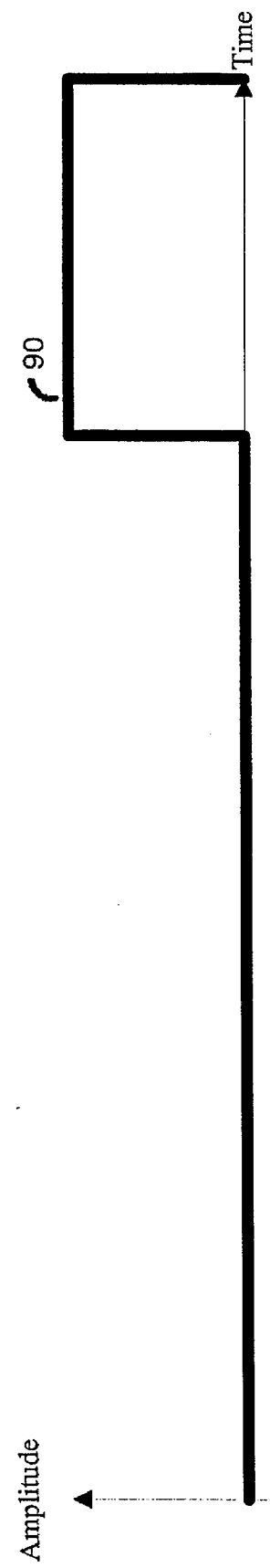

The advantages of synchronous peak detection over ordinary peak detection are illustrated in FIG. 14. At time 237, the carrier 238 increases in frequency but maintains a constant amplitude (an unrealistic incident, but one which illustrates the principle simply). An ordinary peak detector would not change its output level in this example, although the Doppler shift at time 237 clearly indicates motion. However, the synchronous detector samples the waveform at times 239, 237, 240, and 89, and its output 90 clearly reflects the change in frequency at time 240.

Figure 15:
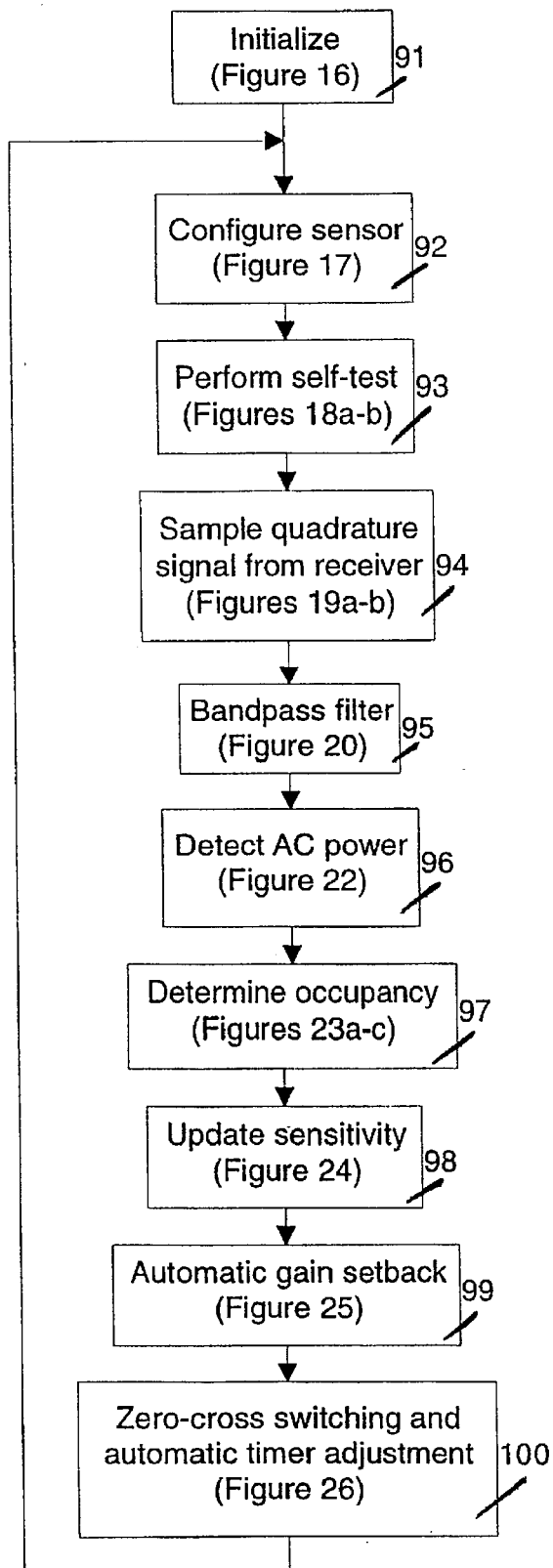
FIG. 15 is a global flowchart of the operation of the device of FIGS. 1 and 2 in accordance with the method of the present invention.

FIG. 15 is a global flowchart of the method of the present invention. In practice, the flowchart of FIG. 15 (and FIGS. 16–27) is coded into appropriate form and loaded into the program memory of microprocessor 14 to cause microprocessor 14 and its associated circuitry to perform the method of the present invention. An exemplary coded program is included in the Appendix. Upon startup, the sensor goes through an initialization 91. It then enters the main loop, around which it circulates until the watchdog timer expires.

At the start of the main loop, the sensor determines the room size and performs some elementary configuration 92. It then performs a self-test to determine that the signal path is complete 93. Next, the sensor takes two quadrature samples from the receiver 94, and runs the occupancy signal through the bandpass filter 95. The sensor then checks to see if it still has AC power 96, and then processes the output of the bandpass filter to determine if it has seen motion 97. The sensor updates its sensitivity to reflect changes in the user-controlled setting or automatic adjustments 98. Finally, the sensor will go into automatic gain setback 99 if it is time to do so, and if it is just now turning the lights on, it will perform zero-cross switching and automatic timer adjustment 100. It then goes back to the beginning of the main loop. The main loop is subject to periodic interruption in order to drive the ultrasonic transmitter. The interrupt routine is described below with reference to FIG. 27.

Figure 16:
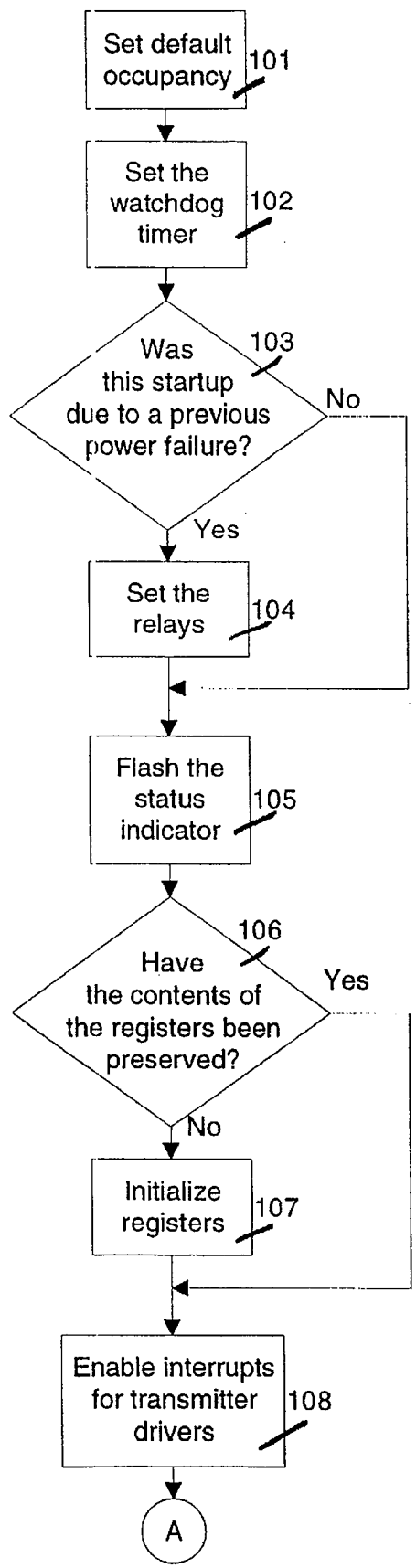
FIG. 16 is a flowchart of the initialization procedure of the present invention.

The initialization phase 91 is expanded in FIG. 16. The sensor first sets its default occupancy 101; for example, assuming that the room is occupied on power-up and turn the lights on. The sensor then sets the watchdog timer 102 to time out in a predetermined period of typically 72 milliseconds, although other periods would also be acceptable. This determines the delay between the power shutting off and the sensor resetting itself. If the sensor's most recent startup was the result of a power failure 103, it then sets the relay 56 again 104 (also see FIG. 6), just in case the power supply had not turned on quickly enough at startup to trigger the relay 56 on the first time. The sensor flashes the status indicator 105 to indicate that it is resetting. If the startup is due to a momentary power failure and the sensor's registers are preserved intact 106, the program then skips initializing them 107. The last initialization task is to enable interrupts for the transmitter drivers 108; this allows the microprocessor to drive the transmitters at the same time as it performs its other tasks (also see FIG. 27 and supporting text).

Figure 17:
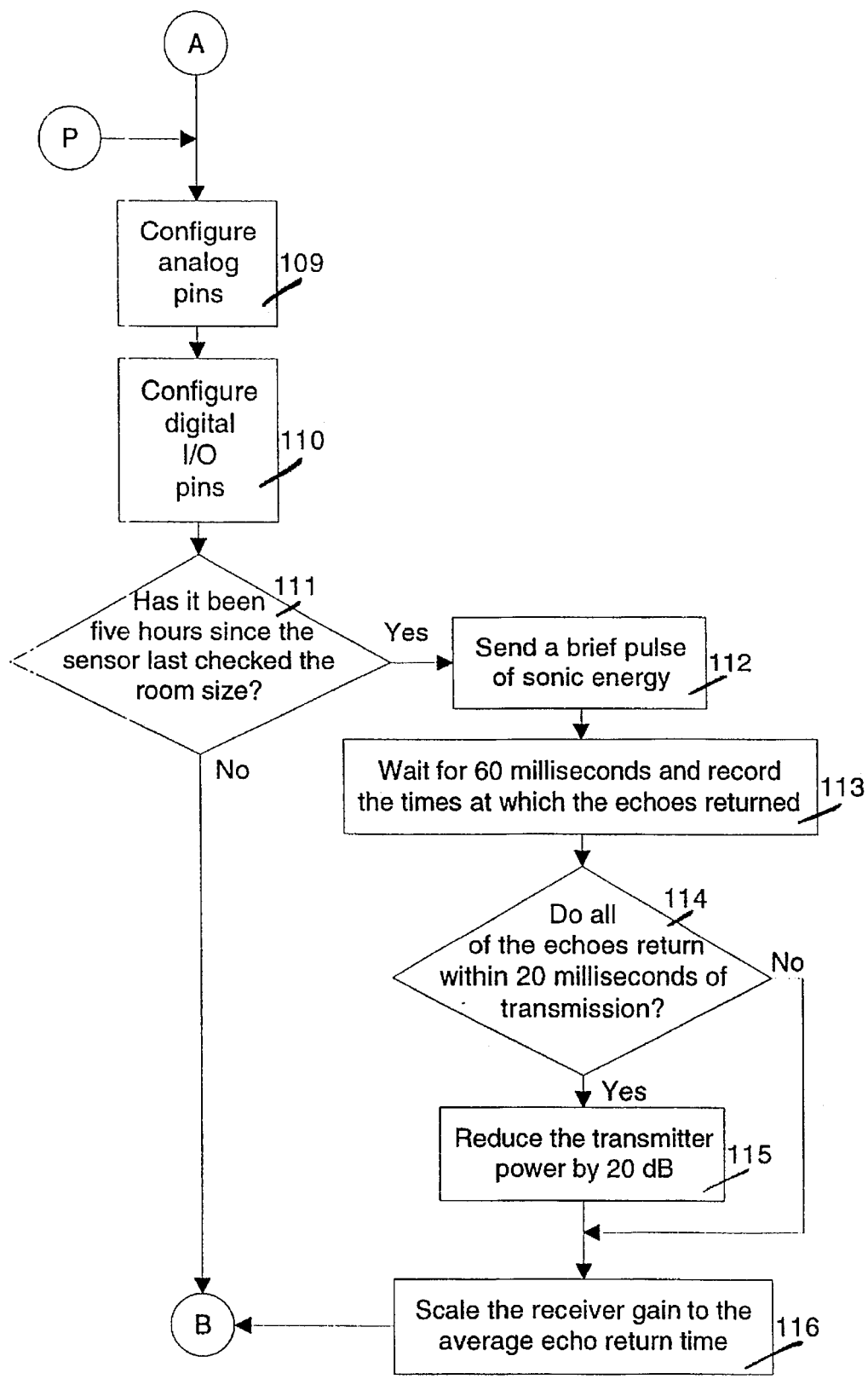
FIG. 17 is a flowchart of the method which configures the sensor in accordance with the present invention.

FIG. 17 expands upon the steps required to configure the sensor (step 92 of FIG. 15). Most microprocessors require the program to configure the status of the analog input pins 109 and any bidirectional digital input/output pins 110. In addition, the sensor checks the size and configuration of the space every so often (for example, every five hours, as determined by the conditional 111) by sending a brief sonic ping 112 and then listening to the echoes for 60 milliseconds 113. If all of the echoes return within 20 milliseconds 114, then the room is quite small and the transmitters are putting out too much signal for such a small space, so the sensor reduces their power by 20 dB 115. The average return echo time also gives some indication of the room size, so the program varies the scale factor of the occupancy signal based upon the average echo delay 116.

Figure 18A:
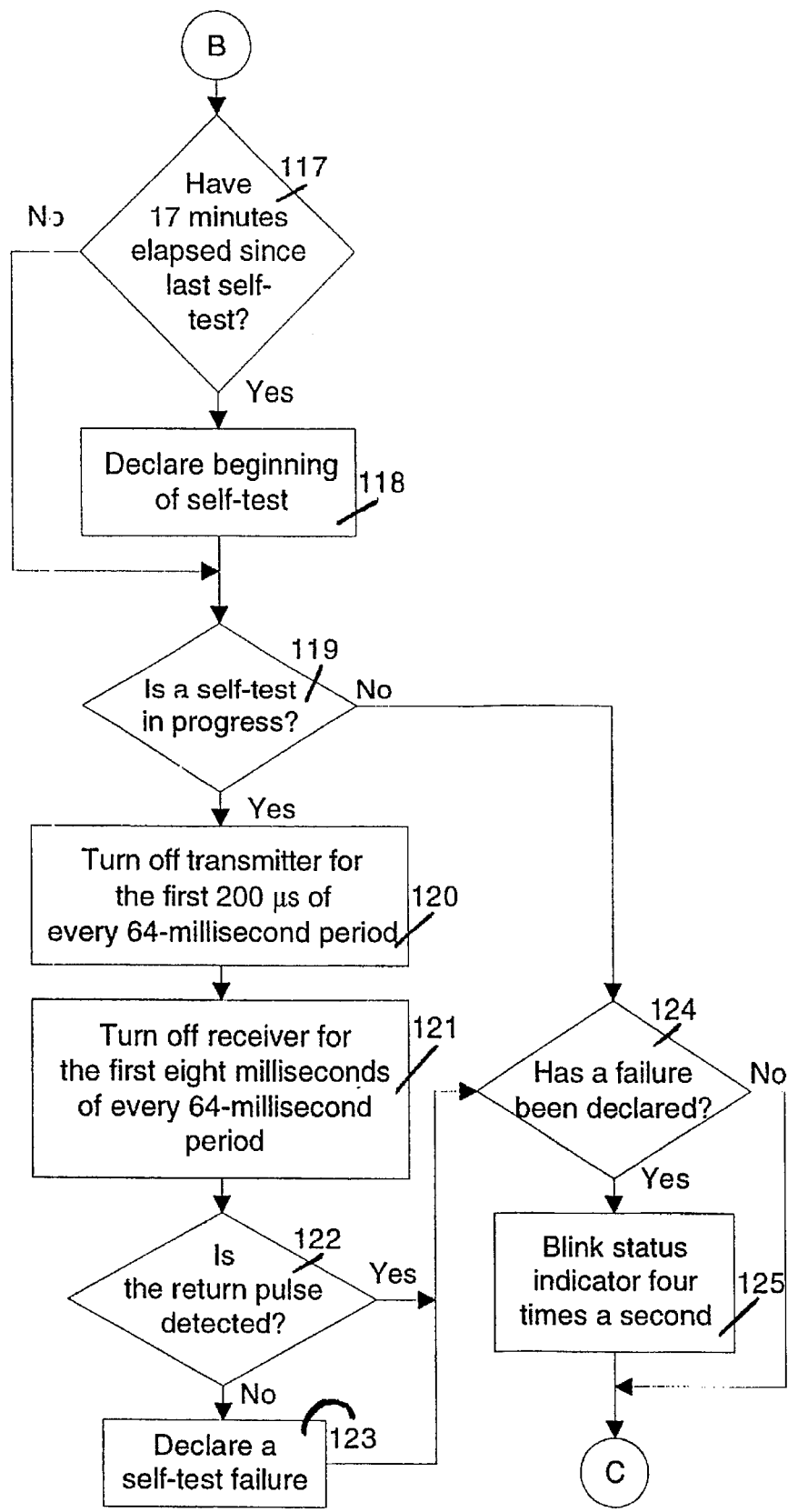
FIGS. 18a and 18b are a flowchart of the method that sets up the sensor self-test in accordance with the present invention.
Figure 18B:
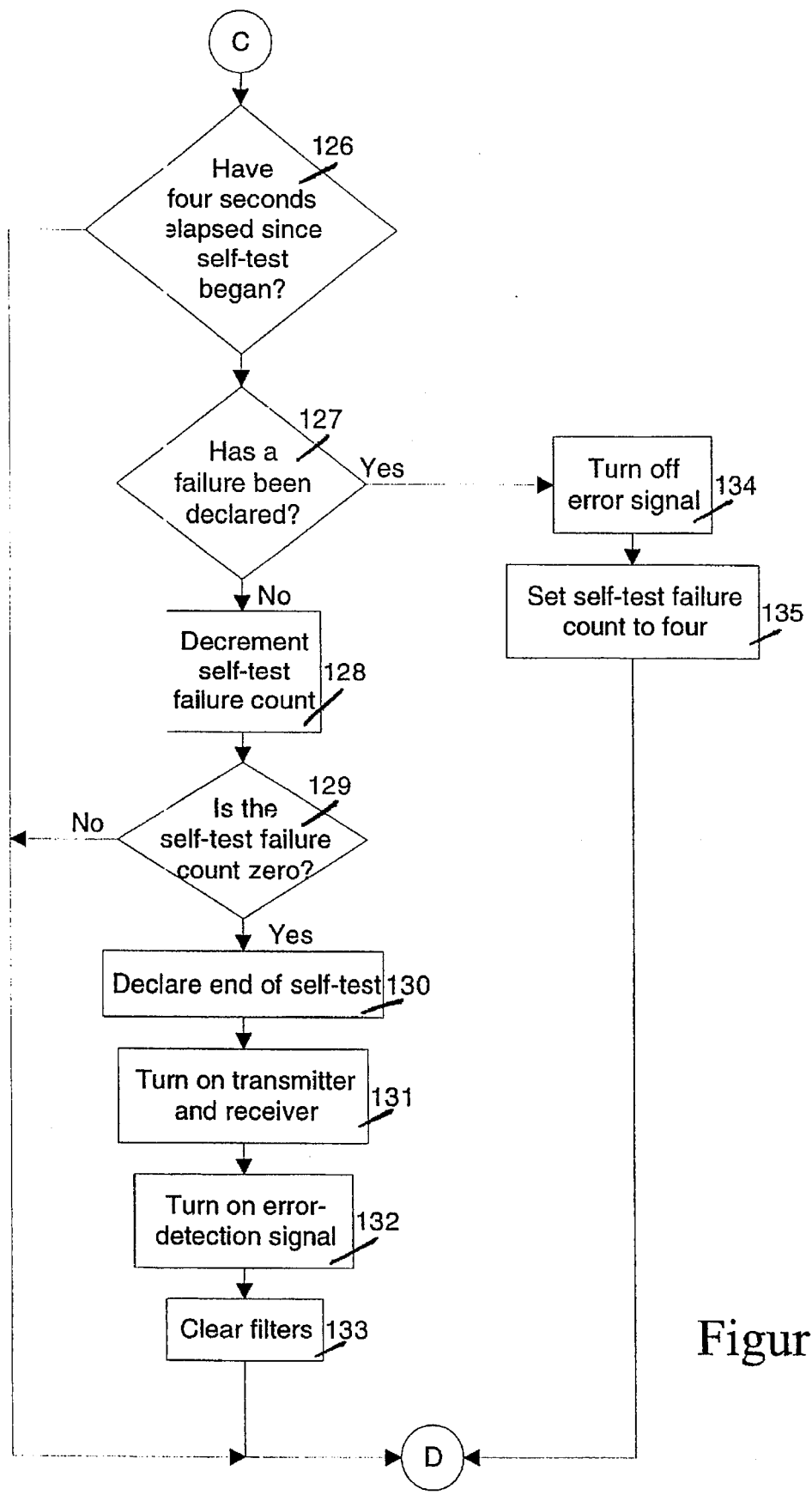

The flowchart in FIGS. 18a and 18b shows the steps of the self-test routine (step 93 of FIG. 15). If a predetermined time (for example, 17 minutes, as determined in the conditional 117) have passed since the last self-test, the sensor initiates a new self-test 118. If a self-test is in progress 119, the sensor will turn off its transmitter for 200 microseconds every 64 milliseconds 120 and make the receiver go deaf until eight milliseconds later 121; if the return echo does not exhibit a brief drop in signal strength 122, then the sensor declares a failure 123. If a failure has been declared 124, either just now or previously, then the sensor blinks the status indicator rapidly to indicate that there is something wrong 125. If it has been four seconds since self-test began 126 and a failure is declared 127, then the sensor turns off its error signal to an external lighting device to indicate a problem 134 and sets its self-test count to four 135; this means that the sensor must pass self-test four consecutive times following a failure in order to pass. If no failure has been declared, the program decrements the self-test count 128. If the self-test failure count is zero 129, then the sensor has passed and comes out of self-test 130, turns on its transmitter and receiver 131, reinstates its error-detection signal 132, and clears its filters 133.

Figure 19A:
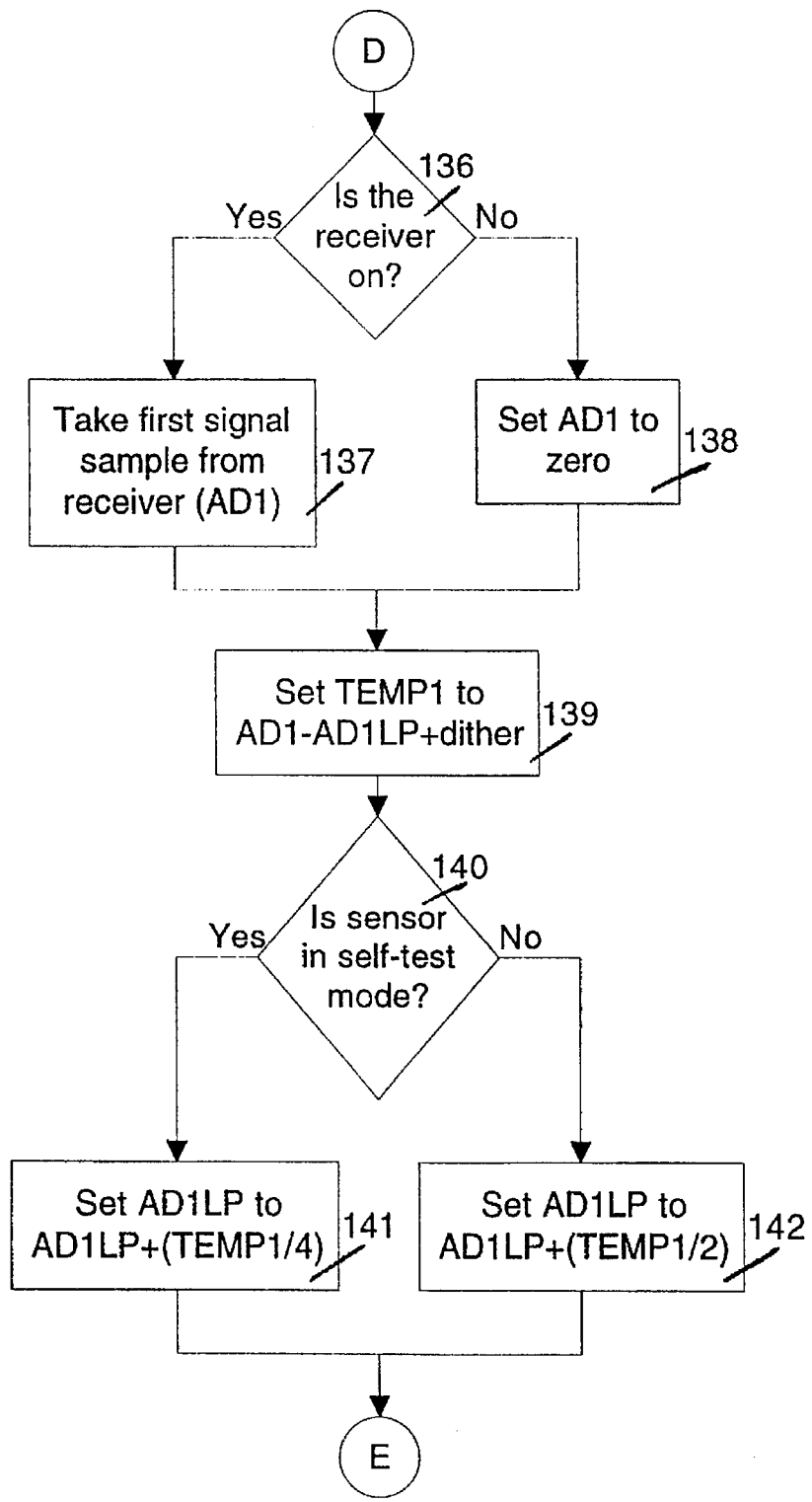
FIGS. 19a and 19b are a flowchart of the method that takes a quadrature sampling of the signal received by the sensor in accordance with the present invention.
Figure 19B:
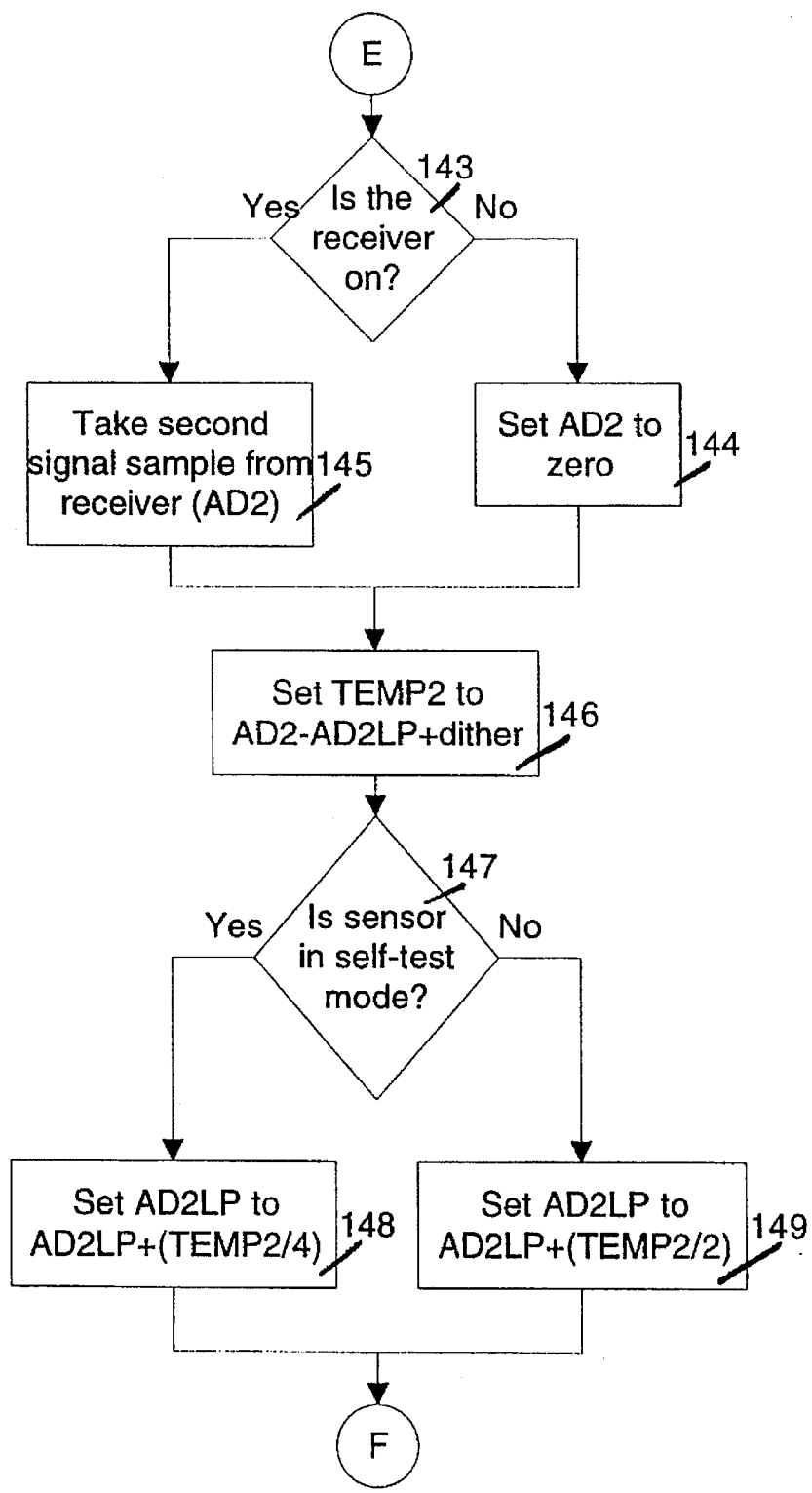

FIGS. 19a and 19b outline the process of quadrature detection (step 94 of FIG. 15). If the receiver is enabled 136, the sensor takes its first sample of the occupancy signal and stores it in the register $AD_1$ 137; if it is off, $AD_1$ gets the value zero 138. Register $TEMP_1$ gets a high-pass value of $AD_1$ plus a dither to diminish the effects of noise on the lowest-order bit of the digitizer 139. The sensor then determines the next value of $AD_{1LP}$, the low-pass version of $AD_1$, using separate filters for ordinary operation 141 and for self-test 142, as determined in the conditional 140. These same operations are then performed on the second sample of the occupancy signal in steps 143, 144, 145, 146, 147, 148 and 149. This second sampling is timed to be approximately 90 degrees from the previous sample, and is stored in the register $AD_2$.

Figure 20:
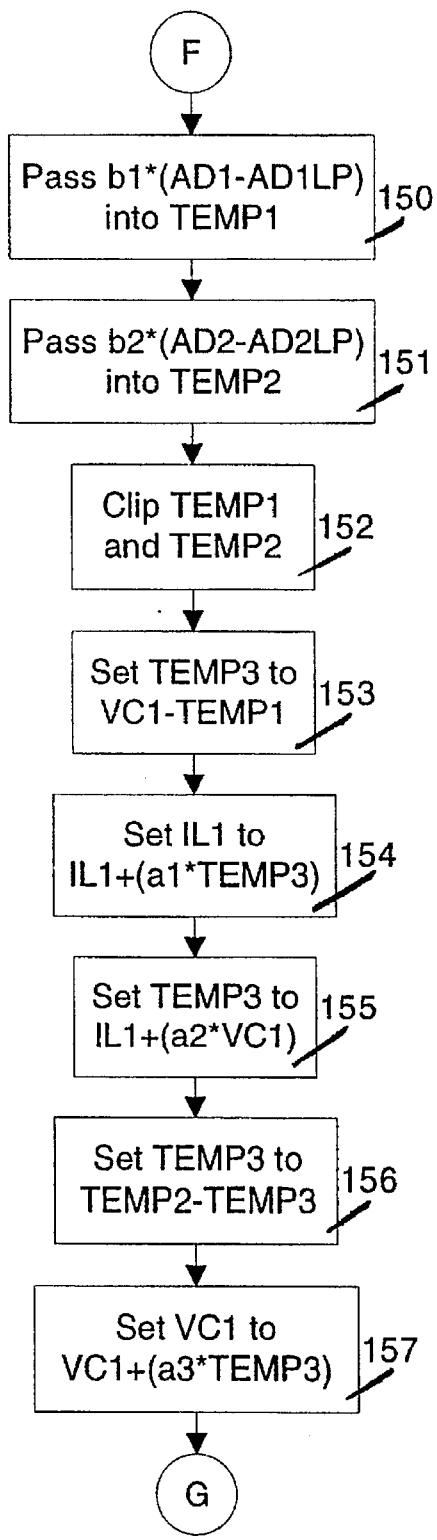
FIG. 20 is a flowchart of the bandpass filter method in accordance with the present invention.

The bandpass filter of FIG. 20 simulates an LC series circuit driven by an AC current source (step 95 of FIG. 15). The register $I_{L1}$ represents the current through the inductor; the register $V_{C1}$ represents the voltage across the capacitor, and is the output of the bandpass filter. The coefficients $b_1$ and $b_2$ are the gain of the input signal, the analog of which is the current source in the LC model, and are used as amplification factors for the input values ($AD_1-AD_{1LP}$) 150 and ($AD_2-AD_{2LP}$) 151, respectively. Note that for synchronous peak detection, there is no second quadrature sample, and hence $AD_2-AD_{2LP}=0$. These amplified values are then clipped in the software to prevent saturation of the filters 152. The coefficients $a_1$ and $a_3$, as introduced in steps 154 and 157 respectively, determine the frequency characteristics of the bandpass filter, while the coefficient $a_2$ used in step 155 determines the filter's Q. These values can be altered for different applications (ceiling, stairwell, wall-mounted and corridor applications, for example), either by programming them into the microprocessor 14 or by using jumpers to select the application and hence the values to be used. Step 156 calculates the damping of $V_{C1}$ in step 157. The mathematical operation of the bandpass filter is described below in more detail with reference to FIGS. 21 and 28.

The digital bandpass filter described above may be dynamically altered during sensor operation, unlike an analog filter with fixed values. This can be useful for several reasons: as an alternative to automatic gain setback (described in FIG. 24), by altering the filter parameters to see only full-body motion rather than the cruder expedient of simply lowering the sensitivity; or to make the sensor function as both a load controller and as a security sensor, the latter of which would utilize a more demanding motion detection method to make certain that the sensor was not creating a false alarm.

Figure 21:
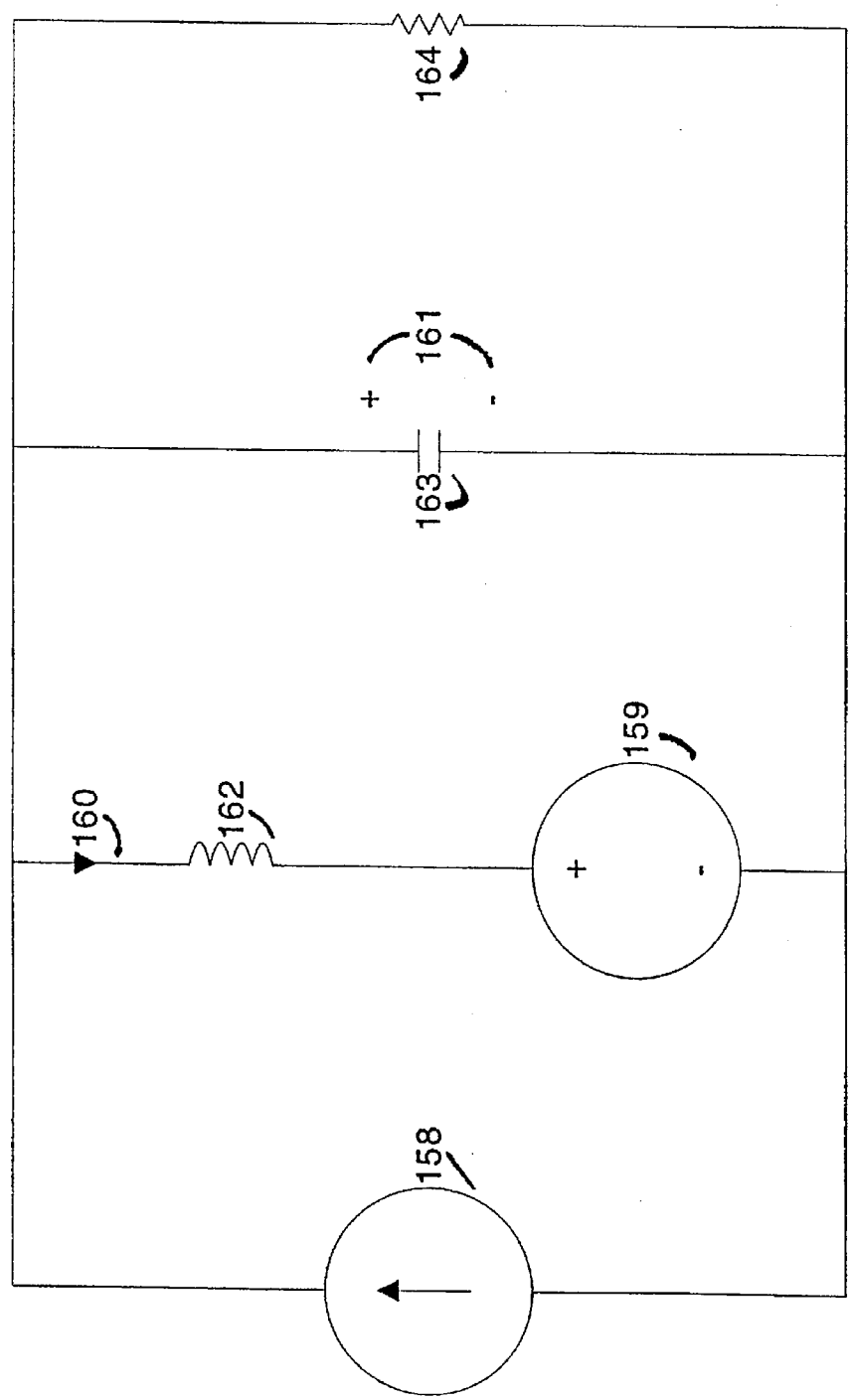
FIG. 21 is a schematic of the equivalent circuit of the bandpass filter of FIG. 20 in accordance with the present invention.

FIG. 21 is the equivalent circuit of the bandpass filter described in FIG. 20. The two inputs to the filter are depicted as the current source 158 and the voltage source 159. The output variables $I_{L1}$ and $V_{C1}$ are represented by the current 160 and the voltage 161 respectively. The value of the inductor 162 is $t/a_1$, where t is the time between samples; the value of the capacitor 163 is $t/a_3$; and the value of the damping resistor 164 is $1/a_2a_3$.

Figure 22:
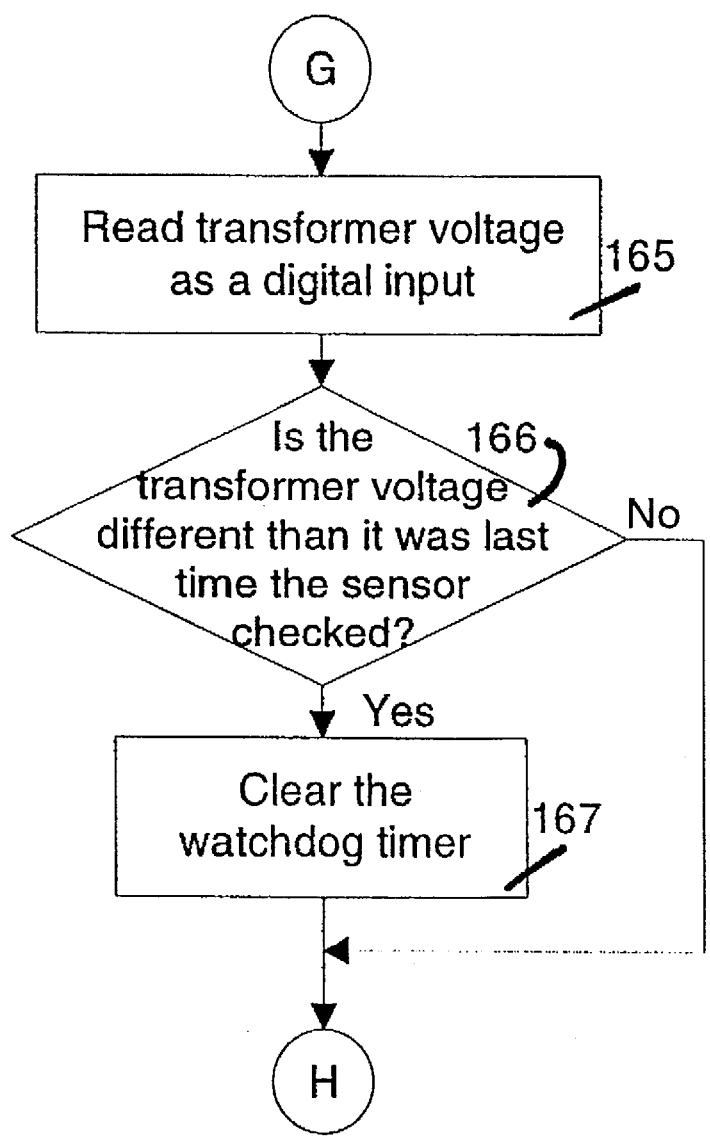
FIG. 22 is a flowchart of the method that detects the presence or absence of AC power to the load in accordance with the present invention.

The sensor uses the watchdog timer and a digital input to the microprocessor 14 to reset itself when the power fails; the specific method is shown in FIG. 22 (step 96 of FIG. 15). The voltage from the AC power to the load is sampled by the 60 Hertz detect stage 16, which reduces the line voltage by a large factor so as to permit its introduction into a TTL input. If the AC power is still active, then this digital input will oscillate at 60 Hertz; if not, then it will remain in one state or another. The program reads the transformer voltage once per pass through the main loop 165. Every time the digital input changes state 166, the program clears the watchdog timer 167. If AC power is absent for more than a predetermined period, for example 72 milliseconds, the watchdog timer will time out and reset the sensor.

Figure 23A:
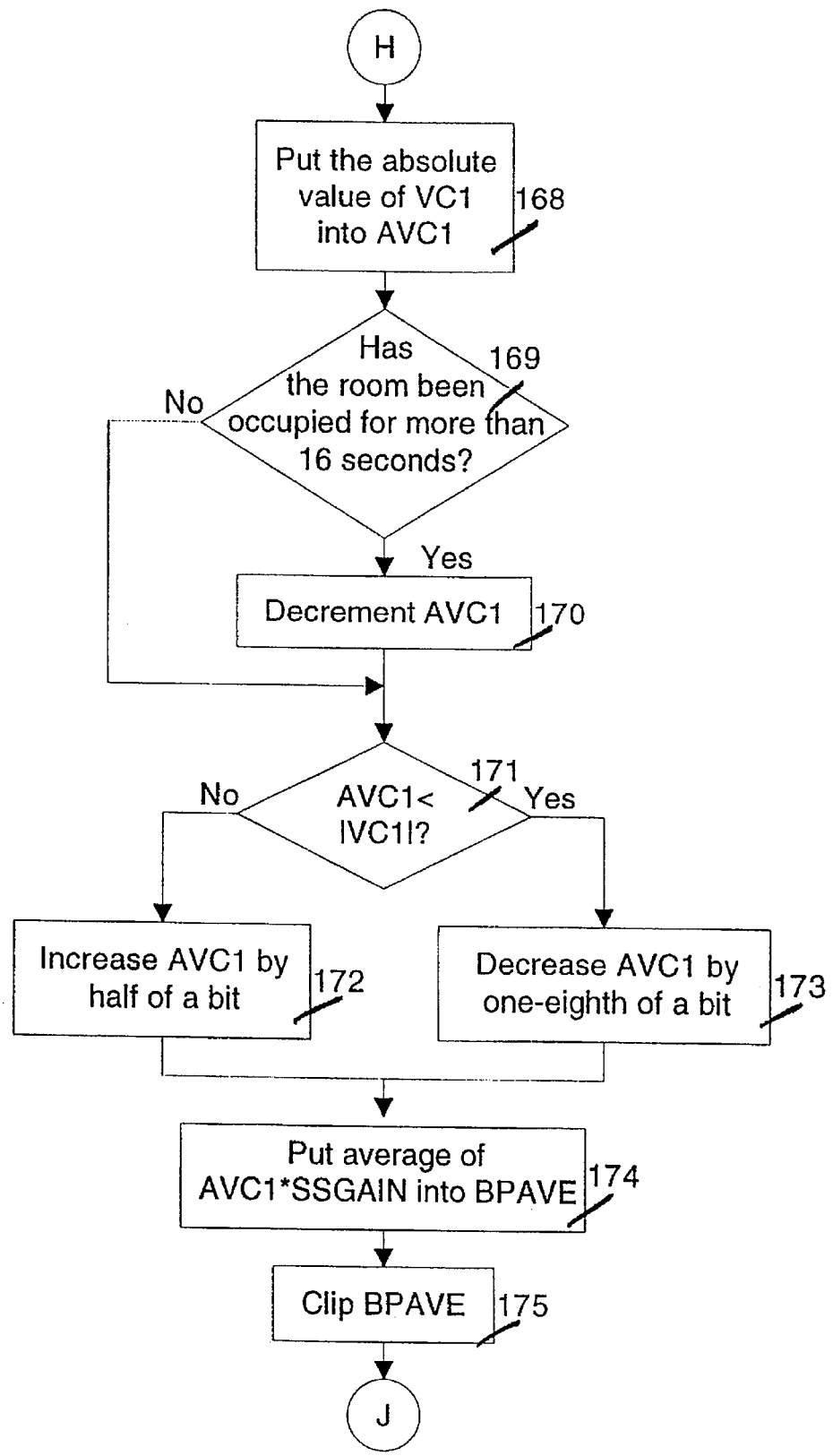
FIGS. 23a, 23b, and 23c are a flowchart of the method that determines whether the space is occupied or not in accordance with the present invention.
Figure 23B:
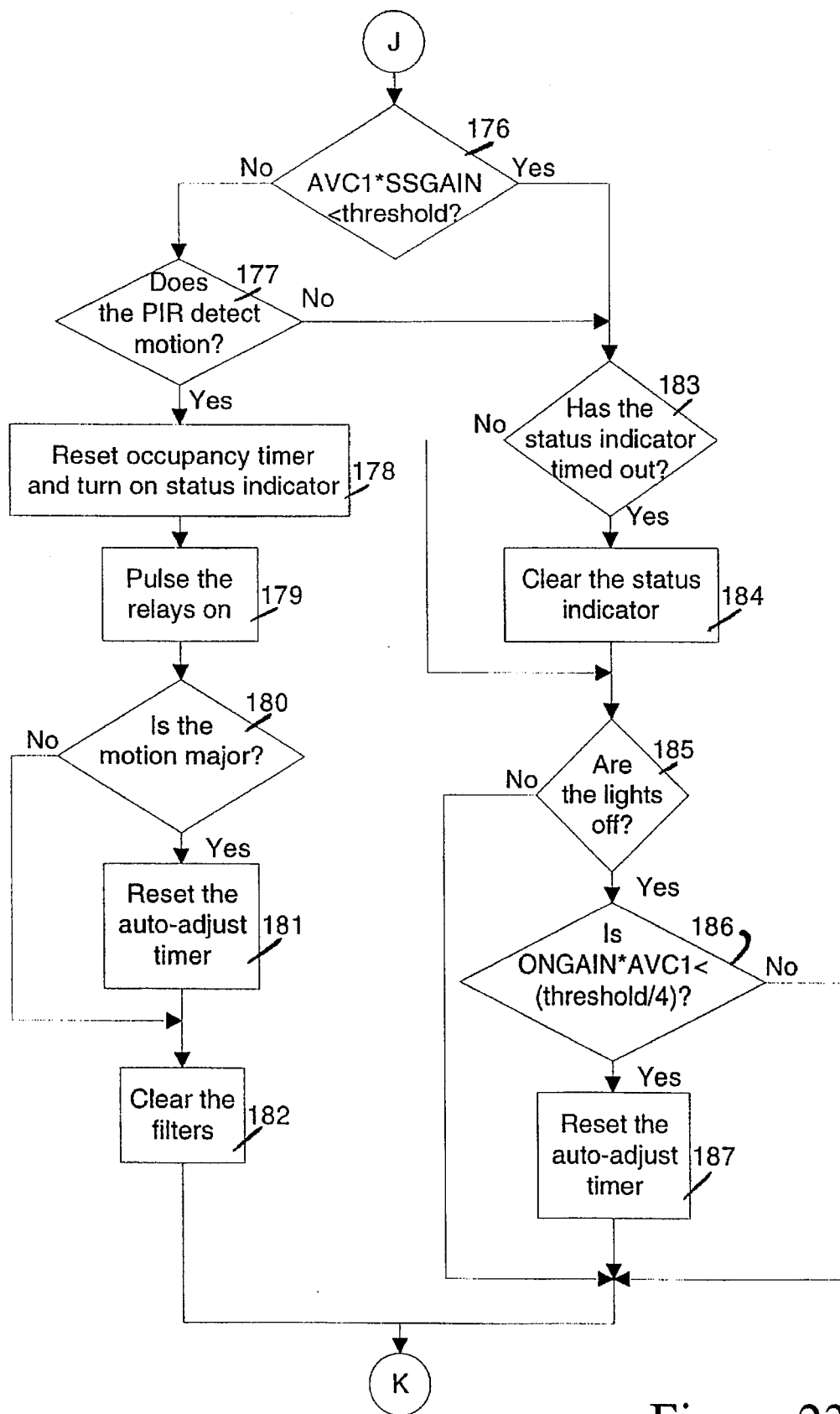
Figure 23C:
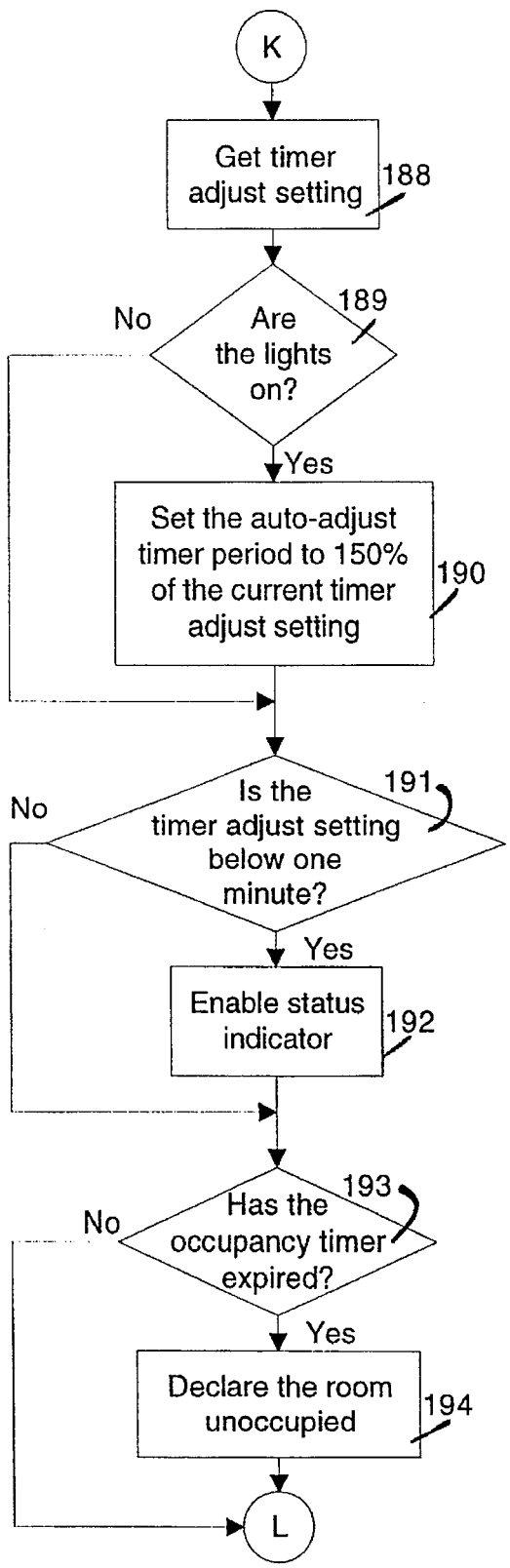

FIGS. 23a, 23b, and 23c describe the manner in which the sensor determines occupancy (step 97 of FIG. 15). The program takes the absolute value of $VC_1$, the output of the bandpass filter (FIG. 20), and puts it into a two-byte variable AVC1 168. If the space has been occupied for more than a predetermined time (for example, 16 seconds, as determined in the conditional 169), the upper-order byte of AVC1 is decreased by one bit 170 and its lower-order byte is then increased by 128 172; otherwise its lower-order byte is increased by 32 173, as determined in the conditional 171. This means that AVC1 goes down slightly when the space has been occupied for sixteen seconds, which decreases the incidence of repeated false tripping of the sensor. The register BPAVE gets the running average of AVC1 times SSGAIN, the current sensitivity 174, and is then clipped 175 to aid in reducing false tripping from wind noise.

If AVC1 multiplied by the sensitivity SSGAIN is greater than or equal to the threshold, which is usually defined with respect to BPAVE as determined in the conditional 176, then the sensor has detected motion. If the sensor is a dual-technology unit, it then checks the PIR detector output to see if it too exceeds a threshold 177; if so, then motion has been detected. (Note that a PIR-only sensor would skip all of the ultrasonic filtering steps 136 through 157 and 168 through 176 and simply use the conditional 177 as the criterion for motion detection.) The program resets the occupancy timer and turns on the status indicator 178. If the sensor has a relay and it has been at least two seconds since it was pulsed on, then the sensor pulses it again 179; if the relay gets stuck in the off position for some reason, this will turn it back on again. A sensor which is operating in parallel with an array of other sensors could send its occupancy status to a central control station, rather than switching on the load by itself.

Figure 31:
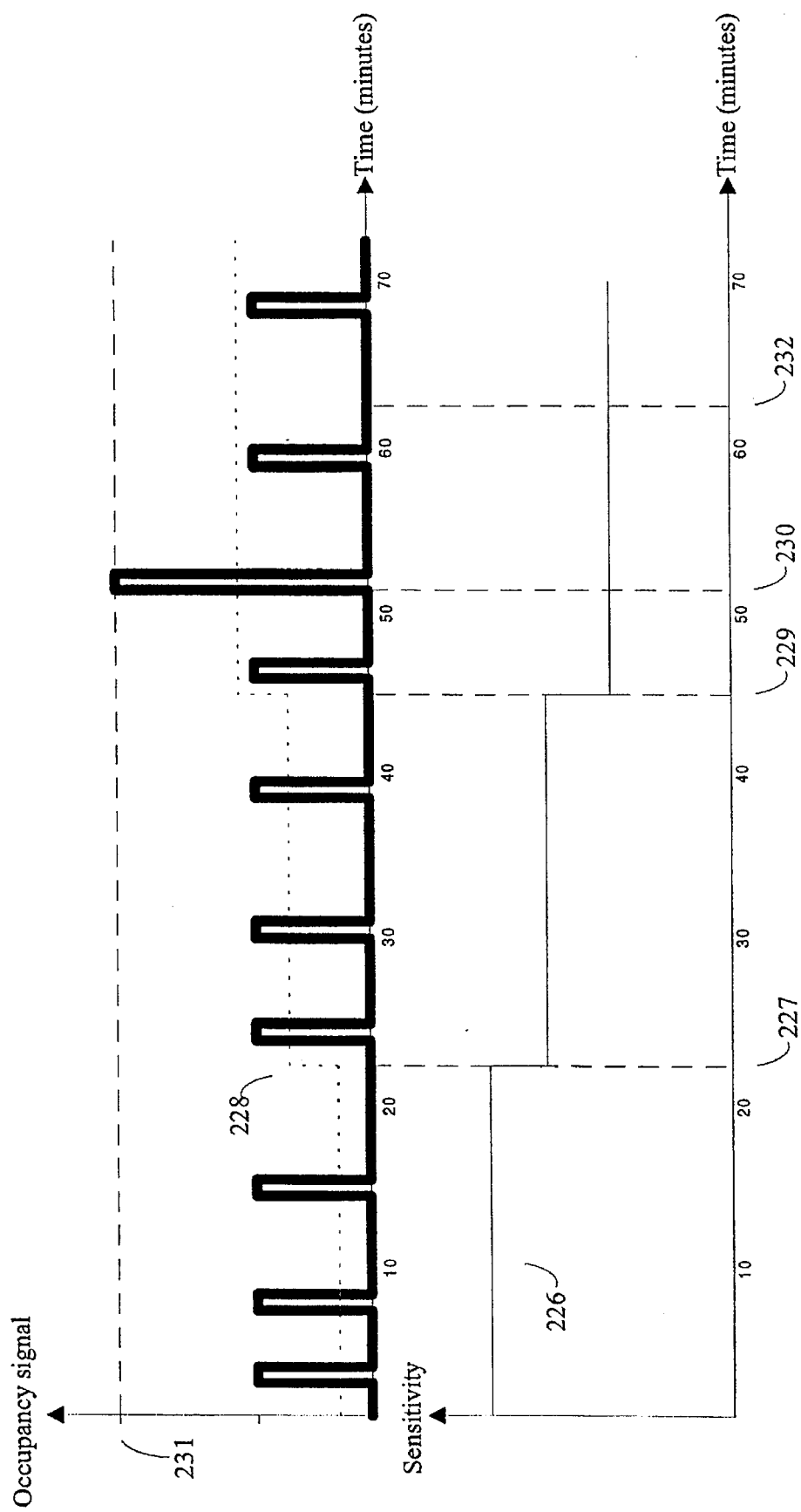
FIG. 31 is a timeline depicting the sensor adjusting its sensitivity downward in accordance with the present invention.

If the motion is major (i.e., the motion is passing immediately by it, as determined by the conditional 180), then the program resets the auto-adjust timer 181. Finally, the filter registers are cleared 182. If the sensor does not detect motion 176, then it checks to see if the status indicator has been on long enough 183; if so, it is cleared 184. If the lights are off 185 and a fraction of the threshold is less than or equal to AVC1 times ONGAIN (the gain with the lights on) 186, then the auto-adjust timer is reset 187. A similar routine can be used to reset an independent auto-adjust timer for a PIR element, since a heat source passing near an infrared sensor would also yield a large signature. The mechanism of automatic sensitivity adjustment is discussed in greater detail with reference to FIGS. 31 and 32.

The sensor reads the timer adjust setting 188. If the lights are on 189, then the auto-adjust timer is set to time out in half again the timeout period of the occupancy timer 190. If the timer adjust is set below one minute 191, then the status indicator is enabled 192. This feature is provided for sensors to be installed in public areas; the indicator is still there for the installer, who usually sets the timeout to minimum during installation, but is disabled during ordinary use so that capricious individuals will not be attracted by the blinking LED and tamper with the device. If the occupancy timer has expired 193, then the room is declared to be unoccupied and the sensor turns the lights off 194.

Figure 24:
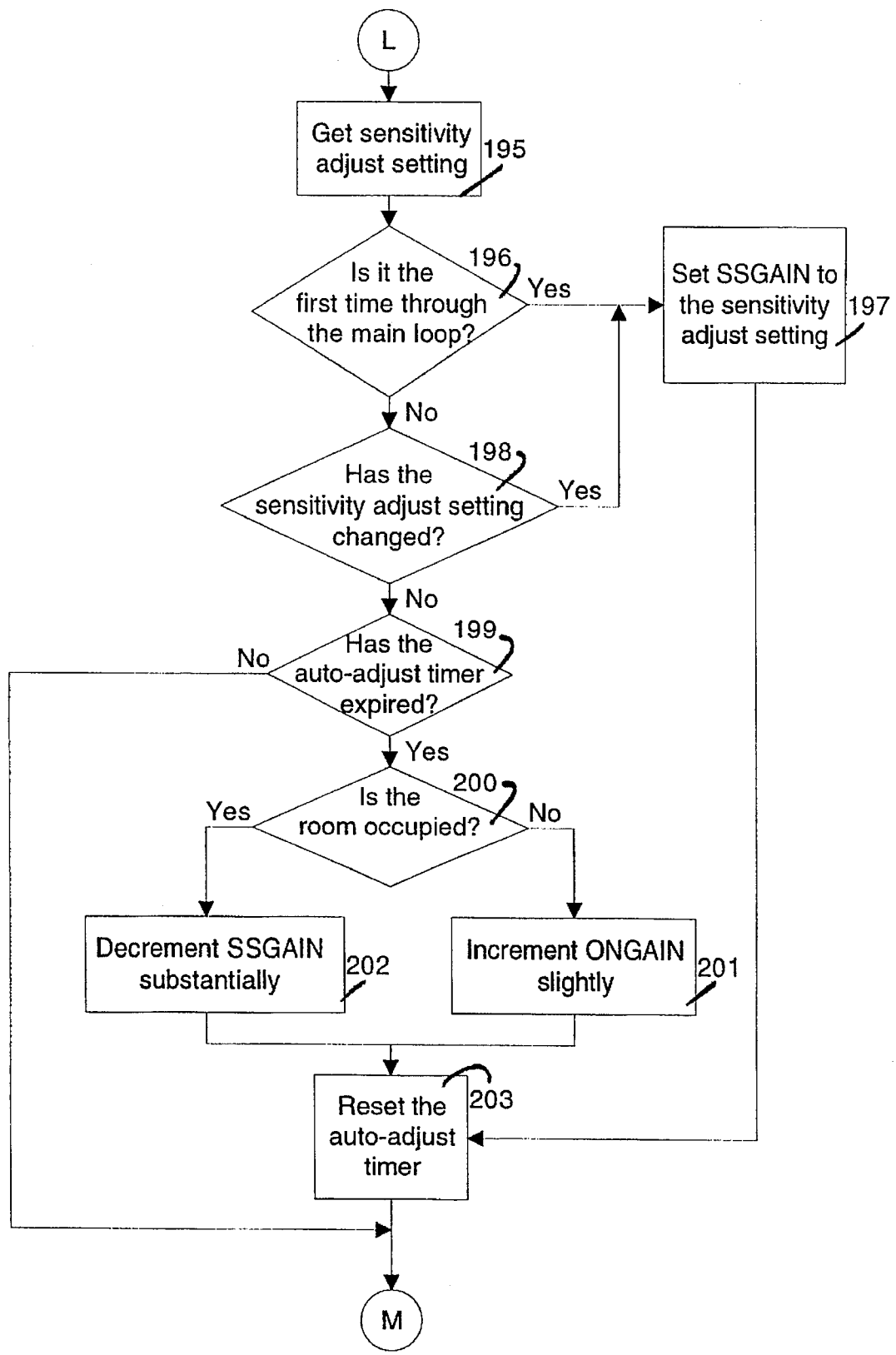
FIG. 24 is a flowchart of the method that updates the sensitivity based upon the user's adjustments and the activity within the space in accordance with the present invention.

The sensor updates its sensitivity value as shown in FIG. 24 (step 98 of FIG. 15). First the sensor reads the setting of the sensitivity adjust 195. If this setting has changed since the last pass through the main loop 198 or if the program is going through the main loop for the first time 196, the sensor sets the sensitivity value to that which the user selects 197. If neither of these events has occurred and the auto-adjust timer has expired 199, then it is time to alter the sensitivity setting. If the load is still powered when the auto-adjust timer expires 200, then the load has been on for over 150% of the timeout setting without any major entry motion into the room, since the auto-adjust timer is reset when such motion occurs 181. In any space that is only supposed to be occupied briefly, such as a restroom, this probably means that the sensor is erroneously detecting room motion based on hall motion, and it is time to reduce the sensitivity greatly 202. If the room is considered to be unoccupied, and no ambient noise or hallway traffic has made the occupancy signal rise to even a fraction of the threshold level (which would reset the auto-adjust timer 187), then it is time to increase the sensitivity slightly 201. This means that the sensor will decrease its sensitivity rapidly to a point where it will not erroneously detect motion, and will then increase the sensitivity slowly and conservatively. If the sensitivity has been changed, either through a user setting or through automatic adjustment, then the auto-adjust timer is reset 203.

Figure 25:
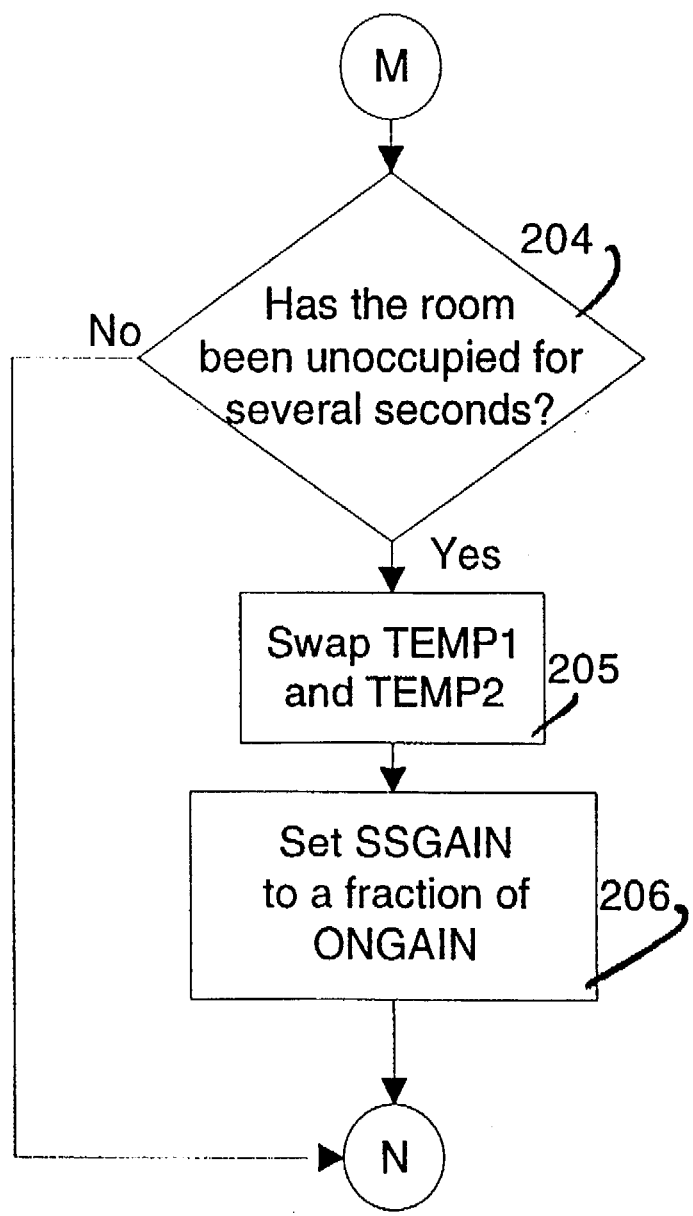
FIG. 25 is a flowchart of the automatic gain setback method in accordance with the present invention.

Automatic gain setback (AGS) is a simple way of reducing hall-traffic false triggering, as shown in FIG. 25 (step 99 of FIG. 15). If a room has been unoccupied for several seconds 204, then it is not likely that the sensor has mistakenly turned the lights off; if there was someone still in the space, then he would probably have made some motion to activate the sensor and turn the lights back on. Since the lights have remained off, no such motion has taken place, and so the program swaps the values of $TEMP_1$ and $TEMP_2$ 205, the input variables to the bandpass filter. This reverses the directional bias of the sensor so that it is now more sensitive to motion going away from it, which is useful because subsequent entry motion will be directed away from a sensor mounted near the entrance; the reversed bias permits rapid detection of entry motion. The sensor also reduces the sensitivity to a fixed fraction of ONGAIN 206, a register which stores the pre-AGS sensitivity level. This makes it possible to reduce the sensitivity of the sensor while not losing any adjustments to its gain made through automatic sensitivity adjustment.

Figure 26:
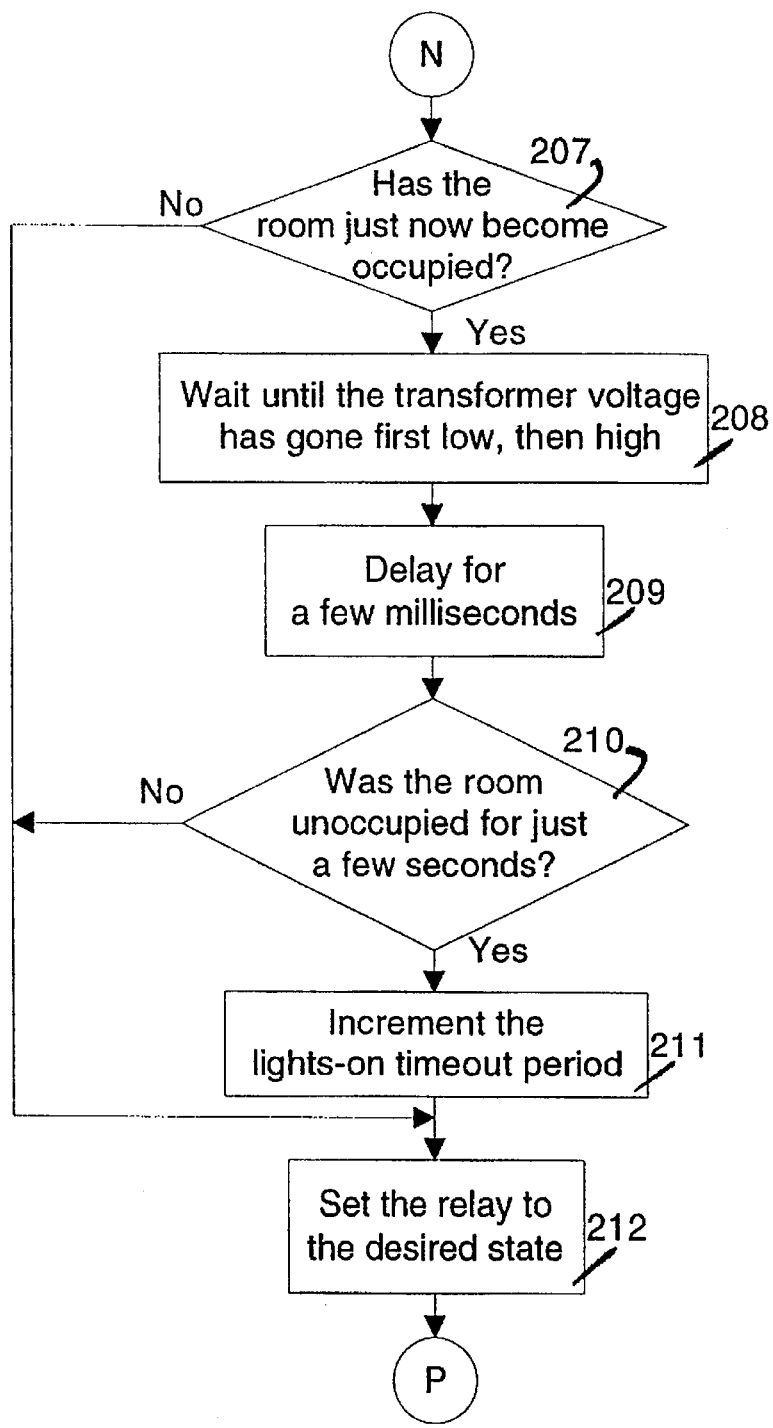
FIG. 26 is a flowchart of the method that accomplishes zero-cross switching and automatic timer adjustment in accordance with the present invention.

FIG. 26 presents the zero-cross switching and automatic timer adjustment routines, both of which may occur when the sensor has just detected occupancy in a previously unoccupied space (step 100 of FIG. 15). Zero-cross switching is important to protect the relay from inrush current for reasons explained previously; it accomplishes this end by turning the relay on so that the contacts close at approximately the same time as the AC voltage to the load crosses zero. If the lights have been off and the sensor detects occupancy 207, the program waits until the 60 Hertz detect voltage 16 has gone low and then high 208. It then waits for a short period which is tuned to the pick time of the relay and the period of the line voltage 209.

Automatic timer adjustment occurs when the sensor detects motion within a few seconds of declaring the room unoccupied and turning the lights off 210. In such an event, what has probably happened is that the timer was too short and the sensor turned the lights off while the room was still occupied. The surprised occupant would then make some motion to turn the lights back on. The sensor will therefore increase the lights-on timeout period slightly in order to prevent a recurrence of the incident 211. Finally, the sensor sets the relays to the desired state 212.

Figure 27:
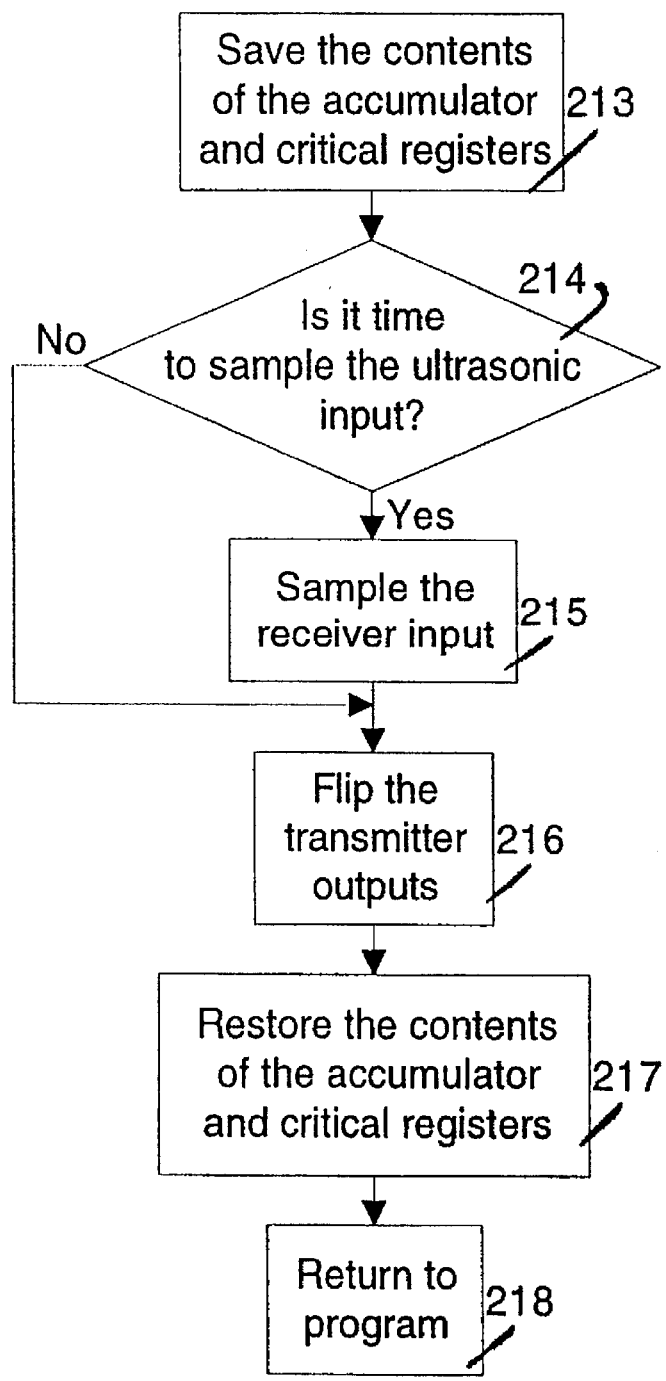
FIG. 27 is a flowchart of the interrupt-driven transmitter driver routine in accordance with the present invention.

The interrupt-driven transmitter drivers of FIG. 27 are invoked whenever the software generates an appropriate interrupt; it does this at the transmitter frequency. These interrupts may occur at any point in the program, so that the transmitters may be driven at an integer multiple of the sampling frequency. It would be better to sample at the transmitter frequency or higher, but that is impractical for even the fastest microcontrollers currently on the market. The interrupt routine first dumps the contents of the accumulator and any important registers (e.g., the status register) into memory 213 in order to preserve their contents. If the program is ready to sample the ultrasonic occupancy signal 214, then the sensor samples it 215. The program then reverses the voltage on each of the transmitters 216 in order to drive them. The contents of the accumulators and registers are then restored 217 so that the program can continue functioning where it left off. The interrupt routine then returns control to the main program 218 (FIG. 15).

The bandpass filter described in FIG. 20 is a simple real-time digital filter. The input variables to the filter are $AD_1$ and $AD_2$, the quadrature samples of the received signal, and $AD_{1LP}$ and $AD_{2LP}$, the low-pass versions of $AD_1$ and $AD_2$ respectively:

$$AD_{1LP} = \frac{1}{2} z^{-1} AD_{1LP} + \frac{1}{2} AD_1$$

$$AD_{2LP} = \frac{1}{2} z^{-1} AD_{2LP} + \frac{1}{2} AD_2$$

The z-transform equations for the two output variables are:

$$V_{C1}=z^{-1}V_{C1}(1-a_2a_3)-a_3[I_{L1}-b_2(AD_2-AD_{2LP})]$$

$$I_{L1}=z^{-1}I_{L1}+a_1[V_{C1}-b_1(AD_1-AD_{1LP})]$$

Typical values for the coefficients are:

$b_1=8$
$b_2=16$
$a_1=\frac{1}{2}$
$a_2=\frac{1}{8}$
$a_3=\frac{3}{8}$ however, other values may be used without departing from the scope of the invention.

Figure 28:
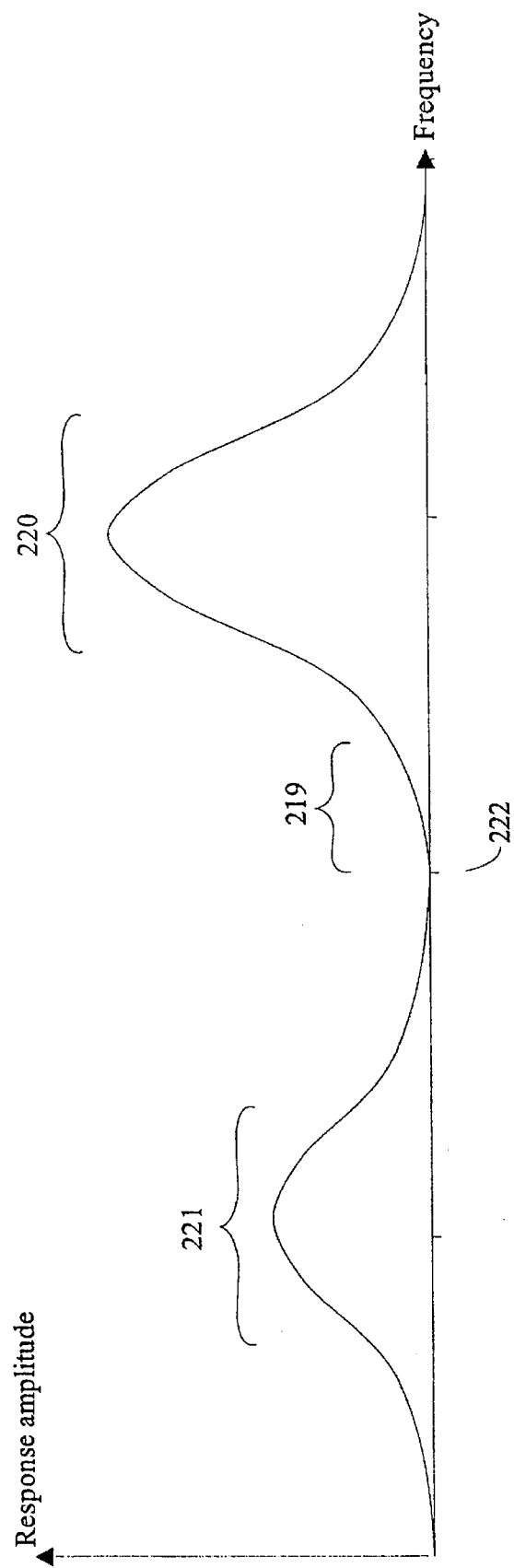
FIG. 28 is a depiction of the bandpass filter response in accordance with the present invention.

The output of such a filter is depicted in FIG. 28. Note that the gains for Doppler shifts indicative of motion going toward 220 and away 221 from the sensor differ, resulting in a directional bias. This is a useful property for reasons previously described. Air conditioning noise tends to be of a lower frequency than legitimate motion and it is at its worst when it is blowing toward the sensor, so the gain in the region 219 in the filter's frequency response should be lower than that in the regions 220 or 221. The gain at the frequency of transmission 222 must be as close to zero as possible, since a reflection at that frequency indicates no Doppler shift and hence no motion. As mentioned above with reference to FIG. 20, it may be desirable on occasion to reverse the directional bias of the bandpass filter. This can be done by varying the filter parameters $a_2$ and $a_3$.

Figure 29:
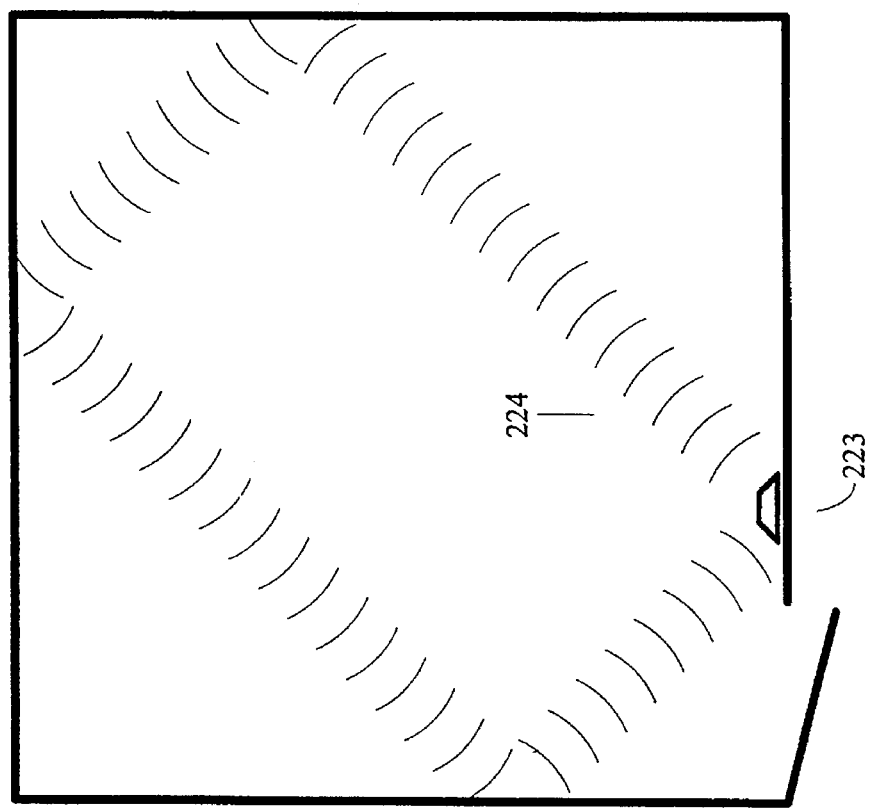
FIG. 29 is a diagram of a sensor testing for a complete signal path in accordance with the present invention.
Figure 30:
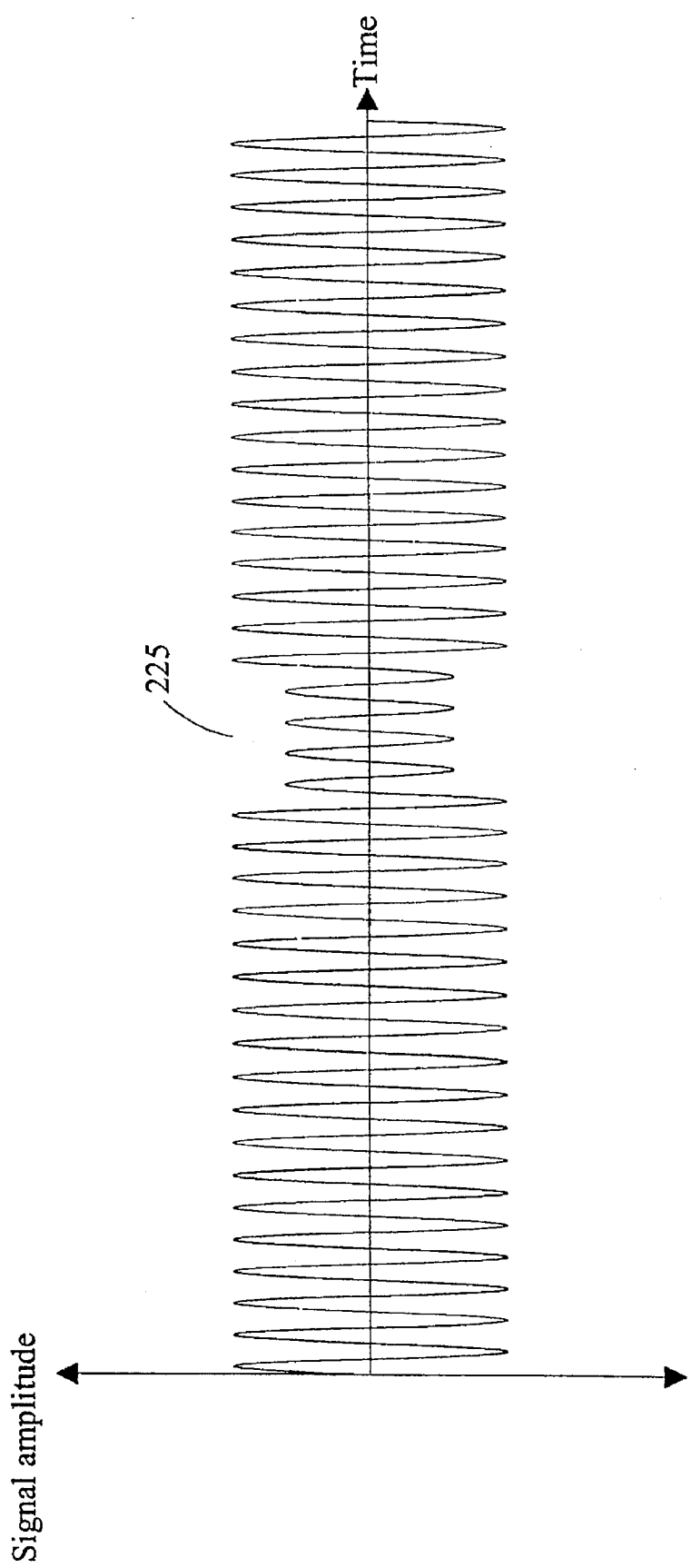
FIG. 30 is a picture of the receiver signal during self-test in accordance with the present invention.

Self-test is illustrated in FIG. 29. The ultrasonic sensor 223 located within a room must have a complete signal path 224 in order to function properly; if none of the output signal ever reaches the receiver, then it cannot detect a Doppler shift in a nonexistent echo and the sensor will fail. Therefore, at intervals, a sensor can briefly cease to transmit sound and then listen to the echo for a short decrease or increase in the echo intensity as illustrated in FIG. 30. If the signal drop 225 is not perceived within a few tens of milliseconds, then the signal path must be incomplete, either due to malfunction of the transmitter circuitry, blocking of the receiver aperture, or receiver circuit failure.

Automatic sensitivity adjustment is useful primarily in environments in which one can make certain assumptions about the occupancy pattern of the controlled space; otherwise the sensor cannot distinguish when it should reduce or increase the sensitivity. The particular scheme depicted in FIG. 24 assumes two conditions which are true of, for example, restrooms and other small non-office spaces:

Occupancy is brief, usually no longer than ten minutes, and in no case greater than 150% of the user-determined timeout period.

The sensor is mounted next to the door, so that entry motion yields a large signature.

Since the sensor may be installed in a room of almost any size and configuration, there should be some established level of return signal that acts as an entry motion threshold: any entry motion in any room will yield that level of signal or higher, while any hall traffic in any room will not yield such a high signal level. This is most likely to occur within a sensor mounted near the doorway.

The sensor can therefore safely adjust the sensitivity down if the lights have been on for over 150% of the timeout period with no entry motion. Consider the exemplary occupancy pattern of FIG. 31, where the sensitivity 226 is initially so high that the sensor is false-tripping on hallway traffic. Since the timeout period is set in this case to 15 minutes, the sensor waits 22.5 minutes before reducing the sensitivity to a lower level at time 227. In this example, the threshold of motion detection 228 yielded by this sensitivity level is still too high, so the sensor reduces the sensitivity 226 still further at time 229. The threshold of detection 228 is now high enough that the sensor disregards hall traffic. The entry motion at time 230 is sufficient to keep the lights on, but since it equals the minimum level 231 at which the sensor regards the signal as entry motion, the auto-adjust timer is reset (see, 181 in FIG. 23b). Finally, the sensor times out at time 232, and the lights go off, disregarding further hall traffic.

Figure 32:
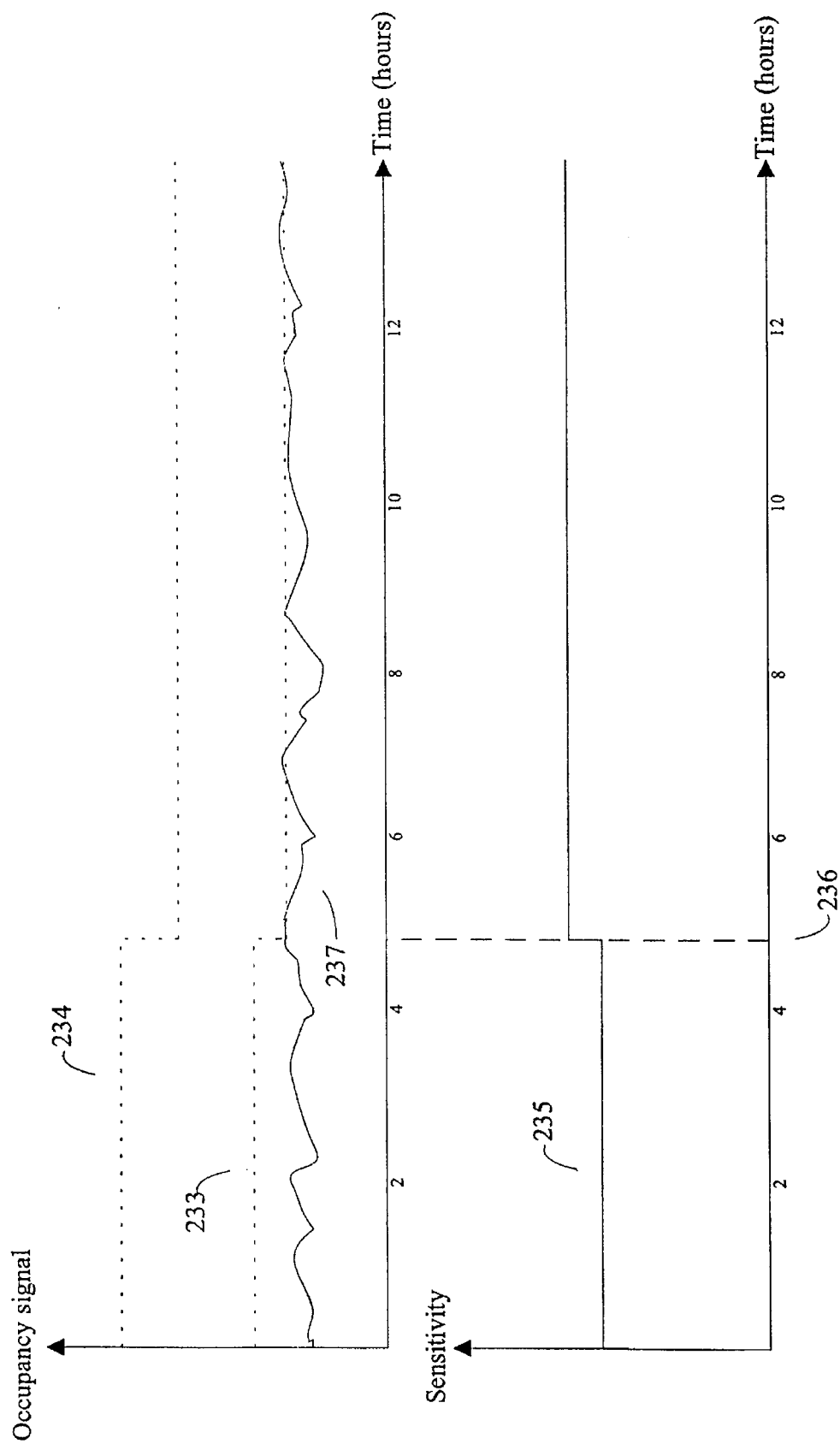
FIG. 32 is a timeline depicting the sensor adjusting its sensitivity upward in accordance with the present invention.

The sensor may be much more conservative in increasing its sensitivity, since a period of inactivity over a weekend or a holiday should not be allowed to increase the sensitivity to the point where it is prone to false tripping. FIG. 32 illustrates a scheme by which this can be done. The program establishes a threshold of background noise 233, in this case a fraction of the threshold of motion detection 234. If the sensor operates for several hours and never sees an occupancy signal exceeding this threshold, then it is safe to increase the sensitivity 235 slightly, as the sensor does at time 236. However, this lowers the threshold of background noise 233 to the point where the occupancy signal 237 does exceed it occasionally; the program therefore resets the auto-adjust timer so frequently that it never expires, and the sensitivity 235 is raised no further.

The following Appendix is a sample of the assembly-language code for the Microchip PIC16C71 to drive a 32 kHz ultrasonic wall sensor with automatic sensitivity adjustment, automatic gain setback, zero-cross switching, and quadrature detection.

APPENDIX

```
;******************************************************************
;
;
;                         SS PROGRAM
;
;                    COPYRIGHT (C) MYTECH 1994
;
;
;
;
;--------------------assembler directives---------------

ZEROCR  set     1               ;Times relay to close at line voltage zero
                                ;crossing
GSBEN   set     1               ;Automatic Gain Setback AGS enable
RELDD   set     1               ;Drives relay directly from PIC (-DC units
                                ;must have external drivers)
RRST8   set     1               ;AGS enabled 1 minute after lights go out
                                ;for RRST8, 16 seconds for SST8
ASADJ   set     1               ; Enables auto-sens adjust ;--------------------assembler directives---------------------

RTCC    equ     01h
PCL     equ     02h
STATUS  equ     03h
FSR     equ     04h
PORTA   equ     05h             ; PORTA,0 - pin 17 - receiver  input a/d
                                ; PORTA,1 - pin 18 - sensitivity adj input
                                ;a/d
                                ; PORTA,2 - pin  1 - timer adj input a/d
                                ; PORTA,3 - pin  2 - Pwr Sup /diag input
                                ;a/d
                                ; PORTA,4 - pin  3 - Thermistor input
                                ;(digital)

PORTB   equ     06h             ; PORTB,0 - pin  6 - transmitter+
                                ; PORTB,1 - pin  7 - transmitter-
                                ; PORTB,2 - pin  8 - external dither output
                                ;(pre-RevB)
                                ; PORTB,3 - pin  9 - test output
                                ; PORTB,4 - pin 10 - LED +
                                ; PORTB,5 - pin 11 - Relay Off driver
                                ; PORTB,6 - pin 12 - Relay On driver
                                ; PORTB,7 - pin 13 - test bit (LED- on beta
                                ;units)
                                ;external dither output RevB and later ; other pins:
                                ; VSS     - pin  5 - gnd
                                ; VDD     - pin 14 - +5.8V
                                ; VPP     - pin  4 - power on ;reset pin
                                ; OSC1    - pin 16 - osc/crystal input
                                ; OSC2    - pin 15 - osc/crystal output ADCON0  equ     08h
```

```
ADCON1   equ    08h        ; must be in page 1
ADRES    equ    09h        ; must be in page 1
INTCON   equ    0bh
OPTREG   equ    01h        ; must be in page 1
CNTR1    equ    0ch        ; start of SRAM
TEMPW    equ    0dh        ; temp loc of w during interrupt
TEMPS    equ    0eh        ; temp loc of status reg during interrupt
BPEAKlo  equ    0fh        ; peak detector VC1 is input BPEAKhi  equ    10h        ; peak detector VC1 is input
TEMPLO   equ    11h        ; gen purpose temp reg
TEMPHI   equ    12h        ; gen purpose temp reg
TEMP8    equ    13h        ; gen purpose temp register
CCNT0    equ    14h        ; cycle count for subsample loop
CCNT1    equ    15h        ; cycle count for subsample loop
CCNT2    equ    16h        ; cycle count for subsample loop CBITS1   equ    17h        ; general control bits 1
                           ;    bit 0 - a/d start flag, 1=start a/d
                           ;degrees
                           ;    bit 1 - a/d start flag, 1=start a/d 90
                           ;degrees
                           ;    bit 2 - rel status relay on/off, 0=off
                           ;    bit 3 - rel drvr cntr 1=0 to 32ms
                           ;    bit 4 - rel drvr cntr 1=0 to 2sec
                           ;    bit 5 - cmd to relay driver, 1=turn off
                           ;    bit 6 - cmd to relay driver, 1=turn on
                           ;    bit 7 - which a/d phase, 0=ad1 1=ad2

CBITS2   equ    18h        ; general control bits 2
                           ;    bit 0 - a/d start flag, 1=start a/d 0
                           ;degrees
                           ;    bit 1 - transformer last state 0=<80h,
                           ;1=>80h
                           ;    bit 2 - lights off 16 sec (Gain
                           ;Setback)
                           ;    bit 3 - 0=POR startup, 1=WDT startup
                           ;    bit 4 - 1=beeper on, 0=beeper off
                           ;    bit 5 - timer pot range: 0=06 or less,
                           ;1=07 or more
                           ;    bit 6 - lights on 16 sec
                           ;    bit 7 - high sens mode 1=high
                           ;sensitivity
                           ;           SSGAIN<=050h > low sensitivity
                           ;           if low sens, no clipper, const
                           ;BPAVE
                           ;           also change scale up on xout,
                           ;xoutq IL1lo    equ    19H        ; variable for bpfilt1
IL1hi    equ    1ah        ; variable for bpfilt1
VC1lo    equ    1bh        ; variable for bpfilt1
VC1hi    equ    1ch        ; variable for bpfilt1
AD1LPHI  equ    1dh        ; 0 degree input low pass value
AD1LPLO  equ    1eh        ; 0 degree input low pass value
TEMP9    equ    1fh        ; gen purpose temp register LEDCNT   equ    20h        ; timer reference for LED on time
TEMP6    equ    21h        ; gen purpose temp register
AD2LPHI  equ    22h        ; 90 degree input low pass value
SSGAIN   equ    23h        ; real-time sensitivity
AD1      equ    24h        ; 0 degree input from receiver transducer
```

```
AD2LPLO  equ    25h              ;preamp
                                 ; 90 degree input low pass value
TEMP7    equ    26h              ; gen purpose temp register
LOFCNT   equ    27h              ; Lights off counter reference for Gain
                                 ;Setback CBITS3   equ    28h              ; general control bits 3
                                 ;    bits 0-3:  If these read 1010, the
                                 ;program assumes that the register contents
                                 ;have not been lost and does not clear them
                                 ;    bit 4: ASA timer reset flag 1=reset
                                 ;    bits 5 and 6:  mask for PORTB pins 5
                                 ;and 6
                                 ;    bit 7:  rel drvr cntr 1=0 to 1sec
SSSET    equ    29h              ; last position of sensitivity pot
ADJTMR   equ    2ah              ; auto-adjust timer
ONGAIN   equ    2bh              ; auto-adjusted gain when lights are off
                                 ; 150% timer pot when lights are on
RDRCNT   equ    2ch              ; Timer reference for relay driver
BPAVE    equ    2dh              ; average of BPEAKhi
LCNTHI   equ    2eh              ; Timer reference for lights on
LCNTLO   equ    2fh              ; Timer reference for lights on timvala  equ    0eah             ; RTCC values for 9.8304Mhz
timvalb  equ    0e7h org    0
         goto   start            ; reset vector ;----------------interrupt routine-------------------------------- org    4                ; interrupt vector location btfsc  CNTR1,0          ; skip next instr every other time (to get
                                 ;32.768 kHz)
         goto   intb inta     btfsc  CBITS1,0         ; start a/d?
conv1    bsf    ADCON0,2         ; start a/d conversion
         bcf    CBITS1,0 movwf  TEMPW            ; save w in TEMPW
         swapf  STATUS,0         ; get status (swapf doesn't alter status
                                 ;bits)
         movwf  TEMPS            ; save status in TEMPS incf   CNTR1,1          ; increment CNTR1
         movlw  timvalb          ; reset RTCC
         movwf  RTCC
         bcf    INTCON,2         ; reset RTCC interrupt flag flipt1   movlw  03h              ; uses more current to flip simultaneously
         xorwf  PORTB,1          ; flip transmitter bits endi     swapf  TEMPS,0
         movwf  STATUS           ; restore status
         swapf  TEMPW            ; swap value in TEMPW
         swapf  TEMPW,0          ; restore w register
```

```
retfi   retfie                  ; return from interrupt intb    movwf   TEMPW           ; save w in TEMPW
        swapf   STATUS,0        ; get status (swapf doesn't alter status
                                ;bits)
        movwf   TEMPS           ; save status in TEMPS incf    CNTR1,1         ; increment CNTR1
        movlw   timvala         ; reset RTCC
        movwf   RTCC
        bcf     INTCON,2        ; reset RTCC interrupt flag
flipt2  movlw   03h             ; uses more current to flip simultaneously
        xorwf   PORTB,1         ; flip transmitter bits swapf   TEMPS,0
        movwf   STATUS          ; restore status
        swapf   TEMPW           ; swap value in TEMPW
        swapf   TEMPW,0         ; restore w register btfsc   CBITS1,1        ; start a/d?
conv2   bsf     ADCON0,2        ; start a/d conversion
        bcf     CBITS1,1 bcf     PORTB,0         ; keep transmitters out of phase
        bsf     PORTB,1
        retfie                  ; return from interrupt ;---------------end interrupt routine----------------------------- page start   bcf     STATUS,5        ; select page 0 if RELDD = 1 ;------------------------------------------------ movlw   0               ; clear TRISB -- all outputs
        tris    6 movlw   60h             ; set pins 5 and 6 high
        movwf   PORTB           ; to turn relay on movlw   0ffh            ; delay for pins 5 and 6 to
        movwf   TEMP8
        movlw   0ffh
        movwf   TEMPHI loop1   decfsz  TEMP8
        goto    loop1 decfsz  TEMPHI          ; go high
        goto    loop1 movlw   60h             ; tri-state pins 5 and 6
        tris    6
    endif ;----------------------------------------------------- -----
```

- 33 -

```
        bsf     STATUS,5            ; select page 1
        clrf    OPTREG              ; clear OPTION register
        movlw   02h                 ; set prescaler to 1:4   (72ms)
        movwf   OPTREG              ;   (gives approx 18ms*8=144ms nom wdt
                                    ;timeout)
        bsf     OPTREG,3            ; assign prescaler to wdt
        bsf     OPTREG,7            ;enable pullups on PORTB if RELDD=0  ;-----------------------------------------------------------
        clrf    PORTB               ; clear TRISB Port B -- all outputs
    endif ;----------------------------------------------------------------- bcf     STATUS,5            ; select page 0
        clrf    INTCON movlw   timvala             ; initialize RTCC
        movwf   RTCC movlw   81h                 ; 1000 0001    enable ain0 a/d
        movwf   ADCON0 bsf     STATUS,5            ; select page 1
        movlw   00h                 ; 0000 0000    set ra0-ra3 analog, vref=VDD
        movwf   ADCON1
        bcf     STATUS,5            ; select page 0 bcf     CBITS3,7            ; 1sec relay timer off bcf     PORTB,7 if RELDD=0  ;-----------------------------------------------------------
        bcf     PORTB,5             ; turn drivers off so as not to
        bcf     PORTB,6             ; drain the cap
    endif ;-----------------------------------------------------------------

; ---- Turn relay on if 60Hz has been lost ----
        btfsc   STATUS,4            ; Only fire relay now if WDT has expired
                                    ;(loss of 60Hz)
        goto    arodx               ; Can't turn relay on now on normal startup
                                    ;because it isn't inrush protected.

if RELDD=0   ;--------relay direct drive------------------------
        bsf     PORTB,6
        bcf     CBITS3,5
        bsf     CBITS3,6            ; Set relay on pulse on
    endif        ;--------relay direct drive------------------------ movlw   0ffh
        movwf   TEMP8               ; This turns on relay when ps is up
        movlw   064h                ; Trips when 60hz from transformer going
                                    ;away
        movwf   TEMPHI              ;    100ms lt0     nop                         ; delay for ps to get up high enough to
        nop                         ;  flip relay to lights on
        nop
        nop decf    TEMP8
        btfss   STATUS,2            ; zero bit
        goto    lt0                 ; 1024us (with 8Mhz crystal)
```

- 34 -

```
          clrwdt                    ; clear watchdog timer
          decf    TEMPHI
          btfss   STATUS,2
          goto    lt0 if RELDD=0    ;--------relay direct drive------------------------
          bcf     CBITS3,6
          bcf     PORTB,6
    endif         ;--------relay direct drive------------------------ arodx     movlw   0ffh              ; --------delay for ps to get charged up---
          movwf   TEMPHI
          movwf   TEMP8
          movlw   0ch
          movwf   TEMPLO            ; 6*256ms=1.536 sec lt1       nop
          nop
          nop
          nop decf    TEMP8
          btfss   STATUS,2          ; zero bit
          goto    lt1               ; 1024us (with 8Mhz crystal)

clrwdt                    ; clear watchdog timer
          decf    TEMPHI
          btfss   STATUS,2
          goto    lt1               ; 256ms loop movlw   10h
          xorwf   PORTB,1           ; toggle LED decf    TEMPLO
          btfss   STATUS,2
          goto    lt1               ; 3*8.4sec loop bcf     PORTB,4           ; turn off LED arodel    movf    CBITS3,0          ; look at CBITS3
          andlw   0fh               ; mask out upper half-byte
          sublw   0ah               ; is the result equal to 1010?
          btfsc   STATUS,2          ; if not, then continue with initialization
          goto    skip2             ; otherwise skip it movlw   00h               ; -----Initialize registers--------
          movwf   CNTR1
          movwf   CCNT0
          movwf   CCNT1
          movwf   CCNT2
          movwf   TEMPHI
          movwf   TEMPLO
          movwf   IL1hi
          movwf   IL1lo
          movwf   VC1hi
          movwf   VC1lo
          movwf   BPEAKhi
          movwf   BPEAKlo
          movwf   CBITS1
          movwf   CBITS2
          movwf   LCNTLO
```

- 35 -

```
                movwf   LCNTHI
                movwf   AD1
                movwf   TEMP6
                movwf   TEMP7
                movwf   TEMP8
                movwf   TEMP9
                movwf   AD1LPHI
                movwf   AD1LPLO
                movwf   AD2LPHI
                movwf   AD2LPLO
                movwf   SSGAIN
                movwf   SSSET bsf     CBITS3,3        ; 1010 bit pattern
                bcf     CBITS3,2
                bsf     CBITS3,1
                bcf     CBITS3,0 bsf     CBITS2,5        ; enable LED
        skip2   movlw   80h
                movwf   ADRES movlw   40h
                movwf   CBITS1          ; relay on cmd movlw   20h
                movwf   BPAVE movlw   0ffh            ; Make sure AGS doesn't start at POR
                movwf   LOFCNT          ; Gain Setback counter bsf     INTCON,7        ; enable global interrupts
                bsf     INTCON,5        ; enable RTCC interrupt page

;*************************************************************** *********

; start of main loop -------------------------------------------
        main    movlw   088h
                movwf   FSR             ; point to ADCON1 with indirect file select
        reg
                movlw   00h             ; per mfg instructions, reset adcon1 to all
                movwf   0               ;   analog inputs movlw   085h
                movwf   FSR             ; point to TRISA with indirect file select reg
                movlw   0ffh            ; per mfg instructions, reset PORTA to all
                movwf   0               ;   inputs movlw   86h
                movwf   FSR
                movlw   60h             ; per mfg instructions, reset PORTB to all
                andwf   0,1             ;   outputs, except for pins 5 and 6 btfsc   CNTR1,5         ; subsample at 1:32
```

- 36 -

```
              goto    main waita    btfss   CNTR1,5          ; subsample at 1:32
              goto    waita bsf     CBITS1,0         ; signal intr routine to start a/d conv1
     waitb    btfsc   CBITS1,0         ; wait til intr routine starts conversion
              goto    waitb
     waitc    btfsc   ADCON0,2         ; wait til conversion complete
              goto    waitc            ; skip if conversion is complete ad1      movf    ADRES,0          ; get a/d input
              addlw   080h             ; center a/d output around 0
              movwf   AD1              ; save first a/d input (0 degrees)

movf    AD1LPHI,0        ; --- calculate AD1 low pass -------
              movwf   TEMPHI           ; get ad1lp
              movf    AD1LPLO,0
              movwf   TEMPLO
              comf    TEMPLO,1
              incf    TEMPLO,1         ; negate ad1lp
              btfsc   STATUS,2
              decf    TEMPHI,1         ; zero bit
              comf    TEMPHI,1         ; -ad1lp in TEMPHI, TEMPLO
              movf    AD1,0
              addwf   TEMPHI,1         ; TEMP has ad1 - ad1lp btfsc   CCNT0,0
              goto    nodith1
              movlw   0c0h
              addwf   TEMPLO,1         ; + dither
              btfsc   STATUS,0
              incf    TEMPHI,1         ; TEMP has ad1 - ad1lp + dither nodith1  rlf     TEMPHI,0         ; get sign bit in C
              rrf     TEMPHI,1
              rrf     TEMPLO,1         ; 1/2 movf    TEMPLO,0
              addwf   AD1LPLO,1
              btfsc   STATUS,0         ; carry?
              incf    AD1LPHI,1
              movf    TEMPHI,0         ; ad1lp = ad1lp + (ad1-ad1lp) / 2
              addwf   AD1LPHI,1        ; --- end ad1 low pass filter ------------- bsf     CBITS1,1         ; this sample 90 degrees later in phase
     waite    btfsc   CBITS1,1         ; signal intr routine to start a/d conv2
              goto    waite            ; wait til intr routine clears bit
     waitf    btfsc   ADCON0,2         ; wait til conversion complete
              goto    waitf            ; skip if conversion is complete
     ad2      movf    ADRES,0          ; get a/d input 2 (90 degrees)
              addlw   080h             ; center a/d output around 0
              movwf   ADRES            ; ADRES will be used for quadrature ein
                                       ;(was AD2)
```

- 37 -

```
        movf    AD2LPHI,0       ; --- calculate AD2 low pass -------
        movwf   TEMPHI          ; get ad2lp
        movf    AD2LPLO,0
        movwf   TEMPLO
        comf    TEMPLO,1        ; negate ad1lp
        incf    TEMPLO,1
        btfsc   STATUS,2        ; zero bit
        decf    TEMPHI,1
        comf    TEMPHI,1        ; -ad2lp in TEMPHI, TEMPLO
        movf    ADRES,0
        addwf   TEMPHI,1        ; TEMP has ad2 - ad2lp btfsc   CCNT0,0   ;0428
        goto    nodith2   ;0428
        movlw   0c0h      ;0428 + dither
        addwf   TEMPLO,1  ;0428
        btfsc   STATUS,0  ;0428
        incf    TEMPHI,1  ;0428 TEMP has ad2 - ad2lp + dither
nodith2 rlf     TEMPHI,0        ; get sign bit in C
        rrf     TEMPHI,1
        rrf     TEMPLO,1        ; 1/2
        movf    TEMPLO,0
        addwf   AD2LPLO,1
        btfsc   STATUS,0        ; carry?
        incf    AD2LPHI,1
        movf    TEMPHI,0        ; ad2lp = ad2lp + (ad2-ad2lp) / 2
        addwf   AD2LPHI,1       ; --- end ad2 low pass filter ------------ movlw   99h             ; 1001 1001   enable ain3 a/d
        movwf   ADCON0          ; next reading will be Transformer a/d ;----- filters ---------------------------------------------------
;
;
;   ein :=round( 960.0*sin(2.0*pi*freq*time));         (* test
;   input *)
;   einq:=round( 960.0*sin(2.0*pi*freq*(time-7.5e-6)));  (*
;   quadrature *)
;
;   ein :=quant(ein );
;   einq:=quant(einq); (* *)
;
;   einlp :=einlp +((ein -einlp ) div 2    );
;   einlpq:=einlpq+((einq-einlpq) div 2    );  (* *)
;
;   xout :=5*(ein -einlp );
;   xoutq:=5*(einq-einlpq );  (* *)
;
;   xout :=cclip(xout );
;   xoutq:=cclip(xoutq); (* *)
;
;   temp:=vc1-xoutq + (xoutq div 4);           (* bpfilt1 *)
;   il1:=il1 + (temp div 4) + (temp div 8);
;   temp:=il1 + (vc1 div 16);
;   temp:=xout-temp;
;   vc1:=vc1 + (temp div 4) + 0*(temp div 8);
;
;   vc1lp:=vc1lp+((vc1-vc1lp) div 4    );
;
```

- 38 -

```
filts
        movf    AD1LPHI,0       ; --- calculate AD1 low pass -------
        movwf   TEMPHI
        movf    AD1LPO,0        ; get ad1lp
        movwf   TEMPLO
        comf    TEMPLO,1        ; negate ad1lp
        incf    TEMPLO,1
        btfsc   STATUS,2        ; zero bit
        decf    TEMPHI,1
        comf    TEMPHI,1        ; -ad1lp in TEMPHI, TEMPLO
        movf    AD1,0
        addwf   TEMPHI,1        ; ad1 - ad1lp in TEMPHI, TEMPLO btfsc   CCNT0,0         ;0428
        goto    nodith3         ;0428
        movlw   0c0h            ;0428 + dither
        addwf   TEMPLO,1        ;0428
        btfsc   STATUS,0        ;0428
        incf    TEMPHI,1        ;0428 TEMP has ad1 - ad1lp + dither

;--------------------------------------------------------------- nodith3 btfss   CBITS2,7        ; 8x if high sens mode, 2x if low
        goto    xoutin
        rlf     TEMPLO,1        ; scale xout up
        rlf     TEMPHI,1        ; 2x
        rlf     TEMPLO,1
        rlf     TEMPHI,1        ; 4x
xoutin  rlf     TEMPLO,0
        movwf   TEMP6
        rlf     TEMPHI,0        ; 8*(ein-einlp)
        movwf   TEMP8           ; TEMP8,TEMP6=xout=8*(ein-einlp)

movf    AD2LPHI,0       ; --- calculate einq -------
        movwf   TEMPHI
        movf    AD2LPO,0        ; get ad2lp
        movwf   TEMPLO
        comf    TEMPLO,1        ; negate ad1lp
        incf    TEMPLO,1
        btfsc   STATUS,2        ; zero bit
        decf    TEMPHI,1
        comf    TEMPHI,1        ; -ad2lp in TEMPHI, TEMPLO
        movf    ADRES,0
        addwf   TEMPHI,1        ; ad2 - ad2lp in TEMPHI, TEMPLO btfsc   CCNT0,0
        goto    nodith4
        movlw   0c0h
        addwf   TEMPLO,1        ; + dither
        btfsc   STATUS,0
        incf    TEMPHI,1        ; TEMP has ad2 - ad2lp + dither nodith4 rlf     TEMPLO,1        ; scale xoutq up
```

- 39 -

```
            rlf     TEMPHI,1 btfss   CBITS2,7        ; 16x if high sens mode, 4x if low
            goto    xoutqin
            rlf     TEMPLO,1
            rlf     TEMPHI,1
            rlf     TEMPLO,1
            rlf     TEMPHI,1 xoutqin     rlf     TEMPLO,0
            movwf   TEMP7
            rlf     TEMPHI,0        ; 16*(ein-einlp)
            movwf   TEMP9           ; TEMP9,TEMP9=xout=16*(ein-einlp)

clipper     btfss   CBITS2,7        ; if high sens mode, run clipper
            goto    switch          ; this makes it less sluggish at low
                                    ;sensitivity xclp8       equ     008h
xcln8       equ     0f8h
xclp9       equ     008h
xcln9       equ     0f8h movf    TEMP8,0         ; ---- xout clipper -----------------
            addlw   xcln8
            movwf   TEMPLO
            movf    TEMP8,0
            btfss   TEMPLO,7
            movlw   xclp8           ; if TEMP8 is above xclp set it to xclp
            movwf   TEMP8
            addlw   xclp8
            movwf   TEMPLO
            movf    TEMP8,0
            btfsc   TEMPLO,7
            movlw   xcln8           ; if TEMP8 is below -xclp set it to -xclp
            movwf   TEMP8 movf    TEMP9,0         ; ---- xoutq clipper -----------------
            addlw   xcln9
            movwf   TEMPLO
            movf    TEMP9,0
            btfss   TEMPLO,7
            movlw   xclp9           ; if TEMP9 is above 20h set it to 20h
            movwf   TEMP9
            addlw   xclp9
            movwf   TEMPLO
            movf    TEMP9,0
            btfsc   TEMPLO,7
            movlw   xcln9           ; if TEMP9 is below -20h set it to -20h
            movwf   TEMP9 switch      btfss   CBITS2,2        ; if gain setback is on, make sensor more
            goto    cfilt           ;   sensitive moving away from it
            movf    TEMP6,0
            movwf   TEMPLO
            movf    TEMP8,0
            movwf   TEMPHI
            movf    TEMP7,0
            movwf   TEMP6
```

```
            movf    TEMP9,0
            movwf   TEMP8
            movf    TEMPLO,0
            movwf   TEMP7
            movf    TEMPHI,0
            movwf   TEMP9 cfilt       call    bpfilt1         ; ---- TEMP8, TEMP9 -> bandpass1 -> VC1hi-----

; -------- Get Transformer a/d input ------
                                    ; ADCON0 is already 99h (ain3)
conv5       bsf     ADCON0,2        ; start a/d conversion
waiti       btfsc   ADCON0,2        ; wait til conversion complete
            goto    waiti           ; skip if conversion is complete
            movlw   91h             ; 1001 0001   enable ain2 a/d
            movwf   ADCON0          ; next reading will be timer pot
            movf    ADRES,0         ; get a/d
            andlw   0e0h
            movwf   TEMP8
            movlw   0               ; is now low
            btfsc   TEMP8,7         ; high or low?
            movlw   02h             ; is now high
            btfsc   TEMP8,6         ; high or low?
            movlw   02h             ; is now high
            xorwf   CBITS2,0        ; is this state different from last?
            andlw   02h             ; has tranformer input changed?
            btfss   STATUS,2        ; zero bit
            goto    endtrf          ; has not changed
            clrwdt                  ; has changed, clear watchdog timer,...
            movlw   02h
            xorwf   CBITS2,1        ;   ... and flip last state bit
endtrf                              ; -----Peak Detector------------------
                                    ; If either abs(VC1hi)>BPEAKhi then
                                    ;         ramp BPEAKhi up fast;  else
                                    ;         ramp it down slowly.
            movf    VC1hi,0         ; find abs(VC1hi)
            movwf   TEMP9
            btfss   TEMP9,7         ; skip next if sign is 1 (result neg)
            goto    bppos
bpneg       comf    TEMP9,1         ; get neg of delt in w
            incf    TEMP9,1
bppos                               ; abs(VC1hi) in TEMP9 movf    TEMP9,0
            btfsc   CBITS2,6        ; lights have been on more than 16 sec?
            addlw   0feh            ; decrease BPEAKhi by 2 more movwf   TEMP9 btfsc   TEMP9,7         ; don't let it get below 0
            movlw   0
            movwf   TEMP9 clrf    TEMPHI
            ;clrf   TEMPLO movf    SSGAIN,0        ; multiply BPEAKhi by Gain Pot
            movwf   TEMP8           ; calculate (SSGAIN-SSGAIN/8)+01fh
            rrf     TEMP8,1         ; This makes SSGAIN go from 1fh to ffh to
            rrf     TEMP8,1         ;  prevent dead spot in sensitivity
            rrf     TEMP8,1         ;  prevent dead spot in sensitivity
            rrf     TEMP8,0         ;  at bottom of pot.
```

- 41 -

```
        andlw   00fh
        movwf   TEMP8
        comf    TEMP8,1
        incf    TEMP8,0     ; -SSGAIN/8 in w
        addwf   SSGAIN,0
        addlw   00fh        ; now mulcnd in w bcf     STATUS,0    ; clear carry bit btfsc   TEMP9,0     ; TEMP9 is mulplr
        addwf   TEMPHI,1
        rrf     TEMPHI,1
        bcf     STATUS,0 btfsc   TEMP9,1
        addwf   TEMPHI,1
        rrf     TEMPHI,1
        bcf     STATUS,0 btfsc   TEMP9,2
        addwf   TEMPHI,1
        rrf     TEMPHI,1
        bcf     STATUS,0 btfsc   TEMP9,3
        addwf   TEMPHI,1
        rrf     TEMPHI,1
        bcf     STATUS,0 btfsc   TEMP9,4
        addwf   TEMPHI,1
        rrf     TEMPHI,1
        bcf     STATUS,0 btfsc   TEMP9,5
        addwf   TEMPHI,1
        rrf     TEMPHI,1
        bcf     STATUS,0 btfsc   TEMP9,6
        addwf   TEMPHI,1
        rrf     TEMPHI,1
        bcf     STATUS,0 btfsc   TEMP9,7
        addwf   TEMPHI,1
        rrf     TEMPHI,1 movf    TEMPHI,0
        movwf   TEMPLO pk2     movf    TEMPLO,0    ; get abs(VC1hi)*SSGAIN
        movwf   TEMP8
        movf    BPEAKhi,0   ;
        subwf   TEMP8,1     ; TEMP8=abs(VC1hi)-BPEAKhi
        btfsc   TEMP8,7     ; skip next if sign bit is 0 (result pos)
        goto    pkdown movlw   80h         ; ramp up semi fast
        addwf   BPEAKlo,1
        btfsc   STATUS,0
```

- 42 -

```
                incf    BPEAKhi,1
                goto    endpd
pkdown  movf    BPEAKhi,0       ; If BPEAK isn't ramped up, ramp down
                                ; slowly movlw   20h
        subwf   BPEAKlo,1       ; BPEAK=BPEAK-BPEAK / 256
        btfsc   STATUS,0        ; carry?
        goto    endpd
        decf    BPEAKhi,1
endpd   movf    BPEAKhi,0       ; don't let it get below 0
        btfsc   BPEAKhi,7
        movlw   0
        movwf   BPEAKhi bpaveg                          ;-------find average of bpeak--------------
        movf    CCNT0,0         ; get cycle counter
        andlw   07fh
        btfss   STATUS,2        ; zero bit
        goto    bavend
        movf    BPAVE,0         ; come here every 256ms
        subwf   BPEAKhi,0       ; w has BPEAKhi-BPAVE
        movwf   TEMP8
        btfsc   TEMP8,7         ; skip next if BPEAKhi>BPAVE
        goto    baveneg         ; BPAVE>BPEAKhi
        incf    BPAVE,1         ; BPAVE<BPEAKhi
        goto    bavend
baveneg decf    BPAVE,1 bavend  movf    BPAVE,0         ; BPAVE clipper addlw   0f0h            ; -010h
        movwf   TEMPLO
        movf    BPAVE,0
        btfss   TEMPLO,7
        movlw   010h            ; if BPAVE is above 010h set it to 010h
        movwf   BPAVE addlw   0f9h
        movwf   TEMPLO
        btfsc   TEMPLO,7
        movlw   0
        addlw   07h
        movwf   BPAVE           ; don't let it get below 7 btfsc   CBITS2,7        ; if low gain, set BPAVE const min
        goto    mpgain
         movlw  7
        movwf   BPAVE ; ------Comparator---------------
mpgain  movf    BPEAKhi,0
        movwf   TEMP9
        btfsc   TEMP9,7         ; don't let it get below 0
        movlw   0
        movwf   TEMP9 movf    TEMP9,0
        movwf   TEMPHI
```

```
thresh   movlw    03h
         addwf    BPAVE,0      ; BPAVE has been clipped between 7 and 010h
         movwf    TEMP8 movf     SSGAIN,0
         andlw    0feh
         btfsc    STATUS,2     ; zero bit set?
         goto     aro1         ; don't sense if sens gain pot <=1 movf     TEMPHI,0     ; Compare TEMPHI (BPEAKhi*SSGAIN)
         subwf    TEMP8,1      ;    to TEMP8 (thresh).

btfss    TEMP8,7      ; skip next if sign is 1 (result neg)
         goto     aro1 btfss    CBITS2,5
         goto     trsb bsf      PORTB,4      ; turn on LED if BPEAKhi>threshold
trsb     btfsc    CBITS1,4     ; two-second timer on?
         goto     skip40       ; if so then skip pulse-on btfss    CBITS1,2     ; is relay on?
         goto     skip40       ; if not then skip pulse-on if RELDD=1 ;------------------------------------------------
         movlw    00h          ; un-tristate relay
         tris     6            ; driver pins movlw    60h
         iorwf    PORTB,1      ; pull relay pins high bsf      CBITS3,5
    else              ;------------------------------------------------
         bsf      CBITS3,6
    endif             ;------------------------------------------------ bsf      CBITS1,3     ; turn on 32 ms timer
         bsf      CBITS3,7     ; turn on 1 sec timer
         bsf      CBITS1,4     ; turn on 2 second timer movf     CCNT0,0
         addlw    20h          ; set relay driver
         movwf    RDRCNT       ; counter reference
skip40   nop if ASADJ=1 ;------------------------------------------------ ltson2   movlw    0dh          ; is motion major?
         subwf    BPEAKhi,0    ; w = BPEAKhi - 13 btfsc    STATUS,0     ; BPEAKhi>13?

bsf      CBITS3,4     ; if so, then reset the
                               ; auto-adjust timer
    endif ;------------------------------------------------
```

```
fclr     clrf    BPEAKhi         ; reset filters to zero
         clrf    BPEAKlo
         clrf    VC1hi
         clrf    VC1lo
         clrf    IL1hi
         clrf    IL1lo movf    CCNT1,0
         movwf   LEDCNT          ; start LED on counter (use midbits)
         bsf     CBITS1,6        ; set relay turn on command bit
         movf    CCNT1,0         ; set Lights On Timer reference
         movwf   LCNTLO
         movf    CCNT2,0
         movwf   LCNTHI bcf     CBITS2,2        ; clear Gain Setback bit
         bcf     CBITS2,6        ; clear 16sec lights on timer bit goto    aro2
aro1 if ASADJ=1  ;----------------------------------------------- btfsc   CBITS1,2        ; if the lights are on
         goto    skip19          ; then skip this routine clrf    TEMPHI
         movf    ONGAIN,0        ; multiply BPEAKhi by ONGAIN bcf     STATUS,0        ; clear carry bit btfsc   BPEAKhi,0       ; BPEAKhi is mulplr
         addwf   TEMPHI,1
         rrf     TEMPHI,1
         bcf     STATUS,0 btfsc   BPEAKhi,1
         addwf   TEMPHI,1
         rrf     TEMPHI,1
         bcf     STATUS,0 btfsc   BPEAKhi,2
         addwf   TEMPHI,1
         rrf     TEMPHI,1
         bcf     STATUS,0 btfsc   BPEAKhi,3
         addwf   TEMPHI,1
         rrf     TEMPHI,1
         bcf     STATUS,0 btfsc   BPEAKhi,4
         addwf   TEMPHI,1
         rrf     TEMPHI,1
         bcf     STATUS,0 btfsc   BPEAKhi,5
         addwf   TEMPHI,1
         rrf     TEMPHI,1
         bcf     STATUS,0 btfsc   BPEAKhi,6
```

```
        addwf   TEMPHI,1
        rrf     TEMPHI,1
        bcf     STATUS,0 btfsc   BPEAKhi,7
        addwf   TEMPHI,1
        rrf     TEMPHI,1 movlw   03h                  ; put thresh back
        addwf   BPAVE,0              ; into TEMP8
        movwf   TEMP8 bcf     STATUS,0
        rrf     TEMP8,1              ; TEMP8 = 1/2 thresh
        bcf     STATUS,0
        rrf     TEMP8,0              ; w = 1/4 thresh subwf   TEMPHI,1             ; TEMPHI = (BPEAKhi*ONGAIN) - (1/4 thresh)

btfsc   STATUS,0             ; BPEAKhi*ONGAIN > 1/4 thresh?

bsf     CBITS3,4             ; If so, then start the
                                     ; auto-adjust timer again endif ;--------------------------------------------------------------- skip19  movf    LEDCNT,0
        subwf   CCNT1,0              ; don't turn off led unless timed out
        andlw   04h
        btfsc   STATUS,2             ; skip next if zero clear
        goto    aro2 bcf     PORTB,4              ; clear rb4 if BPEAKhi<threshold (LED off)

aro2                                 ; -----Update Counters------------------
        incf    CCNT0,1              ; increment cycle counter low bits (1024ms)
        btfss   STATUS,2             ; zero?
        goto    locnt
        incf    CCNT1,1              ; increment cycle counter midbits (0.262144
                                     ;sec)
        btfss   STATUS,2             ; zero?
        goto    locnt
        incf    CCNT2,1              ; increment cycle counter high bits (67.1
                                     ;sec)
locnt   nop reldrv  nop                          ; -----Relay Driver (turns on relay drivers
                                     ;   and starts relay timer----- turnoff btfss   CBITS1,5             ; turn off relay?
        goto    turnon btfss   CBITS1,2             ; check present status
        goto    offend               ; already off btfsc   CBITS1,4
        goto    relend               ; 2sec timer running if RELDD=1 ;---------------------------------------------------------------
        movlw   00h
```

- 46 -

```
        tris    6
        bsf     CBITS3,5
  else          ;-------------------------------------------------
        bsf     CBITS3,5
  endif         ;--------relay direct drive------------------------ movf    CCNT0,0         ; get 1ms timer value
        addlw   20h             ; 32ms pulse
        movwf   RDRCNT          ; set timer reference for relay pulse
        bsf     CBITS1,3        ; 0 to 32ms timer on
        bsf     CBITS3,7        ; 0 to 1s timer on
        bsf     CBITS1,4        ; 0 to 2s timer on
        bcf     CBITS1,2        ; set relay status to 'off' clrf    BPEAKhi         ; reset filters to zero
        clrf    BPEAKlo         ; prevents relay click from retriggering
                                ;sensor
        clrf    VC1hi
        clrf    VC1lo
        clrf    IL1hi
        clrf    IL1lo movf    SSGAIN,0        ; set ONGAIN
        movwf   ONGAIN          ; to current SSGAIN if ASADJ=1 ;-------------------------------------------------------
        bsf     CBITS3,4        ; since the relay has been turned
                                ; off, restart the auto-adjust
                                ; timer
  endif ;------------------------------------------------------------ offend  bcf     CBITS1,5        ; clear turn off command bit
        goto    relend turnon  btfss   CBITS1,6        ; turn on relay?
        goto    relend btfsc   CBITS1,2        ; check present status
        goto    relend          ; already on ;btfsc  CBITS3,7
        ;goto   relend           ; 1sec timer running btfsc   CBITS1,4
        goto    relend           ; 2sec timer running rpulson nop movlw   00h
        tris    6 if RELDD=1    ;--------relay direct drive------------------------
        bsf     CBITS3,5
  else          ;-------------------------------------------------
        bsf     CBITS3,6
  endif         ;--------relay direct drive------------------------ movf    CCNT0,0         ; get 1ms timer value
        addlw   20h             ; 32ms pulse
        movwf   RDRCNT          ; set timer reference for relay pulse
```

- 47 -

```
        bsf     CBITS1,3        ; 0 to 32ms timer on
        bsf     CBITS3,7        ; 0 to 1s timer on
        bsf     CBITS1,4        ; 0 to 2s timer on
        bsf     CBITS1,2        ; set relay status to 'on' if ASADJ=1  ;------------------------------------------------------
        bsf     CBITS3,4        ; since relay has just been turned on,
                                ; reset the auto-adjust timer movf    ONGAIN,0        ; set SSGAIN to
        movwf   SSGAIN          ; ONGAIN value
    endif ;------------------------------------------------------------ relend  nop

; -------- Get Timer Pot ---------
                                ; ADCON0 is already 91h
conv3   bsf     ADCON0,2        ; start a/d conversion
waitg   btfsc   ADCON0,2        ; wait til conversion complete
        goto    waitg           ; skip if conversion is complete
        movlw   89h             ; 1000 1001   enable ain1 a/d
        movwf   ADCON0          ; next reading will be sensitivity pot ; -----Relay Timer-------------
pulson  btfss   CBITS1,3        ; 32ms timer on?
        goto    pd              ; no
                                ; yes
        clrf    BPEAKhi         ; reset filters to zero
        clrf    BPEAKlo         ; prevents relay click from retriggering
sensor
        clrf    VC1hi
        clrf    VC1lo
        clrf    IL1hi
        clrf    IL1lo movlw   020h            ; this temporarily raises thresh to prevent
                                ;falsing
        movwf   BPAVE movf    CCNT0,0         ; yes
        subwf   RDRCNT,0        ; relay driver counter = ref?
        btfss   STATUS,2        ; zero bit
        goto    rtimend
        bcf     CBITS1,3        ; turn timer bit off if RELDD=0  ;--------relay direct drive-----------------------
        bcf     CBITS3,5        ; turn off off pulse
        bcf     CBITS3,6        ; turn off on pulse
    else ;------------------------------------------------------------
        btfss   CBITS1,2        ; if lights are off
        goto    skip6           ; then proceed movlw   60h             ; otherwise tri-state pins
        tris    6               ; after 32 ms
    endif               ;--------relay direct drive----------------------- skip6   movf    CCNT1,0         ; get 256ms timer value
        addlw   08h             ; 1s pulse
```

- 48 -

```
             movwf    RDRCNT           ; set timer reference for 1 second timer
             goto     pc               ; don't check 1sec timer if 32 msec timer
                                       ; is on pd           btfss    CBITS3,7         ; 1s timer on?
             goto     pb               ; no
             movf     CCNT1,0          ; yes
             subwf    RDRCNT,0         ; relay driver counter = ref?
             btfss    STATUS,2         ; zero bit
             goto     rtimend bcf      CBITS3,7         ; turn 1sec timer bit off
             btfsc    CBITS1,2         ; is relay on?
             goto     twosec           ; if so, then start 2-sec timer bcf      CBITS3,5         ; otherwise pull relay twosec       movf     CCNT1,0
             addlw    02h              ; 2s pulse
             movwf    RDRCNT           ; set timer reference for 2 second timer
             goto     pc               ; don't check 2sec timer if 1sec timer is on pb           btfss    CBITS1,4         ; 2s timer on?
             goto     pc               ; no
             movf     CCNT1,0          ; yes
             subwf    RDRCNT,0         ; relay driver counter = ref?
             btfss    STATUS,2         ; zero bit
             goto     rtimend bcf      CBITS1,4         ; turn 2sec timer bit off pc           nop
rtimend      nop littim       nop                       ; -----Lights On Timer-------
             btfss    CBITS1,2         ; lites on?
             goto     litend           ; no btfsc    CBITS1,6         ; lites on command bit clear?
             goto     litend           ; no clrf     TEMPHI           ;  CCNT1 increments once every 256ms adg          movf     ADRES,0          ; get a/d input  for timer pot value
             btfss    ADRES,7
             addlw    1                ; don't let it be zero movwf    TEMPLO if ASADJ=1 ;---------------------------------------------------------------
             btfss    CBITS1,2         ; if lights are on then use ONGAIN for
                                       ; auto-adj timer scaling
             goto     skip7            ; otherwise leave it alone andlw    0f0h             ; 1111 0000 -- clear bottom 4 bits
             movwf    ONGAIN           ; put timer pot reading into ONGAIN
             bcf      STATUS,0         ; clear carry bit rrf      ONGAIN,1         ; ONGAIN = timer pot/8
             rrf      ONGAIN,1         ;
             rrf      ONGAIN,1         ;
```

- 49 -

```
        movf    ONGAIN,0        ; w = timer pot/8
        rrf     ONGAIN,1        ; ONGAIN = timer pot/16
        addwf   ONGAIN,1        ; ONGAIN = 3*timer pot/16
                                ; or half again the timer pot, in minutes movf    ONGAIN,0        ; is ONGAIN<10 minutes?
        sublw   0ah             ; w = 10 - ONGAIN btfss   STATUS,0        ; if result is positive then ONGAIN<10
        goto    skip9 movlw   0ah             ; set ONGAIN to 10
        movwf   ONGAIN
    endif ;------------------------------------------------------------- skip9   movf    TEMPLO,0 skip7   bsf     CBITS2,5        ; set timer pot range bit sublw   06h             ; w = 06h - timer pot
        btfsc   STATUS,0        ; if result is positive then pot is under 06h bsf     CBITS2,5        ; clear timer pot range bit cnt2    bcf     STATUS,0
        rlf     TEMPLO,1
        rlf     TEMPHI,1        ; 1
        bcf     TEMPLO,0 rlf     TEMPLO,1
        rlf     TEMPHI,1        ; 2 rlf     TEMPLO,1
        rlf     TEMPHI,1        ; 3 rlf     TEMPLO,1
        rlf     TEMPHI,1        ; 4 rlf     TEMPLO,1
        rlf     TEMPHI,1        ; 5    32 * 256ms = 8 sec
        movf    LCNTLO,0
        addwf   TEMPLO,1
        btfsc   STATUS,0        ; carry?
        incf    TEMPHI,1
        movf    LCNTHI,0
        addwf   TEMPHI,1        ; now TEMPHI,LO is potvalue+LCNT ref comf    TEMPLO,1        ; negate potvalue+counter
        incf    TEMPLO,1
        btfsc   STATUS,2        ; zero bit
        decf    TEMPHI,1
        comf    TEMPHI,1        ; now TEMPHI,LO is -(potvalue+LCNT ref)

movf    CCNT1,0
        addwf   TEMPLO,1
        btfsc   STATUS,0        ; carry?
        incf    TEMPHI,1
        movf    CCNT2,0
        addwf   TEMPHI,1        ; now TEMPHI,LO is counter-(potvalue+LCNT
                                ;ref)
```

- 50 -

```
                btfsc   TEMPHI,7            ; is it positive?
                goto    litend              ; no, not timed out bsf     CBITS1,5            ; set turn off command bit if RRST8=1  ;-----------------1 min AGS-------------------------
                movf    CCNT1,0             ; set reference for 16 sec timer for Gain
                                            ;Setback
                addlw   0f0h                ; 240 * 1/4 is 60 sec
                movwf   LOFCNT              ; each count is 256ms
        else    ;------------------RRST8-------------------------
                movf    CCNT1,0             ; set reference for 16 sec timer for Gain
                                            ;Setback
                addlw   040h                ; 64 * 1/4 is 16 sec
                movwf   LOFCNT              ; each count is 256ms
        endif   ;------------------RRST8------------------------- litend          nop movf    LCNTLO,0
                movwf   TEMPLO
                movf    LCNTHI,0
                movwf   TEMPHI              ; now TEMPHI,LO is LCNT ref comf    TEMPLO,1            ; negate
                incf    TEMPLO,1
                btfsc   STATUS,2            ; zero bit
                decf    TEMPHI,1
                comf    TEMPHI,1            ; now TEMPHI,LO is -(LCNT ref)

movf    CCNT1,0
                addwf   TEMPLO,1
                btfsc   STATUS,0            ; carry?
                incf    TEMPHI,1
                movf    CCNT2,0
                addwf   TEMPHI,1            ; now TEMPHI,LO is counter-LCNT ref btfsc   TEMPLO,6            ; bit 6 is 16 seconds
                bsf     CBITS2,6            ; lights have been on 16sec, set control
                                            ;bit ; ----------Get Sensitivity Pot value------
                                            ; ADCON0 is already 89h (ain1)
conv4   bsf     ADCON0,2                    ; start a/d conversion
        nop
waith   btfsc   ADCON0,2                    ; wait til conversion complete
        goto    waith                       ; skip if conversion is complete adh     movf    ADRES,0                     ; get a/d input (pot wired cw=increasing
                                            ;volts)

if ASADJ=1  ;------- Auto sens adjust ------------------------------- movf    SSSET,1             ; test SSSET to see if it's zero
                btfsc   STATUS,2            ; if it is not, then continue
                goto    potinit             ; otherwise set SSGAIN, SSSET, and ONGAIN
                                            ;to pot value cnt     subwf   SSSET,0                     ; compare pot setting to SSSET
```

- 51 -

```
           btfsc   STATUS,0        ; if ^carry bit is zero, then result is neg
           goto    dpos            ; else result is positive movf    SSSET,0         ; make the difference
           subwf   ADRES,0         ; positive
dpos       nop
           sublw   0ah             ; is difference greater than 10?
           btfss   STATUS,0        ; if not, then continue
           goto    potinit         ; otherwise set SSGAIN, SSSET, and ONGAIN
                                   ;to pot setting movf    ADJTMR,0        ; is it time to adjust SSGAIN?

btfsc   CBITS1,2        ; are lights turned on?
           goto    ltson1          ; if so, then go to appropriate
                                   ;instructions ltsoff1    addlw   0ffh
           subwf   CCNT2,0         ; CCNT2 = ADJTMR + 4.8 hours?

btfss   STATUS,2        ; if not,
           goto    endadj          ; then exit ASA routine movlw   02h             ; add 2 to ONGAIN
           addwf   ONGAIN,0        ; and put the result in W btfsc   STATUS,0        ; if this rolls over,
           goto    ovset2          ; then set ONGAIN to SSSET subwf   SSSET,0         ; w = SSSET - (ONGAIN+2)
           btfss   STATUS,0        ; if the new ONGAIN is greater than SSSET,
           goto    ovset2          ; then set ONGAIN to SSSET movlw   02h             ; increase ONGAIN
           addwf   ONGAIN,1
           goto    adjrst          ; reset the auto-adjust timer ovset2     movf    SSSET,0         ; set ONGAIN
           movwf   ONGAIN          ; to SSSET
           goto    adjrst          ; and reset the auto-adjust timer ltson1     addwf   ONGAIN,0
           subwf   CCNT2,0 btfss   STATUS,2        ; if not,
           goto    endadj          ; then skip ASA movlw   020h            ; decrease SSGAIN
           btfss   SSGAIN,7        ; by 20h if SSGAIN is above 12:00
           movlw   010h            ; and by 10h if SSGAIN is below 12:00 subwf   SSGAIN,1
           btfss   STATUS,0        ; if this produces a negative number,
           goto    minset          ; then set it to the minimum possible (18h)

movlw   40h             ; 10:00 on the sens knob
           subwf   SSGAIN,0        ; w = new SSGAIN - 40h
           btfsc   STATUS,0        ; is the auto-adjusted gain below 40h?
           goto    adjrst          ; if not, then reset the auto-adjust timer
```

```
minset   movlw   40h              ; otherwise set the gain to 40h
         movwf   SSGAIN
         goto    adjrst           ; and reset the auto-adjust timer potinit  movf    ADRES,0          ; get pot setting again movwf   SSGAIN           ; set SSGAIN and SSSET
         movwf   SSSET            ; to pot setting adjrst   bsf     CBITS3,4         ; reset flag for ASA timer endadj   nop else ;----------------------------------------------------------------
         movwf   SSGAIN
    endif ;---------------------------------------------------------------- if GSBEN=1  ;----------------Gain Setback-------------------------- btfsc   CBITS1,2         ; if relay status is on, no Gain Setback
         goto    gsbend movf    CCNT1,0          ; time to start Gain Setback?
         subwf   LOFCNT,0
         btfss   STATUS,2         ; zero bit
         goto    agsst bsf     CBITS2,2         ; set Gain Setback bit agsst    btfss   CBITS2,2         ; Gain setback on?
         goto    gsbend           ; no movf    ONGAIN,0
         movwf   TEMPHI           ; TEMPHI = ONGAIN bcf     STATUS,0
         rrf     TEMPHI,1         ; TEMPHI = ONGAIN/2
         bcf     STATUS,0
         rrf     TEMPHI,0         ; w = ONGAIN/4 addwf   TEMPHI,0         ; w = 3/4 ONGAIN
         movwf   SSGAIN           ; AGS sensitivity = 3/4 lights-on
                                  ;sensitivity sublw   40h              ; w = 40h - AGS sens
         btfss   STATUS,0         ; if result is negative
         goto    gsbend           ; then AGS sens is above 10:00 movlw   40h              ; otherwise set AGS gain
         movwf   SSGAIN           ; to 10:00 gsbend   nop endif         ;----------------Gain Setback-------------------------- bsf     CBITS2,7         ; high or low sensitivity SSGAIN>050h ->
                                  ;high
         btfsc   SSGAIN,7         ; >80h high
```

- 53 -

```
           goto    hiloend
           movf    SSGAIN,0
           addlw   0b0h            ; -50
           movwf   TEMP8
           btfsc   TEMP8,7
           bcf     CBITS2,7        ; if SSGAIN<50h, set control bit to low
                                   ;sensitivity
hiloend nop movlw   81h             ; 1000 0001   enable ain0 a/d again
           movwf   ADCON0          ; (This is the receiver a/d.)
dith       bsf     PORTB,2         ; external dither
           btfss   CCNT0,0         ; every other time
           bcf     PORTB,2 if ZEROCR=1  ;------------turn relay on at zero crossing-------------
           btfss   CBITS1,6        ; if it's not time to turn the relay on,
           goto    skip11          ; then skip zero-crossing routine movlw   088h
           movwf   FSR             ; point to ADCON1 with indirect file select
                                   ;reg
           movlw   02h
           movwf   0               ; make RA3 digital input (transformer
                                   ;input)

waitwth btfsc   PORTA,3            ; wait while transformer input is high
        goto    waitwth waitwtl btfss   PORTA,3            ; wait while transformer input is low
        goto    waitwtl movlw   06h             ; number of ~1 ms delays
           movwf   TEMP7 r1      movf    CNTR1,0
        addlw   041h
        movwf   TEMP8              ; ~1 ms delay (a little more, I think)

waitr1  movf    CNTR1,0            ; fire relay pulse to make relay close at
        subwf   TEMP8,0            ;zero crossing
        btfss   STATUS,2           ; zero?  each CNTR1 is 15.3us
        goto    waitr1             ; wait til CNTR1 gets up to  TEMP8 decfsz  TEMP7
        goto    r1 movf    CNTR1,0
        addlw   05h
        movwf   TEMP8              ; reference count for relay firing waitr2  movf    CNTR1,0            ; fire relay pulse to make relay close at zero
        subwf   TEMP8,0            ;   crossing
        btfss   STATUS,2           ; zero?  each CNTR1 is 15.3us
        goto    waitr2             ; wait til CNTR1 gets up to TEMP8 endif        ;------------turn relay on at zero crossing------------- skip11 bcf     CBITS1,6
```

- 54 -

```
        if RELDD=0 ;------------------------------------------------------------
            btfsc   CBITS3,5         ; Set PORTB bits
            bsf     PORTB,5          ; to reflect the current btfss   CBITS3,5         ; status of the relay.
            bcf     PORTB,5          ; This makes it certain btfsc   CBITS3,6         ; that a stuck relay will get pulsed
            bsf     PORTB,6          ; every time through the loop.

btfss   CBITS3,6         ; If it was stuck before,
            bcf     PORTB,6          ; this will unstick it.
        else ;--------------------------------------------------------------- -
            btfss   CBITS3,5
            goto    loff bsf     PORTB,5
            bsf     PORTB,6 goto    skip10 loff        bcf     PORTB,5
            bcf     PORTB,6
        endif ;------------------------------------------------------------ ----- skip10  nop if ASADJ=1 ;-----------------------------------------------------------
            btfss   CBITS3,4         ; is it time to reset auto-adjust timer?
            goto    main             ; if not, then start main loop again movf    CCNT2,0          ; get current timer value
            ;movf   CCNT1,0          ; short timer for Tim's test atmrst      movwf   ADJTMR bcf     CBITS3,4         ; clear ASA timer reset bit
        endif ;------------------------------------------------------------ --- mend    goto    main

;------------------------------------------------------------------
        ;
        ;   subroutine    bpfilt1   input ADRES, output VC1hi
        ;
        ;       bandpass resonant filter
        ;
        ;   input:
        ;     TEMP9,TEMP7 is voutq
        ;     TEMP8,TEMP6 is vout
        ;
        ;   output:
        ;     VC1hi,VC1lo
        ;
        ;   temp:=vc1-xoutq;
        ;   il1:=il1 + (temp div 4);
        ;   temp:=il1 + (vc1 div 8);
        ;   temp:=xout-temp;
        ;   vc1:=vc1 + (temp div 4);
        ;
        ;------------------------------------------------------------ --------
```

```
bpfilt1
        movf    TEMP6,0         ; get xout
        movwf   TEMPLO
        movf    TEMP8,0
        movwf   TEMPHI comf   TEMPLO,1        ; negate xout
        incf    TEMPLO,1
        btfsc   STATUS,2        ; zero bit
        decf    TEMPHI,1
        comf    TEMPHI,1
        movf    VC1lo,0
        addwf   TEMPLO,1
        btfsc   STATUS,0        ; carry?
        incf    TEMPHI,1
        movf    VC1hi,0
        addwf   TEMPHI,1        ; TEMPHI,TEMPLO have vc1 - xout rlf     TEMPHI,0        ; get sign bit in C
        rrf     TEMPHI,1        ; at 1024sps 1/4 gives 40 hz center freq
        rrf     TEMPLO,1 movf    TEMPLO,0
        addwf   IL1lo,1
        btfsc   STATUS,0        ; carry?
        incf    IL1hi,1
        movf    TEMPHI,0
        addwf   IL1hi,1         ; il=il + temp div 4 movf    VC1hi,0         ; get il+vc/64 (damping)
        movwf   TEMPHI
        movf    VC1lo,0
        movwf   TEMPLO rlf     TEMPHI,0        ; get sign bit in C
        rrf     TEMPHI,1
        rrf     TEMPLO,1        ; 1/2 rlf     TEMPHI,0        ; get sign bit in C
        rrf     TEMPHI,1
        rrf     TEMPLO,1        ; 1/4 rlf     TEMPHI,0        ; get sign bit in C
        rrf     TEMPHI,1
        rrf     TEMPLO,1        ; 1/8 movf    IL1lo,0
        addwf   TEMPLO,1
        btfsc   STATUS,0        ; carry?
        incf    TEMPHI,1
        movf    IL1hi,0
        addwf   TEMPHI,1        ; TEMP has il+vc1 / 16 (damping)

comf    TEMPLO,1        ; negate il + (vc div 16)
        incf    TEMPLO,1
        btfsc   STATUS,2        ; zero bit
        decf    TEMPHI,1
         comf   TEMPHI,1 movf    TEMP7,0
```

```
    addwf   TEMPLO,1
    btfsc   STATUS,0
    incf    TEMPHI,1
    movf    TEMP9,0
    addwf   TEMPHI,1              ; TEMPHI,TEMPLO have xoutq - temp rlf     TEMPHI,0              ; get sign bit in C
    rrf     TEMPHI,1              ; at 1024sps 1/4 gives 40 hz center freq
    rrf     TEMPLO,1 rlf     TEMPHI,0              ; get sign bit in C
    rrf     TEMPHI,1
    rrf     TEMPLO,1 movf    TEMPLO,0
    addwf   VC1lo,1
    btfsc   STATUS,0              ; carry?
    incf    VC1hi,1
    movf    TEMPHI,0
    addwf   VC1hi,1               ; vc1 = vc1 + (temp div 4)

rlf     TEMPHI,0              ; get sign bit in C                ;
    rrf     TEMPHI,1                                                 ;
    rrf     TEMPLO,0              ; delt is 1/2+1/4 (gives 120hz)    ;
                                                                     ;
    addwf   VC1lo,1                                                  ;
    btfsc   STATUS,0              ; carry?                           ;
    incf    VC1hi,1                                                  ;
    movf    TEMPHI,0                                                 ;
    addwf   VC1hi,1               ; vc=vc+delt*(adres-il)            ;

return                        ; bpfilt1
```

What is claimed is:

1. An occupancy sensor-based load controller, comprising:

sensing means for transmitting acoustic energy into a space, and for receiving acoustic energy reflected from said space to produce a detector signal indicative of said space;

an analog-to-digital converter, connected to said sensing means, for digitizing said detector signal to produce a digitized detector signal having digital values indicative of said detector signal at controllable sampling intervals;

a programmed microprocessor, connected to said analog-to-digital converter, to receive said digitized detector signal, and operable to analyze said digitized detector signal to assess a Doppler shift between said transmitted acoustic energy and said received acoustic energy and to provide an indication of motion within said space as a function of said Doppler shift; and a controllable load energizing device, responsive to said indication of motion, operable to automatically energize and de-energize an electrical load as a function of said indication of motion.

2. The load controller of claim 1, said controllable load energizing device comprising a relay having contacts connected in series with said electrical load and a source of electrical power.

3. The load controller of claim 1, said controllable load energizing device comprising a silicon controlled rectifier connected in series with said electrical load and a source of electrical power.

4. The load controller of claim 1, said controllable load energizing device comprising a triac connected in series with said electrical load and a source of electrical power.

5. The load controller of claim 1, said sensing means comprising an ultrasonic acoustic energy transmitter and sensor.

6. The load controller of claim 1, said sensing means further comprising a passive infrared detector.

7. The load controller of claim 1, said sensing means comprising an ultrasonic acoustic energy transmitter and sensor in combination with a passive infrared detector.

8. The load controller of claim 1, further comprising:

environmental sensing means, connected to said microprocessor, for sensing an environmental condition of said space.

9. The load controller of claim 8, said environmental sensing means comprising an ambient light detector.

10. The load controller of claim 8, said environmental sensing means comprising an ambient temperature sensor.

11. The load controller of claim 1, further comprising:

a user input device, connected to said microprocessor, for adjusting motion analysis parameters used by said microprocessor to analyze said digitized occupancy signal.

12. The load controller of claim 11, said motion analysis parameters including motion sensitivity adjustments and electrical load de-energization time.

13. The load controller of claim 1, said sensing means transmitting continuous wave acoustic energy into said space.

14. The load controller of claim 1, said sampling intervals of said analog-to-digital converter being controlled to digitize said detector signal at sampling intervals synchronized with the transmitting of said acoustic energy.

15. The load controller of claim 14, said sampling intervals of said analog-to-digital converter being controlled to sample said detector signal in quadrature synchronized with the transmitting of said acoustic energy.

16. The load controller of claim 1, said programmed microprocessor being operable to controllably filter said digitized detector signal.

17. A method of controlling an electrical load as a function of occupancy of a space, comprising:

transmitting acoustic energy into a space;

receiving acoustic energy reflected from said space;

generating a detector signal indicative of said space as a function of said received acoustic energy;

digitizing said detector signal to produce a series of digital samples indicative of said detector signal at controllable sampling intervals;

processing said series of digital samples to assess a Doppler Shift between said transmitted acoustic energy and said received acoustic energy and to produce a signal indicative of occupancy of said space as a function of said Doppler shift; and automatically energizing and de-energizing an electrical load as a function of said signal indicative of occupancy.

18. The method of claim 17, said transmitting and receiving steps comprising:

transmitting ultrasonic acoustic energy into said space; and receiving ultrasonic acoustic energy reflected from said space.

19. The method of claim 18, said transmitting and digitizing steps further comprising:

transmitting continuous wave ultrasonic acoustic energy into said space at a controlled frequency; and sampling said detector signal as a function of said controlled frequency.

20. The method of claim 19, said digitizing step comprising, sampling said detector signal at a sampling frequency that is an integer fraction of said controlled frequency.

21. The method of claim 19, said digitizing step comprising, sampling said detector signal at sampling intervals synchronized with the controlled frequency of said continuous wave ultrasonic acoustic energy.

22. The method of claim 21, said digitizing step comprising, sampling said detector signal in quadrature synchronized with said controlled frequency.

23. The method of claim 22, said processing step comprising, discriminating motion within said space as a function of said samples in quadrature synchronized with said controlled frequency.

24. The method of claim 23, said discriminating step comprising, controllably filtering said samples in quadrature synchronized with said controlled frequency.

25. The method of claim 24, said controllably filtering step comprising determining said Doppler shift between said transmitted continuous wave ultrasonic acoustic energy and said samples in quadrature synchronized with the transmitting of said continuous wave ultrasonic acoustic energy.

26. The method of claim 17, further comprising:

detecting infrared energy within said space, said generating step further comprising, generating said detector signal also as a function of said detected infrared energy.

27. The method of claim 17, said processing step comprising, processing said series of digital samples as a function of an occupancy pattern of said space.

28. The method of claim 27, said processing step comprising, adjusting a sensitivity of the determination of occupancy of said space.

29. The method of claim 28, said processing step comprising, automatically adjusting said sensitivity as a function of a history of said occupancy signal.

30. The method of claim 28, said processing step further comprising, adjusting said sensitivity as a function of user settable parameters.

31. The method of claim 28, said processing step comprising, automatically adjusting said sensitivity as a function of a size of said space.

32. The method of claim 17, said processing step comprising, analyzing said series of digital samples to determine a direction of motion within said space.

33. The method of claim 17, further comprising:

dithering said detector signal prior to said digitizing step.

34. The method of claim 17, said automatically energizing and de-energizing step comprising:

sensing a zero-crossing of an alternating current source supplying said load; and energizing said load substantially contemporaneous with said zero-crossing.

35. The method of claim 17, further comprising:

automatically initiating a self-test procedure, including:
  interrupting the transmission of acoustic energy into said space for a predetermined time;
  subsequently detecting ultrasonic energy reflected from said space to produce a test signal; and
  analyzing an operation of said transmitting, receiving and generating steps as a function of said test signal.

36. The method of claim 35, further comprising:

detecting a peak value of said test signal; and processing said peak value to analyze said operation of said transmitting, receiving and generating steps.

37. The method of claim 17, said automatically energizing and de-energizing step comprising:

energizing said load substantially contemporaneous with the production of said signal indicative of occupancy; and de-energizing said load after a controllable de-energization time.

38. The method of claim 37, further comprising:

adjusting said controllable de-energization time as a function of a history of said occupancy signal.

39. A method of controlling an electrical load as a function of an occupancy pattern of a space, comprising:

transmitting acoustic energy into a space;

receiving acoustic energy reflected from said space;

generating a detector signal indicative of said space as a function of said received acoustic energy;

digitizing said detector signal to produce a series of digital samples indicative of said detector signal at controllable sampling intervals;

processing said series of digital samples using a plurality of predetermined algorithms to produce a signal indicative of occupancy of said space;

automatically modifying said predetermined algorithms to adjust said processing step as a function of a history of said signal indicative of occupancy; and automatically energizing and de-energizing an electrical load as a function of said signal indicative of occupancy.

40. The method of claim 39, said automatically modifying step comprising, adjusting a power level of acoustic energy transmitted into said space.

41. The method of claim 39, said processing step comprising, controllably filtering said series of digital samples to produce said signal indicative of occupancy of said space; and said automatically modifying step further comprising, automatically adjusting said controllably filtering step.

42. The method of claim 39, said automatically modifying step comprising, automatically adjusting energization and de-energization times of said electrical load.

43. The method of claim 39, said automatically modifying step comprising, automatically adjusting a sensitivity of motion detection.

44. The method of claim 39, said automatically modifying step comprising, automatically adjusting a threshold used to determine presence of motion.

45. The method of claim 39, further comprising:

detecting infrared energy within said space; and said generating step comprising, generating said detector signal as a function of said received acoustic energy and as a function of said detected infrared radiation.

46. The method of claim 39, further comprising, before said processing step, selecting said plurality of predetermined algorithms according to ambient conditions within said space.

47. A method of controlling an electrical load as a function of an occupancy pattern of a space, comprising:

detecting infrared energy within a space;

generating a detector signal indicative of said space as a function of said detected infrared energy;

digitizing said detector signal to produce a series of digital samples indicative of said detector signal at controllable sampling intervals;

processing said series of digital samples using a plurality of predetermined algorithms to produce a signal indicative of occupancy of said space;

automatically modifying said predetermined algorithms to adjust said processing step as a function of a history of said signal indicative of occupancy; and automatically energizing and de-energizing an electrical load as a function of said signal indicative of occupancy.

48. The method of claim 47, said processing step comprising, processing said series of digital samples as a function of an occupancy pattern of said space.

49. The method of claim 48, said automatically adjusting step comprising, adjusting a sensitivity of the determination of occupancy of said space.

50. The method of claim 47, said automatically adjusting step further comprising, adjusting said sensitivity as a function of a history of said occupancy signal.

51. The method of claim 47, said automatically adjusting step further comprising, adjusting said sensitivity as a function of user settable parameters.

52. The method of claim 47, further comprising, dithering said detector signal prior to said digitizing step.

53. The method of claim 47, said automatically energizing and de-energizing step comprising:

energizing said load substantially contemporaneous with the production of said signal indicative of occupancy; and de-energizing said load after a controllable de-energization time.

54. The method of claim 53, further comprising, adjusting said controllable de-energization time as a function of a history of said occupancy signal.

55. The method of claim 47, further comprising, before said processing step, selecting said plurality of predetermined algorithms according to ambient conditions within said space.

* * * * *